(12) United States Patent
Abbott et al.

(10) Patent No.: US 7,813,978 B2
(45) Date of Patent: Oct. 12, 2010

(54) METHODS AND SYSTEMS FOR MANAGING AND APPROVING LEGAL EXPENSES

(75) Inventors: Preston H. Abbott, Guilford, CT (US); Patricia Anne Hussey, Old Greenwich, CT (US); Carolyn Katherine Amone, Carmel, NY (US); Prasanna Ramaswamy, Stamford, CT (US); Ganesh Narayanan, Stamford, CT (US); Janice Pearson, Stamford, CT (US); Patricia O'Brien-Gilbert, Redding, CT (US)

(73) Assignee: GE Corporate Financial Services, Inc., Norwalk, CT (US)

( * ) Notice: Subject to any disclaimer, the term of this patent is extended or adjusted under 35 U.S.C. 154(b) by 1803 days.

(21) Appl. No.: 10/838,000

(22) Filed: May 3, 2004

(65) Prior Publication Data

US 2005/0246274 A1    Nov. 3, 2005

(51) Int. Cl.
    *G06F 17/60* (2006.01)
(52) U.S. Cl. ............... 705/35; 705/40; 705/38; 705/30; 705/36 R; 463/25; 463/29; 318/563; 318/154; 318/601; 235/380; 235/379
(58) Field of Classification Search .......... 705/35, 705/40, 38, 30, 36 R; 453/25, 29; 318/563, 318/154, 601; 235/379, 380
    See application file for complete search history.

(56) References Cited

U.S. PATENT DOCUMENTS

| | | | |
|---|---|---|---|
| 5,121,945 A | 6/1992 | Thomson et al. | |
| 5,317,504 A * | 5/1994 | Nakayama | 705/30 |
| 5,740,271 A | 4/1998 | Kunkler et al. | |
| 5,758,327 A | 5/1998 | Gardner et al. | |
| 5,802,498 A | 9/1998 | Comesanas | |
| 5,832,460 A | 11/1998 | Bednar et al. | |
| 5,920,847 A | 7/1999 | Kolling et al. | |
| 5,956,700 A | 9/1999 | Landry | |
| 5,991,741 A | 11/1999 | Speakman et al. | |
| 5,991,742 A | 11/1999 | Tran | |
| 6,035,285 A | 3/2000 | Schlect et al. | |

(Continued)

OTHER PUBLICATIONS

Computer and Software Enterpirses, Inc. San Luis Obispo, California, at www.case.net—Fulled Promises: The How-Tos of Enterprise Resource Planning Software.*

(Continued)

*Primary Examiner*—Kirsten S Apple
*Assistant Examiner*—Mary Gregg
(74) *Attorney, Agent, or Firm*—Armstrong Teasdale LLP

(57) ABSTRACT

A method for tracking and approving legal expenses incurred by a business entity using a legal budgeting computer system is provided. The method includes creating a legal matter reflecting legal work to be performed by an outside counsel, creating a purchase order for the legal matter including a budgeted amount which is expected to be paid to the outside counsel for performing the legal work, receiving from the outside counsel an invoice, and prompting an account manager to designate a method of reimbursement for the invoice including at least one of paid at close, charge to good faith, charge to loan, customer to wire money, and a non-reimbursable charge to cost center. The method also includes submitting the invoice to an approval process, validating the approved invoice amount, paying the approved invoice amount, and automatically reconciling the approved invoice amount.

66 Claims, 51 Drawing Sheets

U.S. PATENT DOCUMENTS

| | | | |
|---|---|---|---|
| 6,044,362 | A | 3/2000 | Neely |
| 6,070,150 | A | 5/2000 | Remington et al. |
| 6,128,603 | A | 10/2000 | Dent et al. |
| 6,289,322 | B1 | 9/2001 | Kitchen et al. |
| 6,363,362 | B1 | 3/2002 | Burfield et al. |
| 6,408,284 | B1 | 6/2002 | Hilt et al. |
| 6,578,015 | B1 | 6/2003 | Haseltine et al. |
| 6,618,730 | B1* | 9/2003 | Poulter et al. ............... 707/102 |
| 6,625,267 | B1 | 9/2003 | Graham et al. |
| 6,882,983 | B2* | 4/2005 | Furphy et al. ................ 705/30 |
| 7,065,493 | B1* | 6/2006 | Homsi ........................... 705/8 |
| 7,321,864 | B1* | 1/2008 | Gendler ......................... 705/7 |
| 2001/0034675 | A1* | 10/2001 | Belford et al. ................ 705/30 |
| 2002/0019759 | A1* | 2/2002 | Arunapuram et al. .......... 705/7 |
| 2003/0079180 | A1* | 4/2003 | Cope .......................... 715/511 |
| 2003/0220854 | A1* | 11/2003 | Chu et al. .................... 705/30 |
| 2004/0010442 | A1* | 1/2004 | Merker et al. ................ 705/10 |
| 2004/0034588 | A1* | 2/2004 | Arikawa et al. .............. 705/36 |
| 2005/0222854 | A1* | 10/2005 | Dale et al. .................... 705/1 |
| 2007/0174191 | A1* | 7/2007 | Keaton et al. ................ 705/40 |

OTHER PUBLICATIONS

Oracle PO by Oracle Corporation Redwood City, California: Ironside Introduces Oracle Enterpirse Adapters: Adapters Porvide Real Tiem Integration to Oracle Applications for more accurate Onlie Order Management and Reduced Costs.*

DataCert, Inc. Houston, TX at www.datacert.com.* www.sable-law.com Jan. 29, 2003; web.archive.org/web/20030129165537/http://www.sable-law.com/: 2 pages.*

Dan DeWitt. (Jan. 26, 1990). Non-refundable legal fees upheld :[City Edition]. St. Petersburg Times,p. 1. Retrieved Jan. 5, 2010, from Business Dateline. (Document ID: 50185754.*

Tom Corwin, & Sylvia Cooper. (Sep. 17, 2003). Panel Oks Refund of Legal Fees :[All Edition]. The Augusta Chronicle,p. B01. Retrieved Jan. 5, 2010, from Business Dateline. (Document ID: 406517431).*

Annotated by Examiner; DataCert, Inc. Houston, TX at www.datacert.com.*

Jenny Deam. (Jun. 26, 1996). Object: Adoption Series: Connections: [0 South Pinellas Edition]. St. Petersburg Times,p. 1.D. Retrieved Jan. 5, 2010, from Business Dateline. (Document ID: 22733061).*

* cited by examiner

Matter Creation

| | |
|---|---|
| Customer Name | N/A |
| * Matter Type | Select a Type |
| Matter Details | |
| * Business Segment | Select a Segment |
| * Business Region | |
| * Primary Contact | |
| * CF Legal Counsel | Select a CF Legal Counsel |
| * Charge Code | |
| Finance Manager | |
| PortFolio Analyst | Select a PortFolio Analyst |
| P&L Approver | Select a P&L Approver |
| * Billing Team | Select a Billing Team |

| | |
|---|---|
| * Open Date | 01/14/2004 |
| Close date | |
| Close Matter | ☐ |
| Good Faith | Yes ○ No ◉ |
| Good Faith Project Code | |
| Datacert Matter ID | |
| LEBB Matter ID | |
| Matter Category | Big Event |
| Special Handling | ☐ |
| Notes | |

→ 360

→ Log Off

ADD LAW FIRMS — 364

| Law Firm | Lead Lawyer | City, State | PO Number | Budget amount | Reimbursable Type |
|---|---|---|---|---|---|
| KING | ALFORD | ATLANTA, GA | | 1,000,000 | 801300077 |

— 362

Submit Matter    Reset

* Indicates mandatory fields

Matter Inquiry

| Matter Name | World | | Business Segment | All |
|---|---|---|---|---|
| Matter No. | | | Business Region | All |
| Internal Counsel | All | | Account Manager | All |
| Matter Status | All | | Law Firm | |
| Matter Type | All | | Deal Actual | |

— 480

[Print] [Export to Excel] [Search] [Reset] [Log Off]

| Matter No. | Matter Name | Date Opened | Law Firm | Budget Amount ($) | Total Billed | Status | Current Responsibility | No. of Invoices |
|---|---|---|---|---|---|---|---|---|
| CF00FKC | World Data | 08/31/2001 | LATHAM | 100,000.00 | 0.00 | Open | | 0 |
| CF00FKC | World Data | 08/31/2001 | GOLDBERG | 100,000.00 | 941.06 | Open | | 2 |
| CF0092L | World Data | 11/06/2003 | KILPATRICK | 80,000.00 | 329.27 | Open | | 1 |
| CF00BHI | World Kitchen | 01/01/2002 | WINSTON | 15,000.00 | 6,762.60 | Open | | 7 |
| CF00EBW | World Publications | 07/28/2003 | KING | 65,000.00 | 884.68 | Open | | 3 |
| CF00F2T | World Publications | 07/28/2003 | KING | 20,000.00 | 0.00 | Open | | 0 |
| CF0O9HO | World | 09/10/2002 | PAUL | 200,000.00 | 542.19 | Open | | 16 |
| CF00FUM | World | 01/00/2004 | PAUL | 50,000.00 | 0.00 | Open | | 0 |
| CF00EA6 | Worlds | 07/16/2003 | WINSTON | 10,300.00 | 5,949.00 | Open | | 1 |
| | | | Total | 640,300.00 | 271,408.80 | | | |

FIG. 12

Invoice Inquiry

Invoice Date From: 
Invoice No.: 
Invoice Amount: Equal to
Internal Counsel: All
Business Segment: All
Business Region: All
Account Manager: All
Primary Contact: 
Billing Team: All Invoice Date To: 
Invoice Status: All
Matter No.: 
Matter Name: Mills
Matter Status: All
Matter Type: All
Law Firm: All
In Queue Since: 
Deal Actual:

— 520

Search  Reset

Print  Export to Excel

— 522

| Invoice No. | Invoice Date | Matter Name | Net Invoice | Invoice Status | Status Owner | Att/Primary Contact | Internal Counsel |
|---|---|---|---|---|---|---|---|
| 10673592 | 01/09/2004 | Mills Corporation | 2,662.20 | Pending | ERNST | ERNST | DOUGLAS |
| 1329853 | 12/15/2003 | Mills | 30,628.24 | Approved | | ERNST | DOUGLAS |
| 10028465 | 06/15/2003 | Mills Corporation | 1,491.00 | Approved | | ERNST | DOUGLAS |
| 10599315 | 12/13/2002 | Mills Corporation | 1,081.54 | Approved | | ERNST | DOUGLAS |
| | | Total | 117,389.68 | | | | |

FIG. 14

Matter Queue

| Matter Name | Action | In Queue Since | Open Date | Confirm |
|---|---|---|---|---|
| Stelco III | Enter Paid At Close | 06/16/2003 | 06/16/2003 | No Paid @ Close |

→ Log Off

Paid At Close

Customer Name    Stelco III

*Paid At Close Amount    — 602

Paid @ Close Amount Allocation

Reimbursable — 604
Customer Wire Amount
Charge To Loan Amount
Good Faith Amount Good Faith Balance        Not Applicable

Non-Reimbursable — 606
P&L Amount(1)

Cost Center (1)

Add P&L

Log Off

Save    Reset

Invoice Approval — 632

Invoice Information — 630

| | | | |
|---|---|---|---|
| Matter Name | World | Fees | $10,326.20 |
| Matter Number | CF009HO | Expenses | $25.00 |
| Law Firm Name | PAUL | Gross Invoice Amount | $10,351.20 |
| Invoice Number | 1248620 | Vendor Discount | $0.00 |
| Invoice Date | 11/14/2002 | Net Invoice Amount | $10,351.20 |
| GL Account On Matter | 801300081-NonReimbursable | Cost Center On Matter | CF5COP |
| Paid At Close Amount | $0.00 | | |
| Invoice Description | WORLD | | |

644 — View Invoice / Log Off

Amount Allocation

Paid At Close — 634

- Vendor Applied Paid At Close
- Amount adjusted for paid @ close
- Paid At Close Balance: 0.00

Reimbursable — 636

Reimbursable From Customer - 801300077

- Customer Wire Amount
- Portfolio Analyst: ANGELA
- Charge To Loan Amount
- Effective Date Good Faith GL Account - 343999993

- Good Faith Amount
- Good Faith Balance: 0.00

Non-Reimbursable — 638

GL Account - 801300081

Add P&L

| | | | |
|---|---|---|---|
| P&L Amount (1) $ | 10,351.20 Cost Center (1) | CF5HMF P&L Approver | Select... |
| P&L Amount (2) $ | Cost Center (2) | P&L Approver | Select... |
| P&L Amount (3) $ | Cost Center (3) | P&L Approver | Select... |

Discrepancy — 640

Rejected Amount

| Reimbursement Total | Non-Reimbursement Total | Rejected Amount | Amount to be adjusted for paid @ close | Net Invoice Amount |
|---|---|---|---|---|
| | 2,245.02 | | | 2,245.02 |

Comments (mandatory in case of rejection) — 650 / 642

Invoice Approval History

| Approved By | Approved Date | Approver Comments |
|---|---|---|

Approve — 646    Reject — 648

FIG. 19

Matter Inquiry

- Matter Name
- Matter No.
- Internal Counsel — All
- Matter Status — All
- Matter Type — All

- Business Segment — All
- Business Region — All
- Account Manager — All
- Law Firm
- Deal Actual Log Off | Reset | Search | Export to Excel | Print

Matter Inquiry

| | | | |
|---|---|---|---|
| Matter Name | | Busines Segment | Bank Loan |
| Matter No. | | Busines Region | BL |
| Internal Counsel | All | Account Manager | PATRICK |
| Matter Status | All | Law Firm | |
| Matter Type | All | Deal Actual | |

670

Search   Reset   Log Off

Print   Export to Excel

| Matter No. | Matter Name | Date Opened | Law Firm | Budget Amount | Total Billed | Status | Current Responsibility | No. Of Invoices |
|---|---|---|---|---|---|---|---|---|
| CF00EFL | Galey | 08/07/2003 | WINSTON | 8,600.00 | 5,464.80 | Open | | 6 |
| LEBB02551 | Galey | | | 0.00 | 0.00 | Open | JOHN | 0 |
| CF00F08 | Gemini | 10/01/2003 | PAUL | 10,300.00 | 0.00 | Open | | 0 |
| LEBB02309 | Guilfurd | 08/18/2003 | | 0.00 | 0.00 | Open | JOHN | 0 |
| LEBB04027 | MAGNATR | | | 0.00 | 0.00 | Open | JOHN | 0 |
| LEBB01623 | Pre-petition | | | 0.00 | 0.00 | Closed | JOHN | 0 |
| CF00FIF | Smarte | 12/04/2003 | WINSTON | 5,000.00 | 0.00 | Open | NANCY | |
| LEBB01937 | WKI | | | | | | | |
| | | | Total | 23,900.00 | 5,464.80 | | | |

Invoice Inquiry

690

Invoice Date From: [ ]
Invoice No.: [ ]
Invoice Amount: [Equal to]  [ ]
Internal Counsel: [All]
Business Segment: [All]
Business Region: [All]
Account Manager: [PATRICK]
Primary Contact: [ ]
Billing Team: [All]

Invoice Date To: [ ]
Invoice Status: [All]
Matter No.: [ ]
Matter Name: [ ]
Matter Status: [All]
Matter Type: [All]
Law Firm: [All]
In Queue Since: [ ]
Deal Actual: [ ]

[Search] [Reset]

[Print] [Export to Excel]

692

| Invoice No. | Invoice Date | Matter Name | Net Invoice | Invoice Status | Status Owner | AM/Primary Contact | Internal Counsel |
|---|---|---|---|---|---|---|---|
| 1334440 | 01/09/2004 | Gemini | 3,704.97 | Pending | PATRICK | PATRICK | JOHN |
| 1793442 | 12/18/2003 | Galey | 2,824.67 | Pending | PATRICK | PATRICK | JOHN |
| 1776012 | 09/12/2003 | Galey | 1,210.95 | Approved | | PATRICK | JOHN |
| 1771772 | 08/18/2003 | Galey | 155.25 | Approved | | PATRICK | JOHN |
| | | Total | 34,391.29 | | | | |

FIG. 23

Invoice Queue

| Matter Name | Invoice No. | Invoice Date | Action | In Queue Since |
|---|---|---|---|---|
| Distributing Inc | 1763534 | 06/23/2003 | Invoice Approval | 12/19/2003 |

@ Indicates matters with non-datacert law firms

→ Log Off

Invoice Inquiry

- Invoice Date From
- Invoice No.
- Invoice Amount — Equal to
- Internal Counsel — All
- Business Segment — All
- Business Region — All
- Account Manager — All
- Primary Contact
- Billing Team — All

- Invoice Date To
- Invoice Status — All
- Matter No.
- Matter Name — All
- Matter Status — All
- Matter Type — All
- Law Firm
- In Queue Since
- Deal Actual

[Print] [Export to Excel]   [Search] [Reset]   [Log Off]

Matter Creation

| | | | |
|---|---|---|---|
| Customer Name | N/A | | |
| * Matter Type | Select a Type | * Open Date | 01/14/2004 |
| Matter Details | | Close date | |
| * Business Segment | Select a Segment | Close Matter | ☐ |
| * Business Region | | Good Faith | Yes ○ No ⦿ |
| Primary Contact | | Good Faith Project Code | |
| * CF Legal Counsel | Select a CF Legal Counsel | Datacert Matter ID | |
| * Charge Code | | LEBB Matter ID | |
| Finance Manager | | Matter Category | |
| PortFolio Analyst | Select a PortFolio Analyst | Special Handling | Big Event |
| * P&L Approver | Select a P&L Approver | | ☐ |
| * Billing Team | Select a Billing Team | Notes | |

860 ↗

ADD LAW FIRMS: — 864

862 ↗

| | | | | | |
|---|---|---|---|---|---|
| | | | City,State | | |
| KING | ALFORD | | ATLANTA, GA | 1,000,000.00 | 801 300077 |

* Indicates mandatory fields

FIG. 31

Invoice Queue

| Matter Name | Invoice No. | Invoice Date | Action | In Queue Since |
|---|---|---|---|---|
| Distributing Inc | 1763504 | 06/20/2000 | Invoice Approval | 12/19/2000 |

@ Indicates matters with non-adjacent law firms

→ Log Off

Invoice Entry

— 940

* Matter Name
* Matter Type
* Charge Code
  Business Segment
  CT Legal Counsel
  Primary Contact
* Law Firm
  Budget Amount
  PO Number
  Lead Lawyer
  City, State

* C;L Account No.    801300077-Reimbu
* Invoice No.
* Invoice Date
* Invoice Start Date
* Invoice End Date
* Invoice Submitted Date    01/14/2004
* Fees
* Expenses
  Invoice Amount
  Vendor Discount
  Net Invoice Amount
* Original Currency On Invoice    US Dollars
  Original Invoice Amount Invoice Description Comments

* Mandatory Fields

Log Off    Submit Invoice    Reset

Matter Inquiry

| Matter Name | World | | Business Segment | All |
|---|---|---|---|---|
| Matter No. | | | Business Region | All |
| Internal Counsel | All | | Account Manager | All |
| Matter Status | All | | Law Firm | |
| Matter Type | All | | Deal Actual | |

[Search] [Reset] [Log Off]

[Print] [Export to Excel]

| Matter No. | Matter Name | Date Opened | Law Firm | Budget Amount $ | Total Billed $ | Status | Current Responsibility | No. of Invoices |
|---|---|---|---|---|---|---|---|---|
| CF00FKC | World Data | 08/31/2001 | LATHAM | 100,000.00 | 0.00 | Open | | 0 |
| CF00FKC | World Data | 08/31/2001 | GOLDBERG | 100,000.00 | 941.06 | Open | | 2 |
| CF0092L | World Data | 11/06/2003 | KILPATRICK | 80,000.00 | -329.27 | Open | | 1 |
| CF00BHI | World Kitchen | 01/01/2002 | WINSTON | 15,000.00 | 6,762.60 | Open | | 7 |
| CF00EBW | World Publications | 07/28/2003 | KING | 65,000.00 | -884.68 | Open | | 3 |
| CF00F2T | World Publications | 07/28/2003 | KING | 20,000.00 | 0.00 | Open | | 0 |
| CF009HO | World | 09/10/2002 | PAUL | 200,000.00 | -542.19 | Open | | 16 |
| CF00FUM | World | 01/08/2004 | PAUL | 50,000.00 | 0.00 | Open | | 0 |
| CF00EA6 | Worlds | 07/16/2003 | WINSTON | 10,300.00 | 5,949.00 | Open | | 1 |
| | | | Total | 640,300.00 | 271,408.80 | | | |

Invoice Inquiry

| | | | | |
|---|---|---|---|---|
| Invoice Date From | | | Invoice Date To | |
| Invoice No. | | | Invoice Status | All |
| Invoice Amount | Equal to | | Matter No. | |
| Internal Counsel | All | | Matter Name | world |
| Business Segment | All | | Matter Status | All |
| Business Region | All | | Matter Type | All |
| Account Manager | All | | Law Firm | |
| Primary Contact | | | In Queue Since | |
| Billing Team | All | | Deal Actual | |

1020

Search   Reset

Print   Export to Excel

1022

| Invoice No. | Invoice Date | Matter Name | Net Invoice $ | Invoice Status | Status Owner | AM/Primary Contact | Internal Counsel |
|---|---|---|---|---|---|---|---|
| 824869 | 09/22/2003 | Lani | 14,225.09 | Pending | GWENETH | DALE | THEODORE |
| 812448 | 01/13/2003 | Landtr | 2,778.23 | Approved | | JEFFREY | REICH |
| 009241 | 10/31/2002 | Landtr | 4,930.60 | Approved | | JEFFREY | REICH |
| 809361 | 10/31/2002 | Landtr | 13,108.92 | Approved | | JEFFREY | REICH |
| 2085910 | 09/06/2002 | Landtr | 445.17 | Approved | | JEFFREY | REICH |
| 2037450 | 02/14/2002 | Landtr | 490.95 | Approved | | JEFFREY | REICH |
| | | Total | 35,987.04 | | | | |

FIG. 37

Law Firm Entry

1040

* Law Firm
* Street 1
  Street 2
  Street 3
* Country --Select a Country--
* State --Select a State--
* City --Select a City--
* Zip
  Comments

* GSL Number
* Approved  ○ Yes  ● No
  Billing Contact First Name
  Billing Contact Last Name
* Billing Contact Email
  Phone
  Fax → Log Off Save    Reset

* Mandatory Fields

Law Firm Inquiry

GSL Number: 1219101
Lead Lawyer First Name:

Law Firm:
Lead Lawyer Last Name:

[Search] [Reset] [Log Off]

1080

| GSL Number | Law Firm Name | Lawyer First Name | Lawyer Last Name |
|---|---|---|---|
| 1218101 | KING | C | ALFORD |
| 1219101 | KING | B | WALSH |
| 1219101 | KING | B | SLUTSKY |
| 1219101 | KING | G | WOODS |
| 1219101 | KING | S | BORDERS |
| 1219101 | KING | R | TRAMMELL |
| 1219101 | KING | D | WHITE |

FIG. 40

Match Tool

Items Selected For Match

| Source | ABLE ID | Approved/Posting | Invoice Number | Matter Name | Reimbursables | Amount Reimbursed $ | Variance |
|---|---|---|---|---|---|---|---|
| | | | | | Resolve | Dispute | Reset |

WILBER - Approved Invoice Transaction (Pending Data)

Business Segment: All

| | ABLE ID | Invoice Number | Account Manager | Matter Name | Approval Date | Reimbursable $ | Total Paid $ |
|---|---|---|---|---|---|---|---|
| ☐ | 3S | 1334476 | KENNETH | 3S | 01/21/2004 | 14,998.70 | 14,998.70 |
| ☐ | ABBO | 1797603 | JOHN | AB Bo | 01/26/2004 | 519.75 | 519.75 |
| ☐ | ABR | 3051442S | THOMAS | Abr | 01/22/2004 | 1,497.58 | 1,497.58 |
| ☐ | ACC | F330903 | JONATHAN | Acc | 01/15/2004 | 1,760.40 | 1,760.40 |
| ☐ | ACC | F351957 | JONATHAN | Acc | 01/15/2004 | 2,218.84 | 2,218.84 |
| ☐ | ACE | 114161 | SALMAN | King | 01/07/2004 | 95.07 | 95.07 |
| ☐ | AFA | 10546878 | ELLIS | AFA | 01/02/2004 | 326.72 | 326.72 |
| ☐ | AIRC | 10551476 | ELLIS | Air C | 01/06/2004 | 84,780.87 | 84,780.87 |
| ☐ | AIRC | 24006 | JACK | Air C | 02/12/2004 | 3,452.46 | 3,452.46 |
| ☐ | AIRC | 10553367 | JACK | Air C | 02/10/2004 | 10,474.29 | 10,474.29 |
| ☐ | AIRC | 10553372 | JACK | Air C | 02/12/2004 | 40,752.52 | 40,752.52 |
| ☐ | AIRC | 11976 | ELLIS | Air C | 01/06/2004 | 124,837.58 | 124,837.58 |

ORACLE OGL Transactions - ABLE Posting (Pending Data)

| | ABLE ID | Entered DR $ | Month of Posting | Accounted DR $ | Accounted DR $ |
|---|---|---|---|---|---|
| ☐ | 3S | 72,350.00 | | 0.00 | FEB-04 | 72,350.00 | 0.00 |
| ☐ | AA | 2,272.98 | | 0.00 | FEB-04 | 2,272.98 | 0.00 |
| ☐ | AA | 2,836.41 | | 0.00 | FEB-04 | 2,836.41 | 0.00 |
| ☐ | ABBO | 519.75 | | 0.00 | FEB-04 | 519.75 | 0.00 |
| ☐ | ACE | 193.78 | | 0.00 | JAN-04 | 193.78 | 0.00 |
| ☐ | ACE | 1,938.54 | | 0.00 | JAN-04 | 1,938.54 | 0.00 |
| ☐ | ADS | 2,512.55 | | 0.00 | JAN-04 | 2,512.55 | 0.00 |
| ☐ | AFA | 12,182.96 | | 0.00 | FEB-04 | 12,182.96 | 0.00 |
| ☐ | AFA | 326.72 | | 0.00 | JAN-04 | 250.36 | 0.00 |
| ☐ | AGR | 431.27 | | 0.00 | JAN-04 | 330.48 | 0.00 |
| ☐ | AGR | 2,164.69 | | 0.00 | FEB-04 | 2,164.69 | 0.00 |
| ☐ | AIRC | 109,743.48 | | 0.00 | JAN-04 | 84,095.06 | 0.00 |

Match Confirmation

Note : There is variance between two amounts. Please select a reason for variance between amounts. — 1910

○ Rounding Error
○ Currency Translation Error
○ Double Booking Adjustment
○ Valid Discount
○ Other (Comments mandatory)

[ OK ]  [ Cancel ]

FIG. 48

Match Inquiry

From Date: _____  To Date: _____

Invoice Number: _____

Reconciliation Status: [All ▼]  Business Segment: [All ▼]

ABLE ID: _____  Business Region: [All ▼]

[Print] [Export to Excel]　　　　　　　　　[Search] [Reset]

― 1920

| Invoice Number | WILBER DATA ||| | ABLE DATA |||
|---|---|---|---|---|---|---|---|
| | Matter Name | Approved Date | Reimbursable $ | Total Paid $ | ABLE ID | Resolved In | Status |
| 1334432 | Dic | 02/27/2004 | 654.27 | 654.27 | DIC | | Pending |
| 1336914 | Barn | 02/27/2004 | 1,831.55 | 1,831.55 | BAR | | Pending |
| FR203518 | Columbus | 02/27/2004 | 291.50 | 291.50 | COLUMBUS | 03/03/2004 | Resolved |
| 1338995 | Marc | 02/27/2004 | 5,706.05 | 5,706.05 | MARC | | Pending |
| 144171 | Tree | 02/27/2004 | 380.89 | 380.89 | TREE | | Pending |
| 143616 | Imagine | 02/27/2004 | 679.23 | 679.23 | IMAGINE | | Pending |
| 10680924 | TexC | 02/27/2004 | 252.00 | 252.00 | TEXC | 03/03/2004 | Resolved |
| 807190 | Forzan | 02/27/2004 | 9,308.34 | 9,308.34 | FORZAN | | Pending |
| 1338957 | Carm | 02/27/2004 | 708.99 | 708.99 | CARM | | Pending |
| 144248 | Imagine | 02/27/2004 | 1,374.55 | 1,374.55 | IMAGINE | | Pending |

FIG. 49

Monthly Report

Business Segment: All    Business Region: All    Year: 2004    Search

| Month | Status | Invoices: Paid | | | Invoice Amount Paid | | |
|---|---|---|---|---|---|---|---|
| | | Total | Resolved | Pending | Disputed | Total $ | Resolved $ | Pending $ | Disputed $ |
| JAN | Open | 348 | 187 | 155 | 6 | 2,538,384.03 | 807,402.60 | 1,705,044.13 | 25,937.30 |
| FEB | Open | 204 | 108 | 92 | 4 | 1,080,835.57 | 306,762.18 | 731,663.55 | 42,409.84 |
| MAR | Open | 279 | 115 | 164 | 0 | 2,164,698.28 | 576,949.58 | 1,587,748.70 | 0.00 |
| APR | | | | | | | | | |
| MAY | | | | | | | | | |
| JUN | | | | | | | | | |
| JUL | | | | | | | | | |
| AUG | | | | | | | | | |
| SEP | | | | | | | | | |
| OCT | | | | | | | | | |
| NOV | | | | | | | | | |
| DEC | | | | | | | | | |

Note: This report only represents data pertaining to loan reimbursements.

1930

Print  Close

FIG. 50

Drill Down Reconciliation Report

Monthly View : JANUARY    Business Segment: All

| | No. Of Invoices | Total Amount ($) |
|---|---|---|
| Resolved | 187 | 807,402.60 |
| Pending | 155 | 1,705,044.10 |
| Disputed | 6 | 25,937.30 |
| Total | 348 | 2,538,384.00 |

Note: This report only represents data pertaining to charge to loan mode of reimbursement.

1940

Select Year 2004
- Quarter 1
  - January
  - February
  - March
- Quarter 2
- Quarter 3
- Quarter 4

FIG. 51

METHODS AND SYSTEMS FOR MANAGING AND APPROVING LEGAL EXPENSES

BACKGROUND OF THE INVENTION

This invention relates generally to managing expenses and, more particularly, to network-based methods and systems for managing and approving legal expenses related to loan transactions.

Legal fees incurred due to loan transactions typically are charged by lenders to borrowers as part of the cost of the loan. Such legal fees include, for example, the expenses associated with obtaining a legal opinion from a law firm with respect to assets to be utilized as collateral in securing the loan. One lender may utilize multiple law firms, and any one of such firms may provide multiple opinions for many different loans.

There is no known consistent and reliable process for tracking legal expenses related to loan transactions. As a consequence, lenders find it difficult to determine if legal expenses are higher than they should have been or have been on past transactions. Without this information, lenders have difficulty in managing the costs associated with securing opinions and other work performed by law firms.

BRIEF DESCRIPTION OF THE INVENTION

In one aspect, a method for tracking and approving legal expenses incurred by a business entity using a legal budgeting system is provided. The business entity is engaged in the business of providing financial services to a plurality of customers. The method includes creating within the legal budgeting system a legal matter reflecting legal work to be performed by an outside counsel, creating a purchase order for the legal matter including a budgeted amount which is expected to be paid to the outside counsel for performing the legal work, receiving at the legal budgeting system from the outside counsel an invoice including invoice data and an invoice amount for at least a portion of the legal work performed on the legal matter, and prompting an account manager to designate a method of reimbursement for the invoice including at least one of paid at close, charge to good faith, charge to loan, customer to wire money, and a non-reimbursable charge to cost center. The method also includes submitting the invoice using the legal budgeting system to an approval process, validating the approved invoice amount by comparing the approved invoice amount to the budgeted amount, paying the approved invoice amount to the outside counsel, and automatically reconciling the approved invoice amount with an amount recorded in a sub-ledger accounting system of the business entity.

In another aspect, a network-based system for tracking and approving legal expenses incurred by a business entity is provided. The business entity is engaged in the business of providing financial services to a plurality of customers. The system includes a client system comprising a browser, a centralized database for storing information, and a server system configured to be coupled to the client system and the database. The server is further configured to prompt a user associated with the business entity to input into a client system a legal matter reflecting legal work to be performed by an outside counsel, prompt a user to create a purchase order for the legal matter including a budgeted amount which is expected to be paid to the outside counsel for performing the legal work, receive from the outside counsel an invoice including invoice data and an invoice amount for at least a portion of the legal work performed on the legal matter, and prompt an account manager to designate a method of reimbursement for the invoice including at least one of paid at close, charge to good faith, charge to loan, customer to wire money, and a non-reimbursable charge to cost center. The server is further configured to transmit the invoice to at least one client system for an approval process, validate the approved invoice amount by comparing the approved invoice amount to the budgeted amount, pay the approved invoice amount to the outside counsel, and automatically reconcile the approved invoice amount with an amount recorded in a sub-ledger accounting system of the business entity.

In another aspect, a network-based system for tracking and approving legal expenses incurred by a business entity is provided. The business entity is engaged in the business of providing financial services to a plurality of customers. The system includes a workflow management system, an electronic invoice submission system, a purchase order system, and a legal budgeting system in communication with the workflow management system, the electronic invoice submission system, and the purchase order system. The legal budgeting system includes a client system comprising a browser, a centralized database for storing information, and a server system configured to be coupled to the client system and the database. The server is further configured to prompt a user associated with the business entity to input into a client system a legal matter reflecting legal work to be performed by an outside counsel, prompt a user to create a purchase order for the legal matter including a budgeted amount which is expected to be paid to the outside counsel for performing the legal work, receive from the outside counsel an invoice including invoice data and an invoice amount for at least a portion of the legal work performed on the legal matter, and prompt an account manager to designate a method of reimbursement for the invoice including at least one of paid at close, charge to good faith, charge to loan, customer to wire money, and a non-reimbursable charge to cost center. The server is further configured to transmit the invoice to at least one client system for an approval process, validate the approved invoice amount by comparing the approved invoice amount to the budgeted amount, pay the approved invoice amount to the outside counsel, and automatically reconcile the approved invoice amount with an amount recorded in a sub-ledger accounting system of the business entity.

In another aspect, a computer program embodied on a computer readable medium for tracking and approving legal expenses incurred by a business entity is provided. The business entity is engaged in the business of providing financial services to a plurality of customers. The program includes a code segment that prompts a user to input a legal matter reflecting legal work to be performed by an outside counsel and then prompts a user to create a purchase order for the legal matter including a budgeted amount which is expected to be paid to the outside counsel for performing the legal work. The program also includes a code segment that receives from the outside counsel an invoice including invoice data and an invoice amount for at least a portion of the legal work performed on the legal matter, and prompts an account manager to designate a method of reimbursement for the invoice including at least one of paid at close, charge to good faith, charge to loan, customer to wire money, and a non-reimbursable charge to cost center. The program further includes a code segment that transmits the invoice to at least one client system for an approval process, validates the approved invoice amount by comparing the approved invoice amount to the budgeted amount, transmits payment of the approved invoice amount to the outside counsel, and automatically reconciles the approved invoice amount with an amount recorded in a sub-ledger accounting system of the business entity.

BRIEF DESCRIPTION OF THE DRAWINGS

FIG. 7 is an example embodiment of a user interface that displays a matter creation screen for an internal counsel within a WILBER.

FIG. 8 is an example embodiment of a user interface displaying a matter creation screen for non-deal based matters for an internal counsel within a WILBER.

FIG. 10 is an example embodiment of a user interface displaying an invoice approval screen for an internal counsel within a WILBER.

FIG. 11 is an example embodiment of a user interface displaying a matter inquiry screen for an internal counsel within a WILBER.

FIG. 12 is an example embodiment of a user interface displaying a matter inquiry search results page for an internal counsel within a WILBER.

FIG. 14 is an example embodiment of a user interface displaying an invoice inquiry search results page for an internal counsel within a WILBER.

FIG. 16 is an example embodiment of a user interface displaying a matter queue screen for an account manager within a WILBER.

FIG. 17 is an example embodiment of a user interface displaying a paid close screen for an account manager within a WILBER.

FIG. 19 is an example embodiment of a user interface displaying an invoice approval screen for an account manager within a WILBER.

FIG. 20 is an example embodiment of a user interface displaying a matter inquiry page for an account manager within a WILBER.

FIG. 21 is an example embodiment of a user interface displaying a matter inquiry search results screen for an account manager within a WILBER.

FIG. 22 is an example embodiment of a user interface displaying an invoice inquiry screen for an account manager within a WILBER.

FIG. 23 is an example embodiment of a user interface displaying an invoice inquiry search results page to an account manager within a WILBER.

FIG. 25 is an example embodiment of a user interface displaying an invoice queue screen for a P&L approver within a WILBER.

FIG. 26 is an example embodiment of a user interface displaying an invoice approval screen for a P&L approver within a WILBER.

FIG. 27 is an example embodiment of a user interface displaying an invoice inquiry screen for a P&L approver within a WILBER. A1

FIG. 28 is an example embodiment of a user interface displaying an invoice inquiry search results page for a P&L approver within a WILBER.

FIG. 31 is an example embodiment of a user interface that displays a matter creation screen for a legal billing team member within a WILBER.

FIG. 32 is an example embodiment of a user interface displaying an invoice queue screen for a legal billing team member within a WILBER.

FIG. 33 is an example embodiment of a user interface displaying an invoice entry screen for a legal billing team member within a WILBER.

FIG. 34 is an example embodiment of a user interface displaying a matter inquiry screen for a legal billing team member within a WILBER.

FIG. 35 is an example embodiment of a user interface displaying a matter inquiry search results page for a legal billing team member within a WILBER.

FIG. 36 is an example embodiment of a user interface displaying an invoice inquiry screen for a legal billing team member within a WILBER.

FIG. 37 is an example embodiment of a user interface displaying an invoice inquiry search results page for a legal billing team member within a WILBER.

FIG. 38 is an example embodiment of a user interface displaying a law firm inquiry screen for a legal billing team member within a WILBER.

FIG. 39 is an example embodiment of a user interface displaying a lawyer entry screen for a legal billing team member within a WILBER.

FIG. 40 is an example embodiment of a user interface displaying a law firm inquiry screen for a legal billing team member within a WILBER.

FIG. 46 is an example embodiment of a user interface displaying a match tool screen for a finance manager using a WILBER.

FIG. 47 is an example embodiment of a user interface displaying a dispute comment screen for a finance manager using a WILBER.

FIG. 48 is an example embodiment of a user interface displaying a variance comment screen for a finance manager using a WILBER.

FIG. 49 is an example embodiment of a user interface displaying a reconciliation inquiry screen for a finance manager using a WILBER.

FIG. 50 is an example embodiment of a user interface displaying a monthly reconciliation data screen for a finance manager using a WILBER.

FIG. 51 is an example embodiment of a user interface displaying a detailed reconciliation data screen for a finance manager using a WILBER.

DETAILED DESCRIPTION OF THE INVENTION

Figure 1:
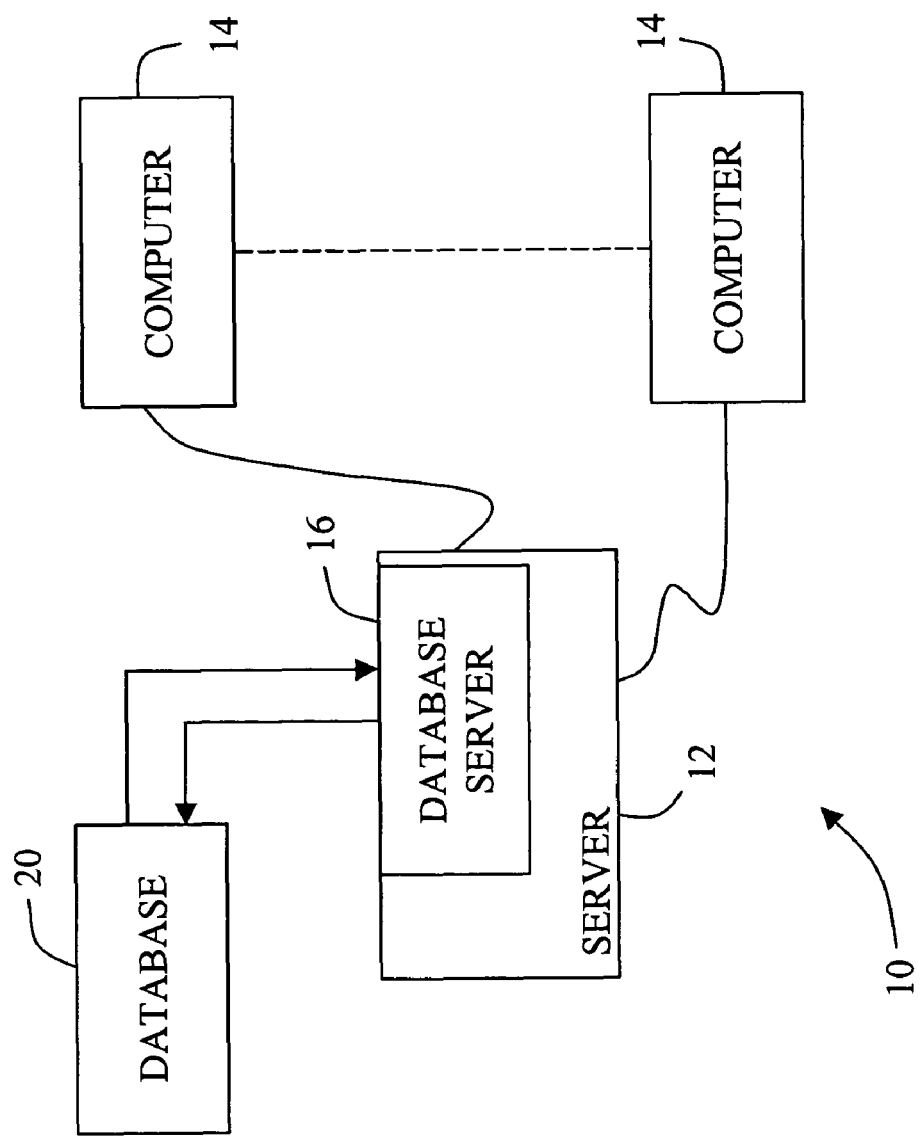
FIG. 1 is a simplified block diagram of a Workflow Initiated Legal Billing Expense Reporting System (WILBER).

Exemplary embodiments of systems and processes that facilitate integrated network-based electronic reporting and workflow process management related to a Workflow Initiated Legal Billing Expense Reporting System (WILBER) are described below in detail. The systems and processes facilitate, for example, electronic submission of information using a client system, automated extraction of information, and web-based reporting for internal and external system users. A technical effect of the systems and processes described herein include at least one of permitting a business entity to manage, budget, track and report all legal expenditures, and reconcile accounts recording legal expenditures. More specifically, in the example embodiment, a business entity that is engaged in the business of providing financial services, including, but not limited to, loans and financial leases, to a client would utilize WILBER to manage, budget, track and report all legal expenditures incurred by the business entity as part of providing the financial services to the client, and would utilize WILBER to reconcile entries recorded in the business entity's sub-ledger accounting system.

In the example embodiment, WILBER is utilized to collect, track, display, and disseminate real time information regarding legal expenditures for a business entity. The systems and processes described herein generally include the following steps: matter creation, paid at close, invoice receipt, invoice allocation and reimbursement, invoice approval, law firm payment, and reporting. At least some of the parties that may be involved in these systems and processes include outside counsel (also referred to as a vendor), internal counsel, billing team, an account manager, and a finance manager. Outside counsel refers to outside law firms who work on the legal services outsourced by the business entity and who get paid by the business entity. Internal counsel refers to the internal lawyers within the business entity who are involved in the matter creation and invoice approval process. The billing team are typically employees of the business entity that handle matter creation, invoice creation, and invoice approval. Account managers are also typically employees of the business entity and are involved in the invoice approval process. Finance managers are typically employees of the business entity and are involved in the account reconciliation process.

For example, the business entity may offer various types of loans to their clients such as asset-based loans or cash-based loans. Such financial services require legal activities, which may be related to loan processing (referred to herein as deal related) or may relate to various other legal engagements (referred to herein as non-deal related). Deal related legal activities may include at least one of sanctioning an asset-based loan, tracking the status of the client, bankruptcy proceedings related to the client, and workout. Deal related legal activities, such as sanctioning loans and tracking loans, are typically paid by the business entity, which then is reimbursed by the client. Non-deal related legal activities may include at least one of general litigation matters, and corporate compliance. Non-deal related legal activities are typically paid by the business entity and are not reimbursed by the client.

In the example embodiment, a legal engagement is also referred to as a matter. Matters can be deal related or non-deal related. A matter is created using the systems and processes described herein when the business entity requires outside counsel. Deal related matters arise when a deal (or financial offering) involving the business entity requires outside counsel. In the example embodiment, there are a plurality of deal related matters including at least one of new financing, portfolio administration, as well as big events that include bankruptcy and workout. Non-deal related matters may also arise including general litigation, and corporate compliance.

At a deal closing, monies are oftentimes disbursed to the outside counsel to cover legal expenses. This amount, referred to as "Paid at Close", must be captured in WILBER so that when invoices are received at the business entity from the outside counsel, the business entity can adjust the invoice as needed based upon the previously disbursed amounts.

In the example systems and processes, invoices may be received and entered into WILBER either manually or electronically. Once the invoice is in WILBER, the method of reimbursement for the invoice must be indicated. The methods of reimbursement include at least one of paid at close, charge to good faith, charge to loan, customer wire, and a non-reimbursable charge to a cost center at the business entity. The method of non-reimbursement include a full or partial charge to a cost center at the business entity.

After the method of reimbursement is indicated, the invoices are routed for electronic approval using WILBER. In the example embodiment, the invoices are routed from the account manager to the internal counsel and the billing team. In the event of a non-reimbursable charge, the invoice is routed to a P&L (Profit & Loss) approver after being reviewed by an account manager.

Once invoices are approved within WILBER, the accounts payable department of the business entity then pays the outside counsel. WILBER also enables users to generate detailed reports on matters as well as on invoices fully approved through the billing team. WILBER also enables users to generate a plurality of reports including at least one of budget reports, budget versus actual reports, and budget versus non-reimbursable charges.

In the example embodiment, in the case where the invoice includes a reimbursable legal expense (i.e., charge to loan+ customer wire), the reimbursable legal expense is recorded by the business entity in its sub-ledger accounting system. The sub-ledger accounting system may include, for example, a commercially available system such as ABLE. ABLE is a known and commercially available software program manufactured by Computer and Software Enterprises, Inc., San Luis Obispo, Calif. ABLE stands for Asset Based Lending Environment ("ABLE") and is a collateral and accounting sub-ledger system. Although ABLE is shown in the example embodiment, WILBER does not require ABLE as its sub-ledger system. Rather, WILBER can utilize and interface with a plurality of known and commercially available sub-ledger systems. For convenience purposes, the example embodiment discussed herein will include the ABLE sub-ledger system. After the invoice is approved in WILBER, the business entity utilizes WILBER to reconcile entries recorded in the business entity's sub-ledger accounting system. All invoices that are automatically matched by WILBER (i.e., matching invoices recorded in the sub-ledger with invoices listed in WILBER) are marked as "resolved". Invoices that are not automatically matched by WILBER are marked "pending" and must be resolved by a finance manager.

In one embodiment, a computer program is provided, and the program is embodied on a computer readable medium and utilizes a Structured Query Language (SQL) with a client user interface front-end for administration and a web interface for standard user input and reports. In an exemplary embodiment, the system is web enabled and is run on a business-entity intranet. In yet another embodiment, the system is fully accessed by individuals having an authorized access outside the firewall of the business-entity through the Internet. In a further exemplary embodiment, the system is being run in a Windows® NT environment (Windows is a registered trademark of Microsoft Corporation, Redmond, Wash.). The application is flexible and designed to run in various different environments without compromising any major functionality.

The systems and processes are not limited to the specific embodiments described herein. In addition, components of each system and each process can be practiced independent and separate from other components and processes described herein. Each component and process also can be used in combination with other assembly packages and processes.

FIG. 1 is a simplified block diagram of a Workflow Initiated Legal Billing Expense Reporting System (WILBER) 10 including a server system 12, and a plurality of client sub-systems, also referred to as client systems 14, connected to server system 12. WILBER 10 is also referred to sometimes as a Legal Expenditure Billing and Budgeting (LEBB) system. Computerized modeling and grouping tools, as described below in more detail, are stored in server 12 and can be accessed by a requester at any one of computers 14. In one embodiment, client systems 14 are computers including a web browser, such that server system 12 is accessible to client systems 14 using the Internet. Client systems 14 are interconnected to the Internet through many interfaces including a network, such as a local area network (LAN) or a wide area network (WAN), dial-in-connections, cable modems and special high-speed ISDN lines. Client systems 14 could be any device capable of interconnecting to the Internet including a web-based phone, personal digital assistant (PDA), or other web-based connectable equipment. A database server 16 is connected to a database 20 containing information on a variety of matters, as described below in greater detail. In one embodiment, centralized database 20 is stored on server system 12 and can be accessed by potential users at one of client systems 14 by logging onto server system 12 through one of client systems 14. In an alternative embodiment, database 20 is stored remotely from server system 12 and may be non-centralized.

Figure 2:
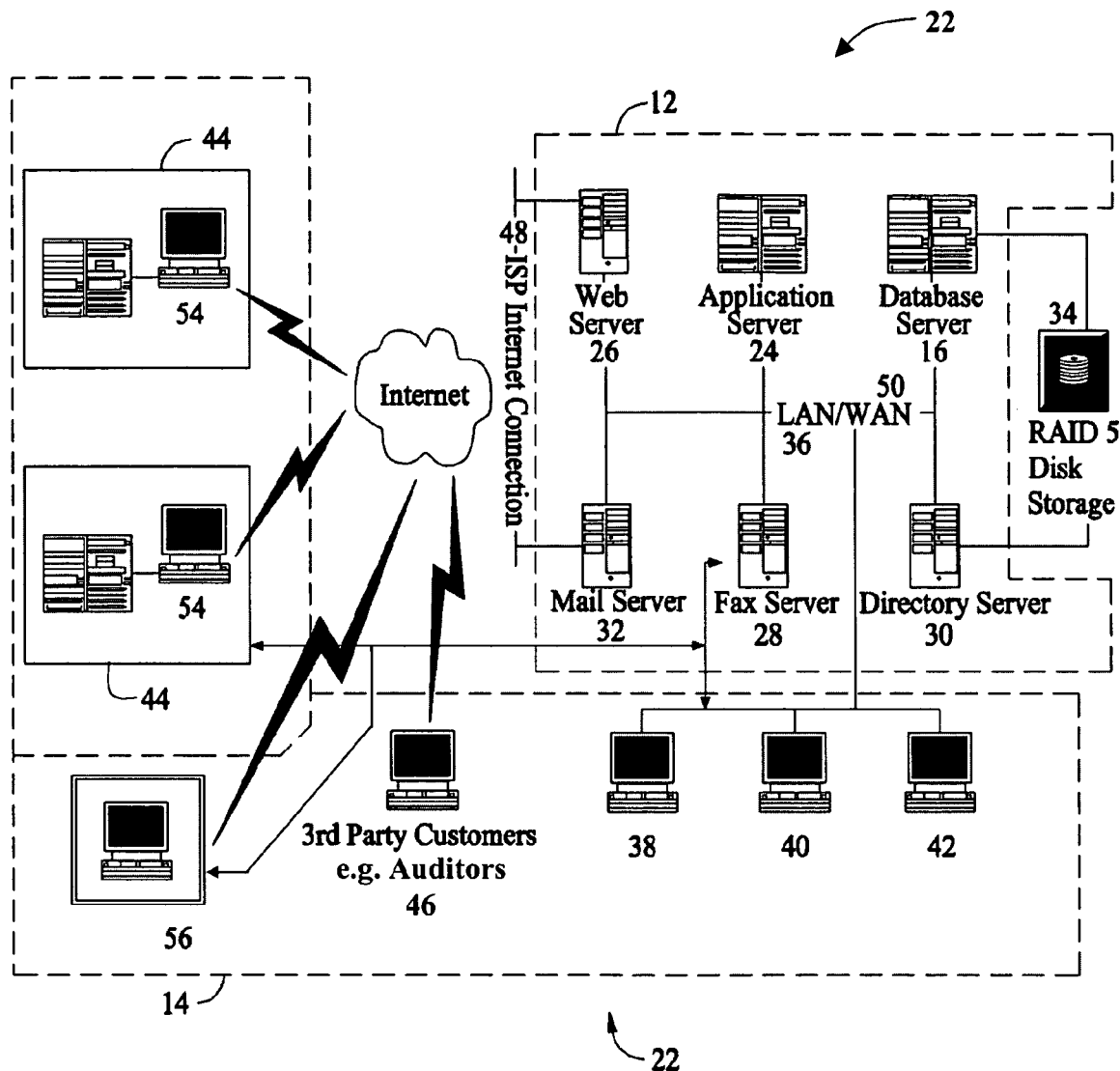
FIG. 2 is an expanded block diagram of an exemplary embodiment of a server architecture of a WILBER.

FIG. 2 is an expanded block diagram of an exemplary embodiment of a server architecture of a WILBER 22. Components in system 22, identical to components of system 10 (shown in FIG. 1), are identified in FIG. 2 using the same reference numerals as used in FIG. 1. System 22 includes server system 12 and client systems 14. Server system 12 further includes database server 16, an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator's workstation 38, a user workstation 40, and a supervisor's workstation 42 are coupled to LAN 36. Alternatively, workstations 38, 40, and 42 are coupled to LAN 36 using an Internet link or are connected through an Intranet.

Each workstation, 38, 40, and 42 is a personal computer having a web browser. Although the functions performed at the workstations typically are illustrated as being performed at respective workstations 38, 40, and 42, such functions can be performed at one of many personal computers coupled to LAN 36. Workstations 38, 40, and 42 are illustrated as being associated with separate functions only to facilitate an understanding of the different types of functions that can be performed by individuals having access to LAN 36.

Server system 12 is configured to be communicatively coupled to various individuals, including employees 44 and to third parties, e.g., clients/customers, 46 using an ISP Internet connection 48. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 50, local area network 36 could be used in place of WAN 50.

In the exemplary embodiment, any authorized individual having a workstation 54 can access WILBER 22. At least one of the client systems includes a manager workstation 56 located at a remote location. Workstations 54 and 56 are personal computers having a web browser. Also, workstations 54 and 56 are configured to communicate with server system 12. Furthermore, fax server 28 communicates with remotely located client systems, including a client system 56 using a telephone link. Fax server 28 is configured to communicate with other client systems 38, 40, and 42 as well.

Figure 3:
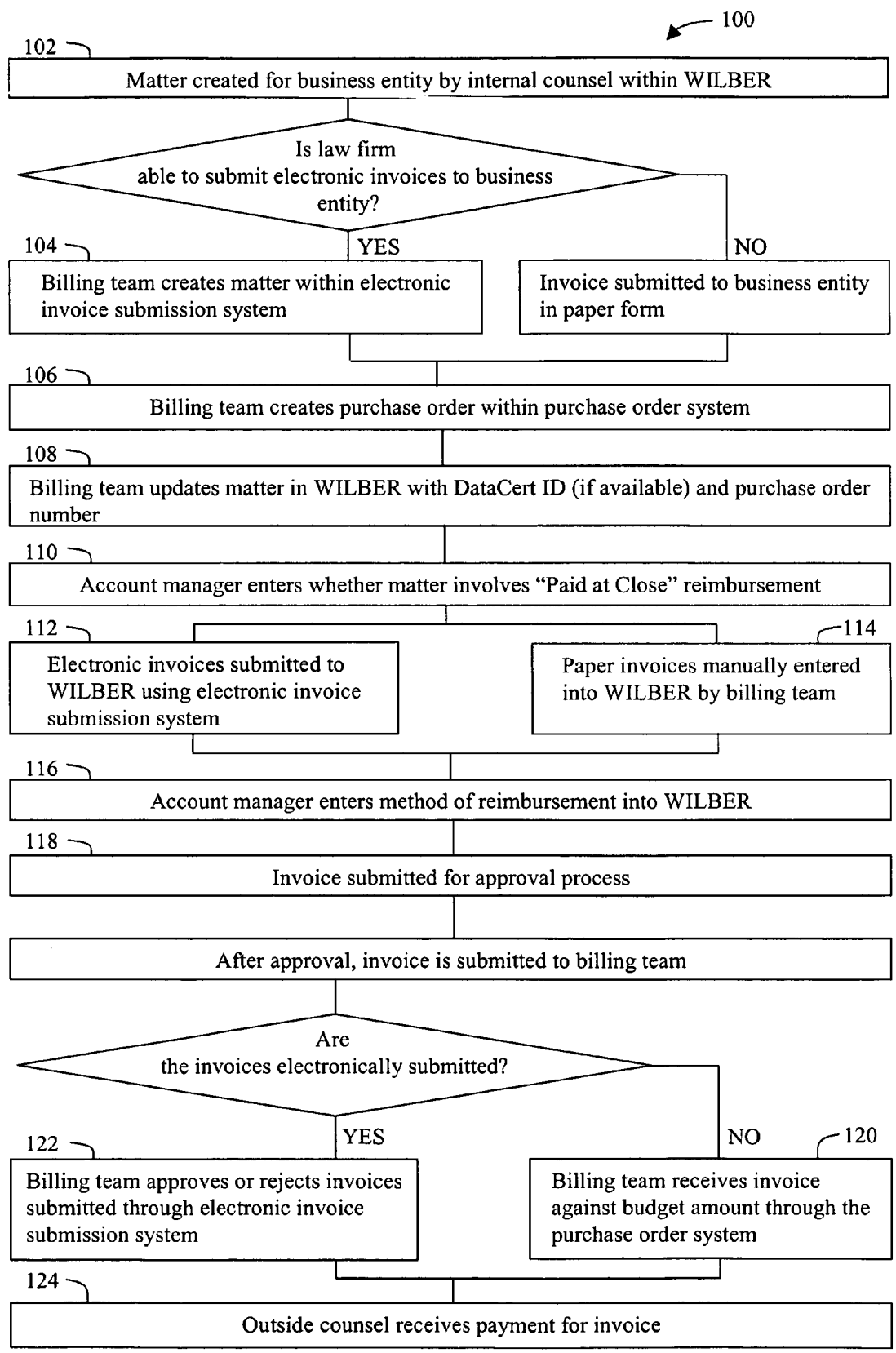
FIG. 3 is a flowchart illustrating exemplary processes utilized by a WILBER.

FIG. 3 is a flowchart 100 illustrating exemplary processes utilized by WILBER 10 (shown in FIG. 1). The technical effect of the processes and systems described herein is achieved when the business entity creates 102 a matter within WILBER 10. The business entity creates 102 a matter within WILBER 10 when the business entity engages outside counsel for performing legal activities. The matter is created by internal counsel. Internal counsel may also revise a matter. If the law firm assigned to the matter created is capable of submitting invoices to the business entity using an electronic invoice submission system, the billing team then creates 104 a matter within the electronic invoice submission system. In the example embodiment, the electronic invoice submission system is a commercially available computer system known as DataCert® (DataCert is an electronic invoicing system manufactured by DataCert, Inc., Houston, Tex.; DataCert is also a registered trademark of DataCert, Inc.). If, however, the law firm assigned to the matter created does not have access to DataCert®, a matter is not set up within DataCert®, but instead, the invoice will be submitted to the business entity in paper form.

Once the matter is created, the billing team then creates 106 a purchase order within a purchase order system. In the example embodiment, the purchase order system is a commercially available system manufactured by Oracle® known as Oracle PO. (Oracle PO is a purchase order system manufactured by Oracle Corporation, Redwood City, Calif.; Oracle is a registered trademark of Oracle Corporation.) The purchase order includes a budgeted amount which is expected to be paid to the outside counsel for performing legal activities. The billing team then updates 108 the matter in WILBER 10 by providing a DataCert ID (if available) and a purchase order number.

An account manager then enters 110 into WILBER 10 whether the matter involves a "Paid at Close" reimbursement.

Outside counsel then submits the invoice to the business entity. The invoice is either an electronic submission 112 or a paper submission 114. Invoices submitted electronically are submitted using DataCert® E-invoice and are automatically fed into WILBER 10. Invoices that are submitted in paper form are manually entered into WILBER 10 by the billing team.

Once the invoices are received within WILBER 10, an account manager then must indicate 116 a method of reimbursement by entering reimbursement information into WILBER 10. In the example embodiment, a method of reimbursement includes at least one of paid at close, charge to good faith, charge to loan, and customer wires money. The method of non-reimbursement include a full or partial charge to a cost center at the business entity. In the example embodiment, an internal counsel must indicate a method of reimbursement for manual, non-deal based invoices. These types of invoices are typically charged to the cost center.

After the account manager indicates the method of reimbursement, the invoice is submitted 118 for the approval process. In the example embodiment, the approval process is based on an amount hierarchy. The amount hierarchy includes an approval by at least one of an account manager, a P&L approver, a first internal counsel, a second internal counsel, and a chief legal counsel. The P&L approver approves the invoice only if the cost center is charged confirming non-reimbursable expenses. The first internal counsel, the second internal counsel, and the chief legal counsel review and approve the invoice based upon an amount hierarchy.

In the example embodiment, the account manager, the P&L approver, the first internal counsel, the second internal counsel, and the chief legal counsel may also reject the invoice or a portion of the invoice during the approval process.

After the approval process, the invoice is submitted to the legal billing team. In the case of manual invoices, the billing team receives 120 the invoice against the budget amount through the purchase order system. The purchase order system is integrated with the accounts payable system of the business entity which processes the payment and then pays the amount to the law firm. In the case of electronically received invoices through DataCert®, the billing team approves or rejects 122 the invoice submitted in DataCert®. DataCert® is integrated with the accounts payable system of the business entity, which then processes the payment so that payment may be made to the law firm. The outside counsel then receives 124 payment.

In the example embodiment, WILBER 10 also enables a user to generate reports on matters and on invoice data stored within the system. WILBER 10 also enables a user to reconcile entries recorded in the business entity's sub-ledger accounting system.

Figure 4:
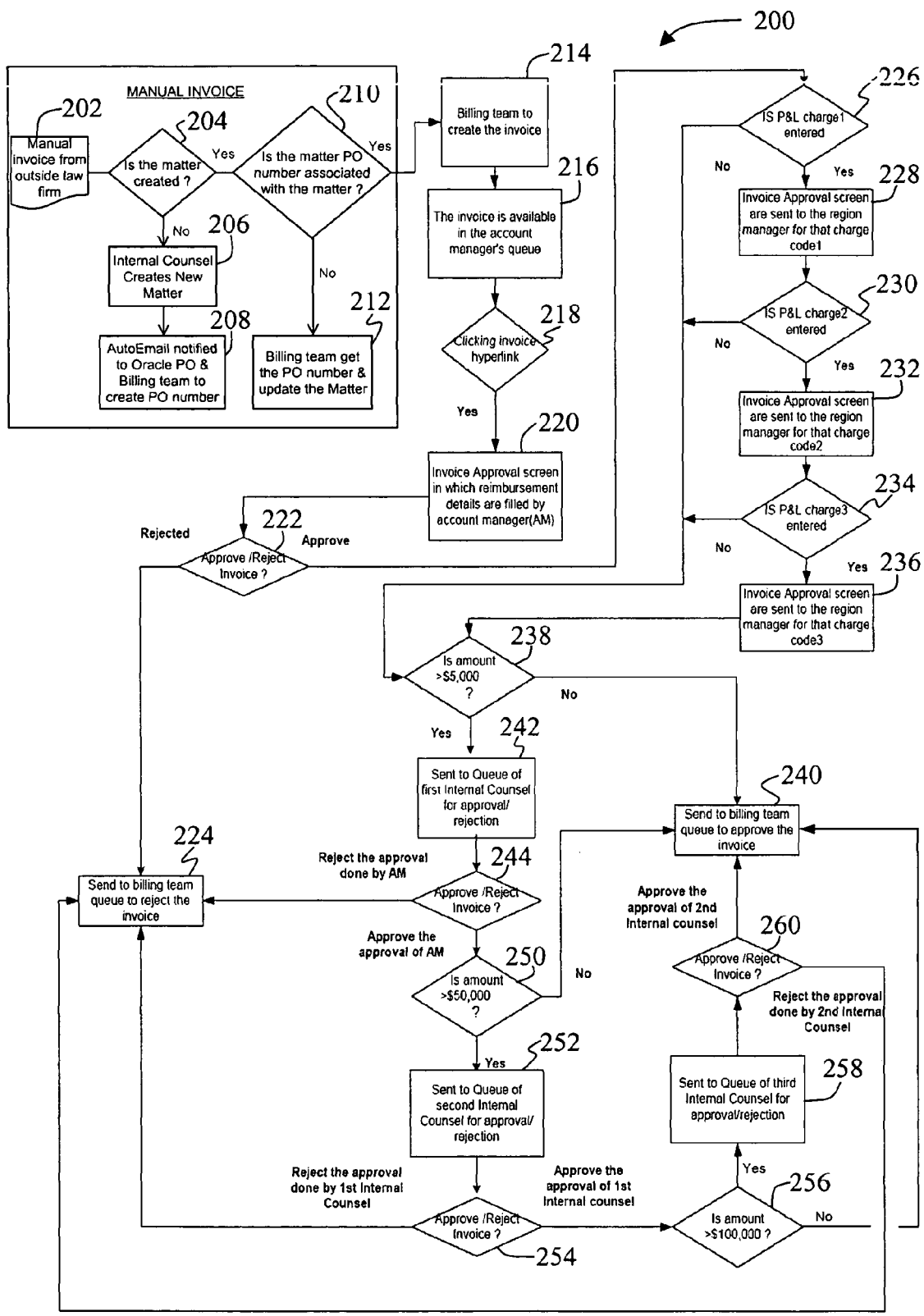
FIG. 4 is a more detailed flowchart illustrating exemplary processes utilized by a WILBER.

FIG. 4 is a more detailed flowchart 200 illustrating exemplary processes utilized by WILBER 10 (shown in FIG. 1). Flowchart 200 illustrates a manual invoice received from an outside law firm at the business entity. As explained above, WILBER 10 also is capable of receiving an electronic invoice utilizing an electronic invoice submission system known as DataCert®. For purposes of flowchart 200, the invoices are shown as being manually received at WILBER 10.

The technical effect of WILBER 10 is achieved by receiving 202 an invoice at WILBER 10 for processing. After receiving the invoice, WILBER 10 determines 204 whether a matter has been created. If no matter has been created, internal counsel creates 206 a new matter, and an automatic e-mail is transmitted 208 notifying the purchase order system, for example, the Oracle® PO system, and the billing team to create a purchase order number. If, however, WILBER 10 determines 204 that the matter has been created, then WILBER 10 determines 210 whether a matter purchase order number is associated with the matter. If the matter purchase order number is not associated with the matter, then the billing team retrieves 212 the purchase order number and updates the matter.

Once the purchase order number is associated with the matter, the billing team is prompted to create 214 the invoice within WILBER 10. The invoice then becomes available 216 in an account manager's queue. By clicking 218 on the invoice hyperlink, the account manager can access 220 the invoice approval screen in which reimbursement details are filled in by the account manager. The account manager can then either reject or approve 222 the invoice. If the account manager rejects the invoice, the system sends 224 to the billing team queue the rejected invoice.

If, however, the account manager approves the invoice with a full or partial non-reimbursable expense, the system then determines 226 whether a P&L charge No. 1 has been entered. If a P&L charge No. 1 has not been entered, the system forwards the invoice to the approval process. If, however, a P&L charge No. 1 has been entered, the system sends 228 an invoice approval screen to a regional manager for a charge code No. 1 invoice approval. The system then determines 230 whether a P&L charge No. 2 has been entered. If a P&L charge No. 2 has not been entered, the system forwards the invoice to the approval process. If, however, a P&L charge No. 2 has been entered, the system sends 232 an invoice approval screen to the regional manager for a charge code No. 2. The system then determines 234 whether a P&L charge No. 3 has been entered. If a P&L charge No. 3 has not been entered, the system forwards the invoice to the invoice approval process. If, however, a P&L charge No. 3 has been entered, the system sends 236 an invoice approval screen to the regional manager for a charge code No. 3. The system then forwards the invoice to the invoice approval process.

The invoice approval process begins by determining 238 whether the invoice is a deal-related legal activity and has an amount greater than $5,000. If a deal-related invoice amount is less than $5,000, it is sent to an account manager to indicate a method of reimbursement by entering reimbursement information into WILBER 10. The invoice is then sent 240 to the billing team queue to approve the invoice. If, however, a deal-related invoice amount is greater than $5,000, then the invoice is sent 242 to a queue of the first internal counsel for approval or rejection 244 after the account manager has indicated a method of reimbursement. If the first internal counsel rejects the approval done by the account manager, the system sends 224 the invoice to a billing team queue to reject the invoice. Non-deal related legal activities regardless of amount go directly to the internal counsel for both a method of reimbursement as well as invoice approval.

If, however, the first internal counsel approves the invoice, the system then determines 250 whether the invoice amount is greater than $50,000. If the invoice amount is less than $50,000, then the system sends 240 the invoice to the billing team queue to approve the invoice. If, however, the invoice is greater than $50,000, then the system sends 252 the invoice to the queue of a second internal counsel for approval or rejection 254.

If the second internal counsel fully rejects the approval done by the first internal counsel, the invoice is sent 224 to the billing team queue to reject the invoice. If, however, the second internal counsel approves the approval of the first internal counsel, the system then determines 256 whether the invoice value is greater than $100,000. If the invoice amount is less than $100,000, then the system sends 240 the invoice to the billing team queue to approve the invoice. If, however, the invoice amount is greater than $100,000, then the system sends 258 the invoice to the queue of a third internal counsel for approval or rejection 260. If the third internal counsel fully rejects the approval done by the second internal counsel, the system sends 224 the invoice to billing team queue to reject the invoice. If, however, the third internal counsel approves the approval of the second internal counsel, the system sends 240 the invoice to the billing team queue to approve the invoice. The invoice amount approved is then paid to the outside counsel law firm.

Internal Counsel

Figure 5:
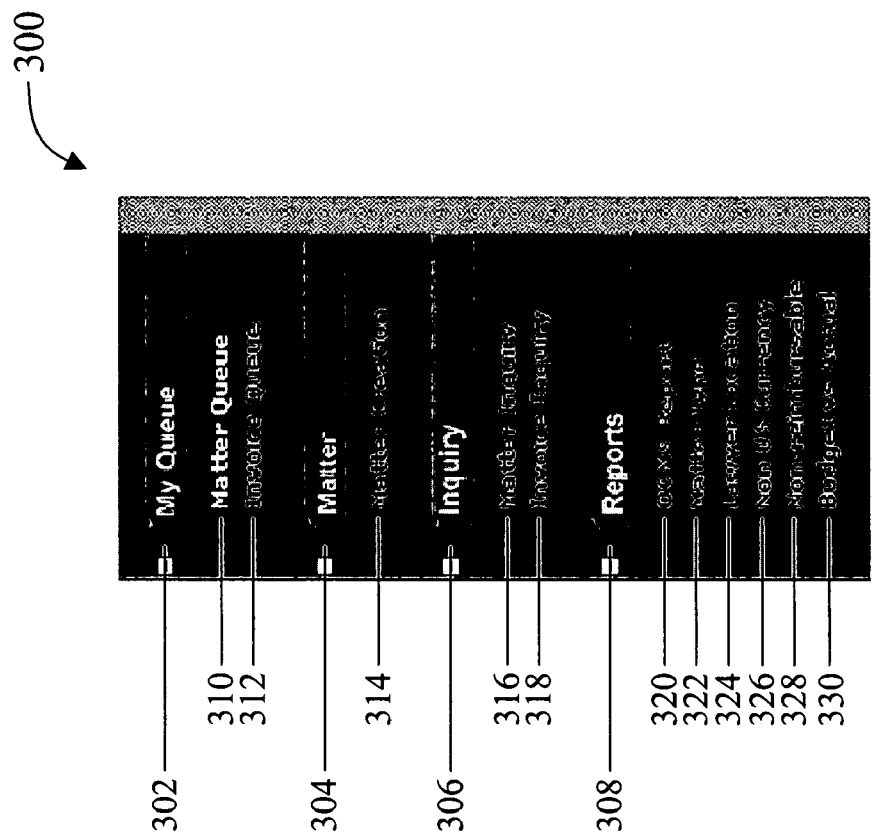
FIG. 5 is an example embodiment of a left navigation bar displayed for an internal counsel within a WILBER.

FIG. 5 is an example embodiment of a left navigation bar 300 displayed for an internal counsel within WILBER 10 (shown in FIG. 1) after the internal counsel has logged onto WILBER 10. Navigation bar 300 includes a my queue link 302, a matter link 304, an inquiry link 306, and a reports link 308. My queue link 302 also includes a matter queue 310 and an invoice queue 312. Matter link 304 includes a matter creation link 314. Inquiry link 306 includes matter inquiry link 316, and an invoice inquiry link 318. Reports link 308 further includes an OCMS (Outside Counsel Management System) report link 320, a matter type report link 322, a lawyer location report link 324, a non-US currency report link 326, a non-reimbursable report link 328, and a budget vs. actual report link 330.

Upon logging into WILBER 10, my queue 302 is displayed in WILBER 10. The queue lists actions to be completed by the user. What is displayed in the queue for the user is reflective of the user's role in the legal billing process. Additionally, the functions provided in navigation bar 300 are also based upon the role the user is filling in the billing process.

In the example embodiment, my queue link 302 lists actions to be completed by an internal counsel. Matter queue link 310 allows a user to create, revise, and update matters. Invoice queue link 312 enables a user to approve invoices. Matter link 304 enables a user to create a new matter in WILBER 10. Matter creation link 314 enables the user to create matters. Inquiry link 306 enables a user to search for matters and invoices based upon designated criteria. An internal counsel can see all matters and all invoices entered into WILBER 10. Reports link 308 provides a user with a listing of reports included within WILBER 10.

In the example embodiment, a matter is any engagement that the business entity gives to an outside law firm. There are two categories of matters included within WILBER 10: deal based matters and non-deal based matters. Within WILBER 10, typical matter types may include at least one of the following: bankruptcy administration and litigation-agented; bankruptcy administration and litigation-participation; compliance-corporate; defensive litigation; general research-corporate; human resources; intellectual property (other IP and IT); intellectual property (patents, copyrights, trademarks); international; M&A (business development work); new financing transaction (ABL); new financing transaction (cash flow); new financing transaction (DIP); new financing transaction (equity); new financing transaction (exit financing); new financing transaction (factoring); new financing transaction (other specialized finance); new financing transaction (participation); new financing transaction (securitization); offensive litigation; other miscellaneous; portfolio administration-agented deal; portfolio administration-participation; portfolio administration-workout group; workout-agented deal; workout-CAQ; workout-participation; distressed debt trades; distressed debt document review and trades; par primary doc review; and par secondary doc review.

Deal-related matter activities are tied to a financing transaction and arise when the business entity requires outside legal counsel. In the example embodiment, two typical deal based matter types include new financing transaction matters and portfolio administration matters. The triggers for these two types of matters are events that occur in a workflow management system. For example, the workflow management system may be a system as described in U.S. Pat. No. 6,618,730 assigned to GE Capital Commercial Finance, Inc., Stamford, Conn. As a result of these deal related events, baseline data is populated into WILBER 10 for further revision and update. For other types of big events, related to transactions such as bankruptcy or workout, the workflow management system does not trigger the creation of a matter. Rather, the internal counsel or a legal billing team member must log into WILBER 10 and create the matter manually.

Non-deal based matters, such as corporate compliance and human resources, are typically not tied to a specific financing transaction and are entered manually into WILBER 10 by either an internal counsel or a billing team member. The workflow management system is not the trigger for these types of matters. All invoices for all non-deal related legal activities are first routed to an internal counsel.

Figure 6:
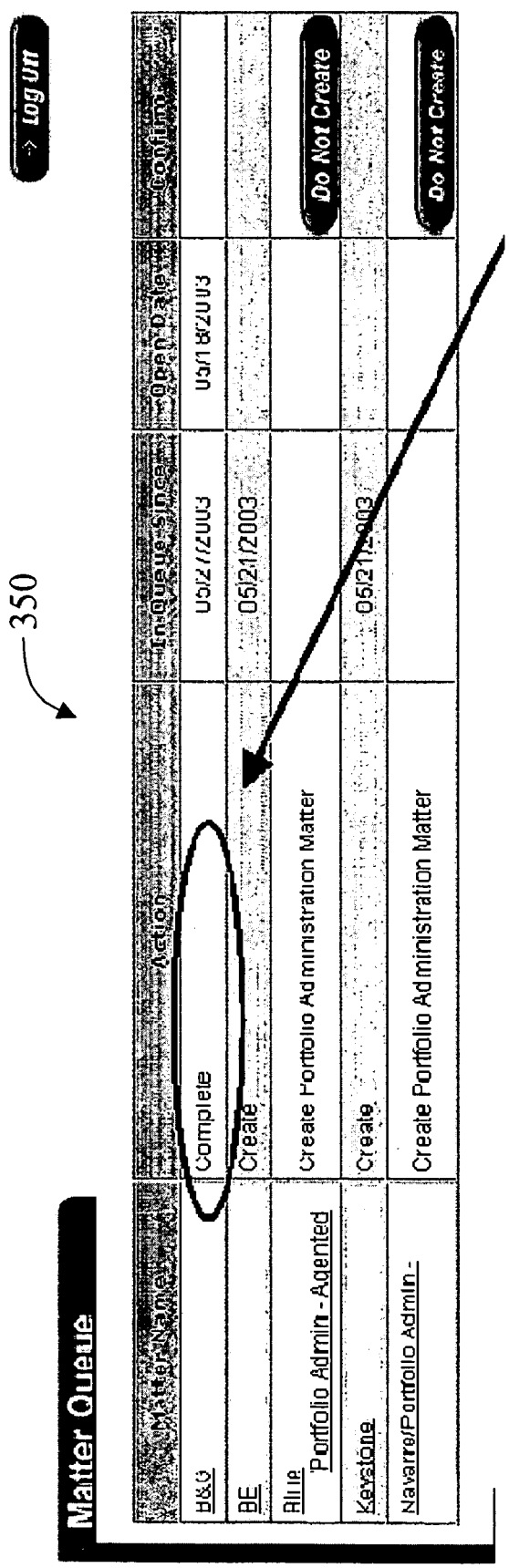
FIG. 6 is an example embodiment of a user interface displaying a matter queue for an internal counsel within a WILBER.

FIG. 6 is an example embodiment of a user interface 350 displaying a matter queue for an internal counsel within WILBER 10 (shown in FIG. 1). Matter queue 350 is displayed after an internal counsel selects matter queue link 310 (shown in FIG. 5). From matter queue 350, a user can create a new matter.

In the example embodiment, when working on a new transaction, an account manager sets up the deal and the associated timeline for the deal in a workflow management system. When a pitch approval stage is reached in the workflow management system, WILBER 10 searches for a presentation that is approved and carries a completion date. In the example embodiment, this is the trigger for the creation of a new financing transaction matter within WILBER 10. The matter is pre-populated with basic deal details from the workflow management system such as customer name, account manager, region manager, internal counsel or business lead lawyer, business segment, business region, charge code and open date. The new transaction is then placed in the queue of the selected internal counsel.

FIG. 7 is an example embodiment of a user interface 360 that displays a matter creation screen for an internal counsel within WILBER 10 (shown in FIG. 1). User interface 360 is displayed after an internal counsel selects a matter name to be created from user interface 350 (shown in FIG. 6). In the example embodiment, user interface 360 includes a customer name data field, a matter type pull-down list, a matter details data field, a business segment pull-down list, a business region pull-down list, a primary contact pull-down list, a legal counsel pull-down list, a charge code data field, a finance manager data field, a portfolio analyst pull-down list, a P&L approver pull-down list, a billing team pull-down list, an open date data field, a closed date data field, a closed matter checkbox, good faith radio buttons, good faith project code pull-down list, a DataCert matter ID data field, an LEBB matter ID data field, a matter category data field, a special handling checkbox, and a notes data section.

In the example embodiment, user interface 360 also displays an external law firm section 362. External law firm section 362 shows the law firm assigned to the matter. External law firm section 362 includes a law firm name, a lead lawyer, a city and state, a P.O. number, a budget amount, and a reimbursable type. User interface 360 also includes an add law firm link 364 which enables an internal counsel to add multiple law firms to a matter.

In the example embodiment, with a new financing matter, all fields included within user interface 360 are populated from the workflow management system with the exception of matter type, billing team member, good faith radio button, good faith project code, and notes.

If the external law firm added to a matter is registered in DataCert®, the matter will then go to a billing team member's queue such that the matter may be created in DataCert® and then updated within WILBER 10 with the DataCert matter ID, and then the purchase order created in the purchase order system is confirmed within WILBER 10. If the external law firm added to the matter is not registered in DataCert®, the matter then goes to the billing team member's queue for purchase order creation in the purchase order system and then the matter is updated within WILBER 10 with the purchase order number.

In the example embodiment, if the billing team does not timely create a DataCert matter and enter it into WILBER 10 appropriately, all incoming invoices for that matter are held by WILBER 10 at an interface failure page until the DataCert matter number is properly entered into WILBER 10.

WILBER 10 also prompts an internal counsel to create a portfolio administration matter 60 days after the completed creation of a new financing matter. The internal counsel creates the portfolio administration matter by accessing matter queue 350 (shown in FIG. 6). The created portfolio administration matter will be listed as an action matter next to a matter name in matter queue 350. By clicking on the matter name, the internal counsel displays matter creation user interface 360. The user then selects portfolio administration type from the matter type pull-down list. In the example embodiment, for portfolio administration matters, a nightly process runs and identifies any new financing matters that have been completed 60 days after a new volume deal set-up. When the process finds such an item, it triggers the creation of a portfolio administration matter within WILBER 10. The internal counsel accesses the matter using the matter name link in my queue 302 (shown in FIG. 5). Upon clicking the link, WILBER 10 creates a new matter by copying all the data from the original new financing transaction matter. Upon review and submission of the matter in WILBER 10, the matter will go to the billing team member's queue. The internal counsel will also assign an external law firm to the portfolio administration matter. The external law firm will also have to submit a legal budget for the matter. Once mandatory fields are executed and the matter is submitted to WILBER 10, the matter is removed from the matter queue of the internal counsel.

For other types of deal related big events, such as bankruptcy or workout, the internal counsel must log into WILBER 10 and create a new matter. In these cases, there are no triggers from the workflow management system to pre-populate fields into the matter creation screen. Further, there is no item placed in the queue of the internal counsel. In lieu of reviewing my queue 302, the internal counsel goes directly to the matter creation link 314 (shown in FIG. 5) for these types of matters. After selecting matter creation link 314, matter creation screen 360 is displayed without any of the fields pre-populated, enabling the user to create a new deal based big event matter other than a new financing transaction or portfolio administration matter. If the external law firm added to this matter is registered in DataCert®, the matter will then go to the billing team member's queue such that the matter may be created in DataCert® and the matter is then updated in WILBER 10 with the DataCert matter ID, and the purchase order created in the purchase order system is confirmed in WILBER 10. If the billing team does not create a DataCert matter timely, incoming invoices will be captured in an interface failure page until a DataCert matter number is entered. If the external law firm added to the matter is not registered in DataCert®, the matter will then go to the billing team member's queue for purchase order creation within the purchase order system and then the matter is updated within WILBER 10 with the purchase order number.

WILBER 10 also enables a user to update a budget amount for a matter included within WILBER 10. In such a case, the internal counsel will be informed that a matter is over budget when an invoice is approved that exceeds the existing budget amount. The internal counsel will have the option of rejecting the invoice or proceeding directly within external law firm section 362. The internal counsel then adjusts the budget amount displayed within external law firm section 362. The internal counsel then submits the updated budget amount to WILBER 10, and both the budget and the triggering invoice are approved and submitted.

In the example embodiment, an increase budget amount action is created for a matter if the total invoice amount for a particular law firm is greater than the currently allocated budget for that law firm. The increase budget action will appear in the internal counsel's queue for modification. The internal counsel accesses the matter using the matter name in my queue 302. This type of matter is always denoted by an action of "increase budget". Upon clicking the matter link, WILBER 10 opens the matter creation screen for editing purposes.

WILBER 10 also enables an internal counsel to revise a matter. For example, if an internal counsel does not complete all the required fields when creating a matter, the matter remains in my queue 302 for that internal counsel until all mandatory fields are completed. The matter is not routed to the selected billing team member for further processing. The internal counsel accesses the matter using the matter name in matter queue 310. This type of matter is denoted by an action of "complete". Upon clicking the matter link, WILBER 10 opens matter creation screen 360 for editing purposes.

Figure 8:
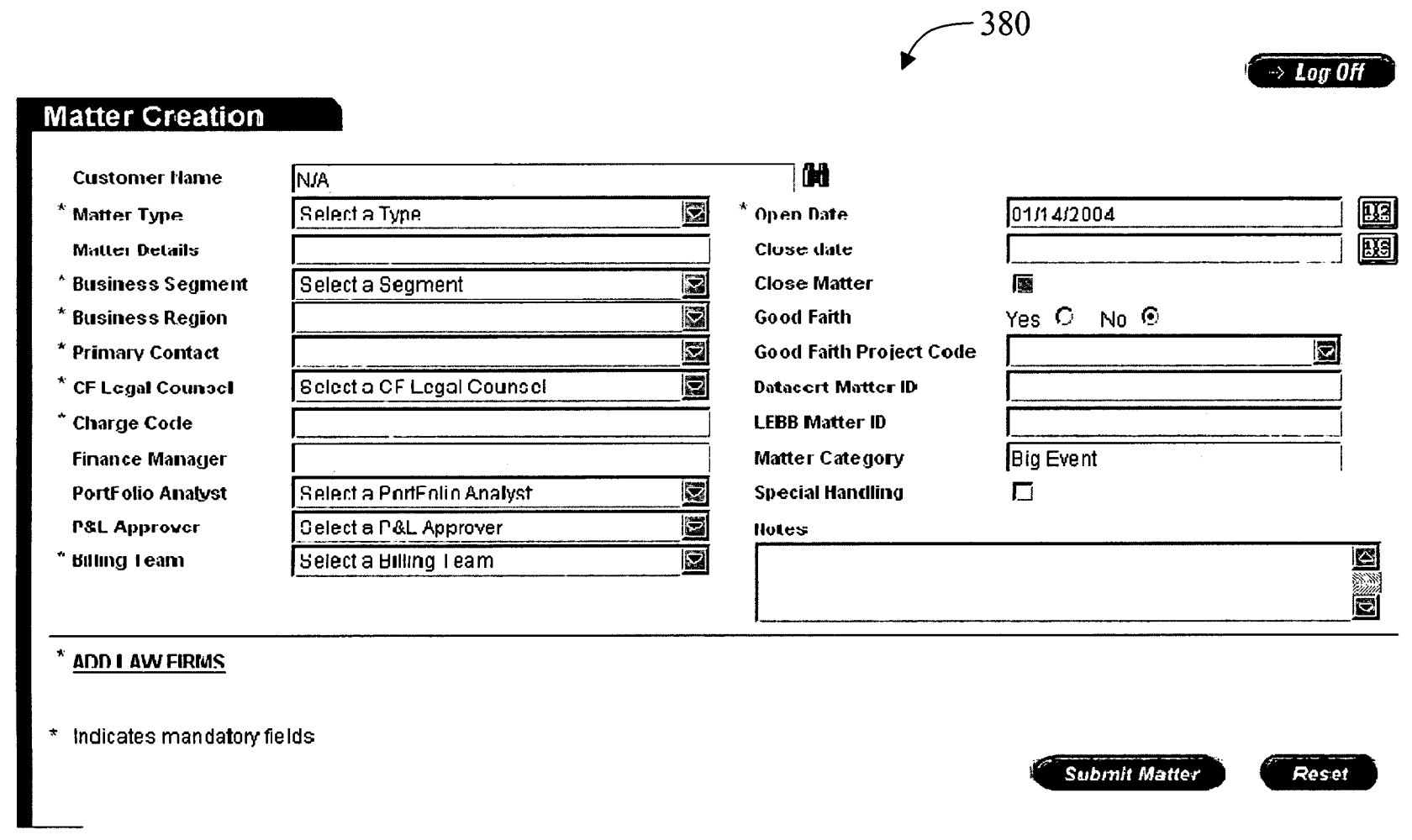

FIG. 8 is an example embodiment of a user interface 380 displaying a matter creation screen for non-deal based matters for an internal counsel within WILBER 10 (shown in FIG. 1). In the example embodiment, an internal counsel enters non-deal based matters manually into WILBER 10. There is no trigger from the workflow management system to pre-populate fields into the matter creation screen. Furthermore, there is no item placed in the queue of the internal counsel. In lieu of reviewing my queue 302 (shown in FIG. 5), the internal counsel goes directly to the matter creation link 314 (shown in FIG. 5) on the navigation bar. After selecting matter creation link 314, user interface 380 is displayed and the internal counsel is prompted to enter information relating to the non-deal based matter.

In the example embodiment, user interface 380 includes a customer name data field, a matter type pull-down list, a matter details data field, a business segment pull-down list, a business region pull-down list, a primary contact pull-down list, a legal counsel pull-down list, a charge code data field, a finance manager data field, a portfolio analyst pull-down list, a P&L approver pull-down list, a billing team pull-down list, an open date data field, a close date data field, a close matter checkbox, good faith radio buttons, good faith project code pull-down list, a DataCert matter ID data field, an LEBB matter ID data field, a matter category data field, a special handling checkbox, and a notes section.

In the example embodiment, if the external law firm added to the matter is registered in DataCert®, the matter will then go to the billing team member's queue such that the matter may be created in DataCert® and the matter is then updated within WILBER 10 with the DataCert matter ID number, and then the purchase order created in the purchase order system is confirmed in WILBER 10. If the billing team does not timely create a DataCert matter and enter it into WILBER 10 appropriately, any incoming invoices for this matter will be held on an interface failure page until the DataCert matter number is properly entered in WILBER 10. If the external law firm added to this matter is not registered in DataCert®, the matter will then go to the billing team member's queue for purchase order creation within the purchase order system and update of the matter in WILBER 10 with the purchase order number. If the external law firm is a DataCert® vendor, an e-mail is then sent to the law firm from DataCert® containing notification of the creation of a new matter. If the external law firm is not a DataCert® vendor, an e-mail is sent to the law firm from WILBER 10 containing notification of the creation of the new matter.

Figure 9:
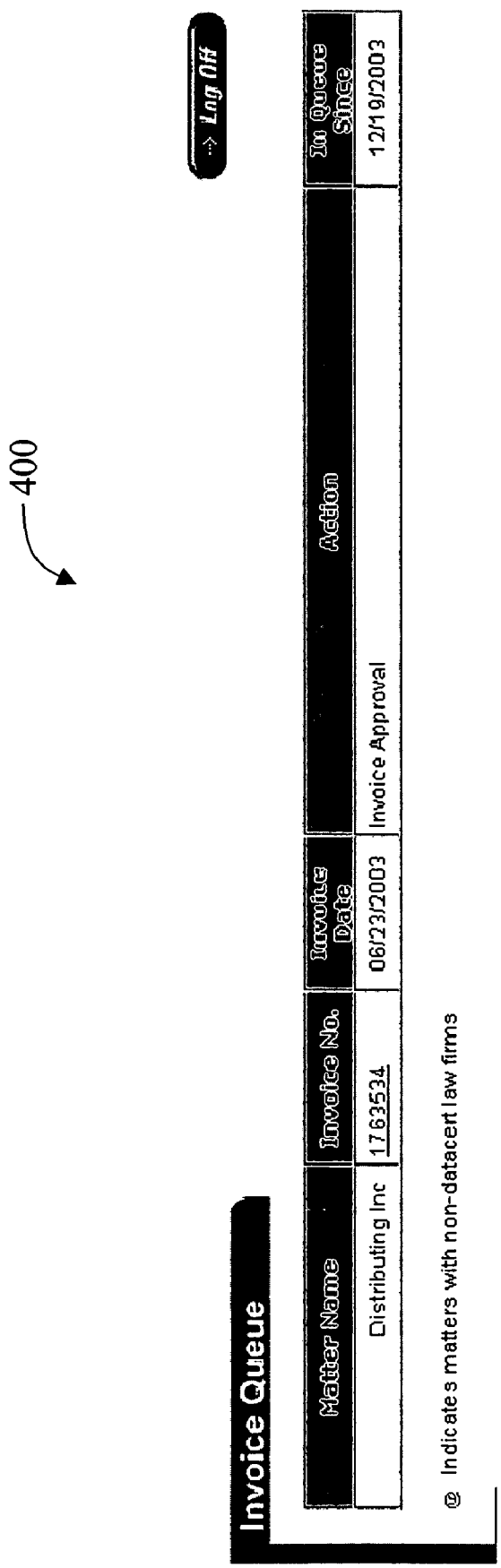
FIG. 9 is an example embodiment of a user interface displaying an invoice queue screen for an internal counsel within a WILBER.

FIG. 9 is an example embodiment of a user interface 400 displaying an invoice queue screen for an internal counsel within WILBER 10 (shown in FIG. 1). In the example embodiment, user interface 400 includes a matter name column, an invoice number column, an invoice date column, an action column, and an in-queue since column.

In the example embodiment, an internal counsel finds deal related legal invoices in an invoice queue 312 (shown in FIG. 5) after an account manager allocates and approves the invoice. Invoices will also be routed from a P&L approver if the method of allocation is a charge to a cost center. In addition, manual invoices entered by the legal billing team for non-deal based matters appear in the internal counsel's invoice queue. Only in a non-deal based matter is the internal counsel responsible for both allocating the invoice (i.e., indicating the method of reimbursement) and for approving and rejecting the invoice.

In the example embodiment, all legal invoices for the business entity are routed after allocation by means of a four-tier amount based approval hierarchy. The larger the invoice amount, the more individuals the invoice is routed to. The four-tier amount based approval hierarchy is as follows: for an invoice amount less than $5,000, the approver includes the account manager; for an invoice amount less than $50,000, the approvers include a first internal counsel and an account manager; for an invoice amount less than $100,000, the approvers include a second internal counsel, a first internal counsel, and an account manager; and for an invoice greater than $100,000, the approvers include a chief legal counsel, a second internal counsel, a first internal counsel, and an account manager.

When an account manager or a P&L approver approves an invoice, and the invoice amount is greater than $5,000, the invoice is then routed in WILBER 10 to a first internal counsel for approval. The invoice is displayed in the internal counsel's invoice queue as shown in user interface 400. The internal counsel can approve or reject the invoice by clicking on the invoice number shown on invoice queue screen 400. Depending upon the invoice amount, WILBER 10 will then direct the invoice based on the approval hierarchy.

Figure 10:
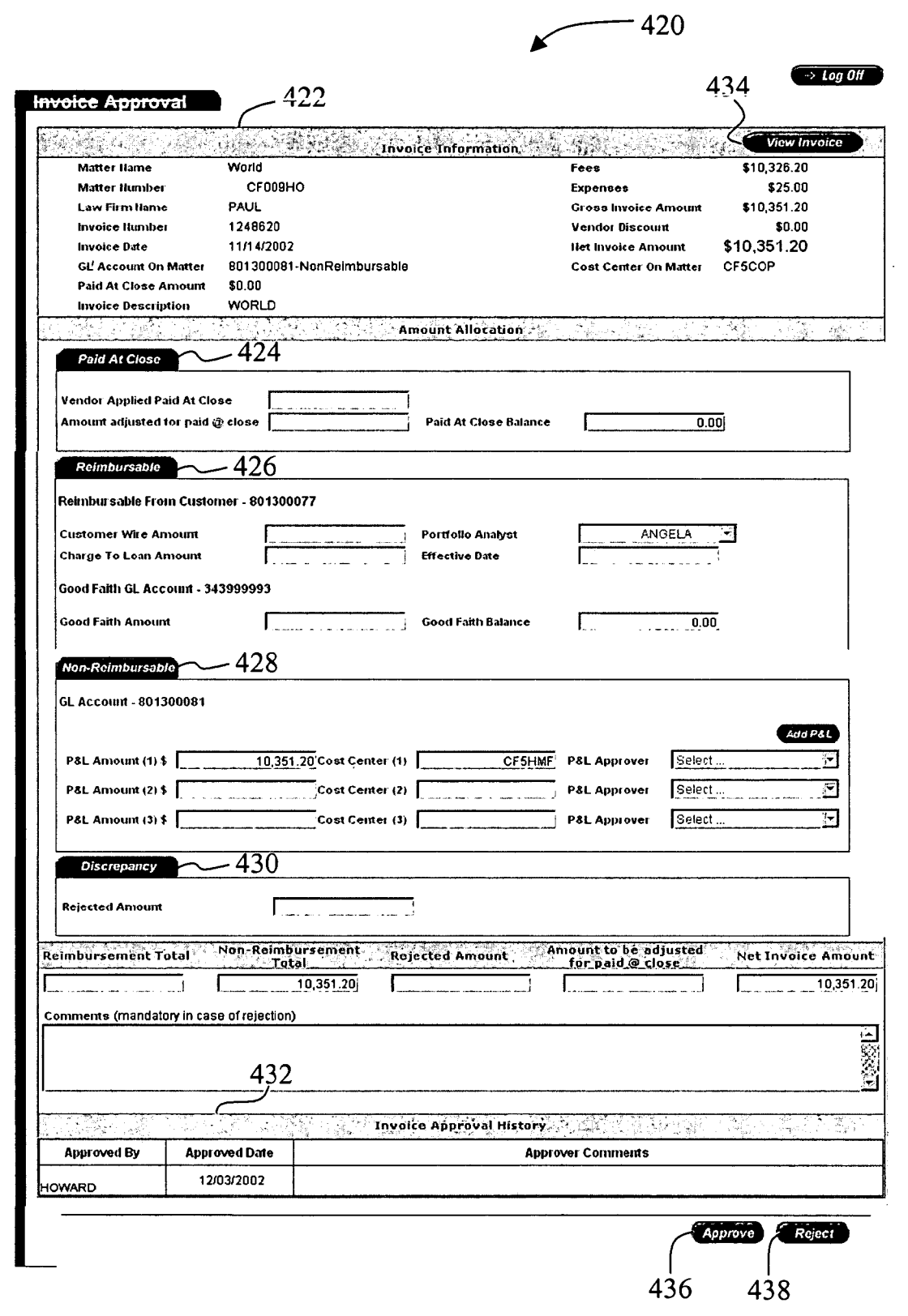

FIG. 10 is an example embodiment of a user interface 420 displaying an invoice approval screen for an internal counsel within WILBER 10 (shown in FIG. 1). User interface 420 is displayed after an internal counsel clicks on an invoice number link displayed on invoice queue screen 400 (shown in FIG. 9). User interface 420 enables a user to approve or reject an invoice. In the example embodiment, user interface 420 includes an invoice information section 422, a paid at close section 424, a reimbursable section 426, a non-reimbursable section 428, a discrepancy section 430, an invoice approval history section 432 and a view invoice button 434. Invoice button 434 enables internal counsel to further review invoice details before allocating and approving an invoice. User interface 420 also displays P&L charges as well as an approval history of the invoice. To approve the invoice, the internal counsel clicks on an approve button 436. The invoice is then removed from the internal counsel's invoice queue screen and is routed to the additional approvers if necessary. If, however, the internal counsel wishes to reject the invoice fully, the internal counsel selects a reject button 438. If the internal counsel wishes to reject the invoice partially, the internal counsel is required to input the total rejected amount in a rejection amount data field.

If the invoice amount is greater than $50,000, it is routed to a second internal counsel. If the invoice is greater than $100,000, it is also routed to the chief legal counsel. Once all approvals are obtained, the invoice is routed to a legal billing team member for final processing. If the invoice is rejected, it is routed to a legal billing team member for processing and/or re-submission to the approval queue.

In the example embodiment, when a non-deal based invoice is entered by the legal billing team, all invoices appear in the invoice queue of the appropriate internal counsel regardless of the invoice amount. The internal counsel is then responsible for allocating and approving the invoice. In the example embodiment, when requesting the invoice approval process, WILBER 10 performs a series of validations before passing the invoice on to the next approver in the hierarchy. For example, WILBER 10 uses at least one of the following formulas to perform such validations:

Reimbursable total=sum of (customer wire, charged to loan, good faith);

Non-reimbursable total=sum of (P&L charge accounts);

Total Invoice Amount=customer check/wire+good faith+charged to loan+P&L charge to cost center+rejected amount+paid at close adjusted; and Net invoice amount=total invoice amount−(paid at close adjusted+rejected amount).

Figure 11:
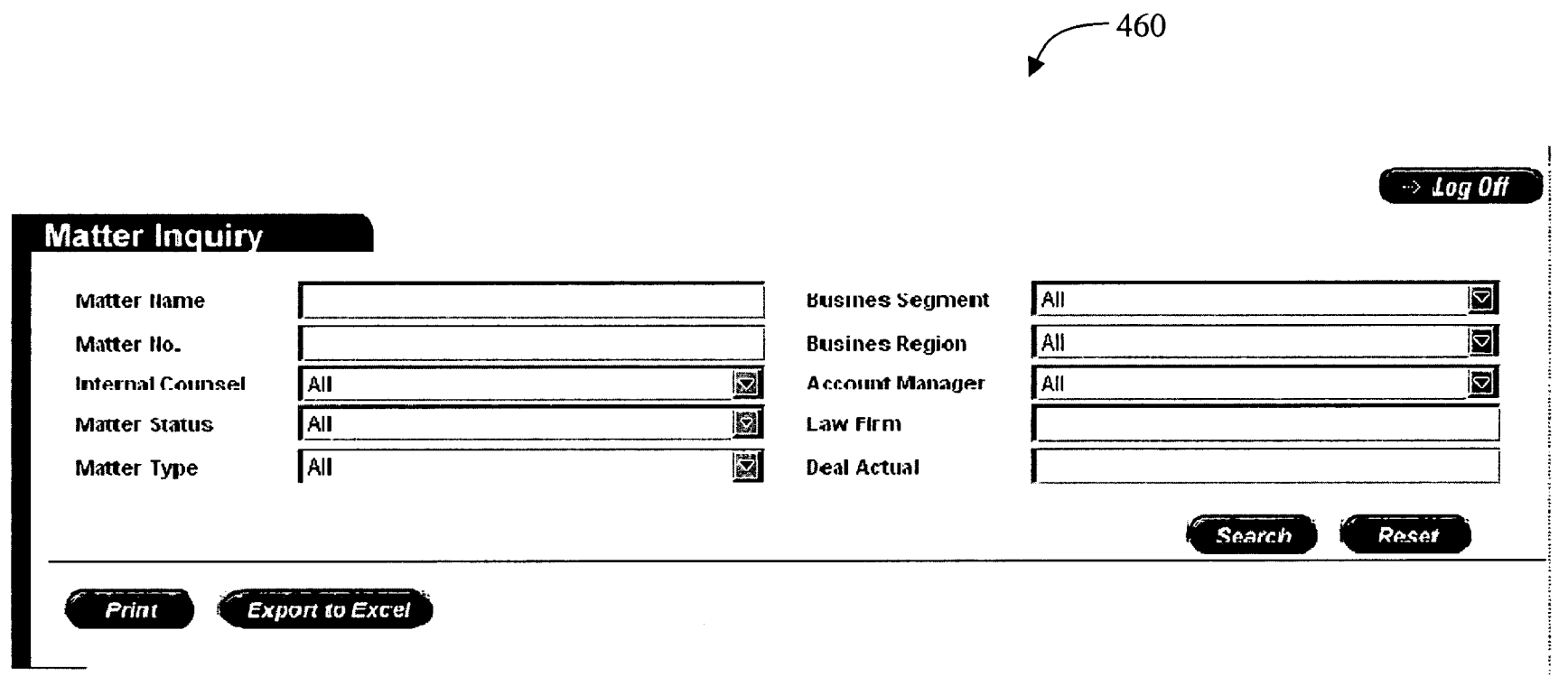

FIG. 11 is an example embodiment of a user interface 460 displaying a matter inquiry screen for an internal counsel within WILBER 10 (shown in FIG. 1). User interface 460 is displayed when an internal counsel clicks matter inquiry link 316 (shown in FIG. 5). In the example embodiment, user interface 460 includes a matter name data field, a matter number data field, an internal counsel pull-down list, a matter status pull-down list, a matter type pull-down list, a business segment pull-down list, a business region pull-down list, an account manager pull-down list, a law firm data field, and a deal actual data field. User interface 460 also includes a search button, a reset button, a print button, and an export to Excel® button. (Excel is a registered trademark of Microsoft Corporation, Redmond, Wash.)

User interface 460 provides the legal billing team, the internal counsel, and account managers with the ability to search for and review matter detail information through WILBER 10. The legal billing team and internal counsel have full access to data and can search for and review all matters currently stored in the system. Account managers can only search and view his or her own matters.

FIG. 12 is an example embodiment of a user interface 480 displaying a matter inquiry search results page for an internal counsel within WILBER 10 (shown in FIG. 1). User interface 480 is displayed after an internal counsel performs a search for open matters using user interface 460 (shown in FIG. 11). In the example embodiment, user interface 480 displays the resulting records from the matter inquiry. The resulting records include a matter number, a matter name, a date open, a law firm, a budget amount, a total billed, a status, a current responsibility, and a number of invoices section. In the example embodiment, each column also includes an up arrow and a down arrow, which enables a user to sort by column in ascending or descending order. An internal counsel can also print the search results as displayed in user interface 480.

In the example embodiment, from user interface 480, a legal billing team member or an internal counsel can drill down on matter details for the purposes of reviewing the matter and/or updating the matter. To review or update matter details, an internal counsel clicks on the appropriate matter name link displayed in the results table shown in user interface 480.

In the example embodiment, user interface 480 also enables a legal billing team member or an internal counsel to search for and drill down on invoices relating to a specific matter from the matter inquiry search results screen. From the search results screen, the internal counsel clicks on the number link in the number of invoices column for the appropriate matter. By so doing, an invoice inquiry screen appears (not shown), displaying the selected record based upon the pre-populated criteria. The internal counsel can then click on the appropriate invoice number link in the results table to display an invoice summary screen (not shown). The internal counsel can further view allocation details for the invoice by clicking on a view allocation button (not shown), which causes to be displayed an invoice approval screen (not shown).

In the example embodiment, search results can be exported to Microsoft Excel® for further analysis. To export to Excel®, an internal counsel selects the export to Excel button displayed on user interface 480. The user must then access Microsoft Excelg® from their desktop and can then view and further analyze the search results generated within WILBER 10.

Figure 13:
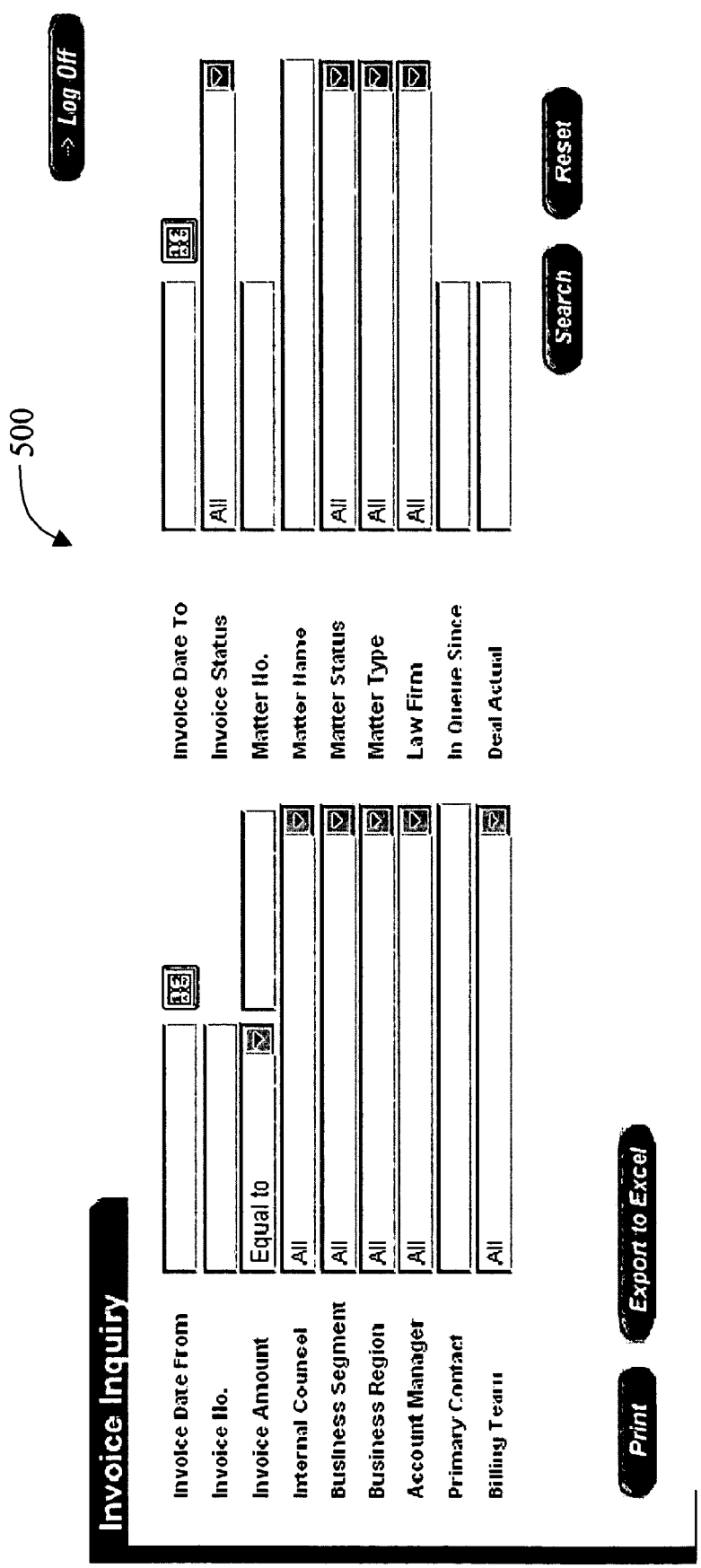
FIG. 13 is an example embodiment of a user interface displaying an invoice inquiry screen for an internal counsel within a WILBER.

FIG. 13 is an example embodiment of a user interface 500 displaying an invoice inquiry screen for an internal counsel within WILBER 10 (shown in FIG. 1). User interface 500 is displayed when an internal counsel clicks on invoice inquiry link 318 (shown in FIG. 5). In the example embodiment, user interface 500 includes an invoice date from data field, an invoice number data field, an invoice amount pull-down list, an internal counsel pull-down list, a business segment pull-down list, a business region pull-down list, an account manager pull-down list, a primary contact data field, a billing team pull-down list, an invoice date to data field, an invoice status pull-down list, a matter number data field, a matter name data field, a matter status pull-down list, a matter type pull-down list, a law firm pull-down list, an in-queue since data field, and a deal actual data field. User interface 500 also includes a search button, a reset button, a print button, and an Excel® button.

In the example embodiment, the invoice inquiry screen provides the legal billing team, internal counsel, account managers, and P&L approvers with the ability to search for and review invoice detail information using WILBER 10. The legal billing team and internal counsel have full access to data and can search for and review all invoices stored in the system. An account manager can only search and view his or her own invoices. A P&L approver can search invoices charged to his or her cost centers.

After an internal counsel enters the requested information within user interface 500, the internal counsel clicks on the search button to submit the invoice inquiry to WILBER 10.

FIG. 14 is an example embodiment of a user interface 520 displaying an invoice inquiry search results page for an internal counsel within WILBER 10 (shown in FIG. 1). User interface 520 is displayed after submitting an invoice inquiry to WILBER 10. In the example embodiment, user interface 520 includes a search results section 522 that includes an invoice number column, an invoice date column, a matter name column, a net invoice column, an invoice status column, a status owner column, an AM/Primary contact column, and an internal counsel column. In the example embodiment, each column within search results section 522 includes an up arrow and a down arrow for data sorting. User interface 520 also includes a print button which enables a user to print the invoice inquiry search results. In the example embodiment, from the invoice inquiry search results screen, a legal billing team member, internal counsel, account manager or P&L approver can drill down to the invoice summary for the purposes of reviewing the invoice summary information. The internal counsel can access the invoice summary by clicking on the appropriate invoice number link in the results table. The internal counsel can also drill down to the allocation screen (not shown) from the invoice summary screen by clicking on a view allocation button (not shown). The internal counsel can also view the invoice by clicking on a view invoice button (not shown).

In the example embodiment, an internal counsel can also export the invoice search results to Microsoft Excel® for further analysis.

In the example embodiment, WILBER 10 also enables internal counsel to generate reports. The reports link is provided on the navigational bar displayed in FIG. 5. The reports link enables the legal billing team, internal counsel, account managers, and P&L approvers with the ability to generate, print and export report data within WILBER 10. The reports that can be generated within WILBER 10 include at least one of the following: an OCMS Report (Outside Counsel Management System), a Legal Spend by Matter Type Report, a Legal Spend by Lead Lawyer Location Report, a Non-US Currency Invoices Report, a Non-Reimbursable Report, and a Budget vs. Actual Report.

The OCMS Report is a list report including matter number, matter name, law firm, total US dollars, number of invoices, business segment, business region, and internal counsel. The total is the total of approved invoices by matter and by law firm.

The Legal Spend by Matter Type Report is a list report that provides a total billed amount by matter type and business segment, including the fields matter type, business segment, and total amount billed in US dollars.

The Legal Spend by Lead Lawyer Location Report is a list report that provides a total billed amount by lead lawyer location. This report includes the fields lead lawyer, country, state, city, matter name, law firm, and total billed amount.

The Non-US Currency Invoices Report is a list report that provides the following details for foreign currency invoices: law firm, matter name, net invoice amount in US dollars, currency, and invoice amount in foreign currency.

The Non-Reimbursable Report is a list report that provides non-reimbursable spend by business segment, including the following fields: matter name, business segment, charge code, law firm, and net invoice amount in US dollars.

The Budget vs. Actual Report is a list report that shows budget vs. actual by law firm, including the following fields: matter name, law firm, budget, and actual amount in US dollars.

In the example embodiment, reports can be printed through WILBER 10, and can be exported to Microsoft Excel® for further analysis.

Account Manager

Figure 15:
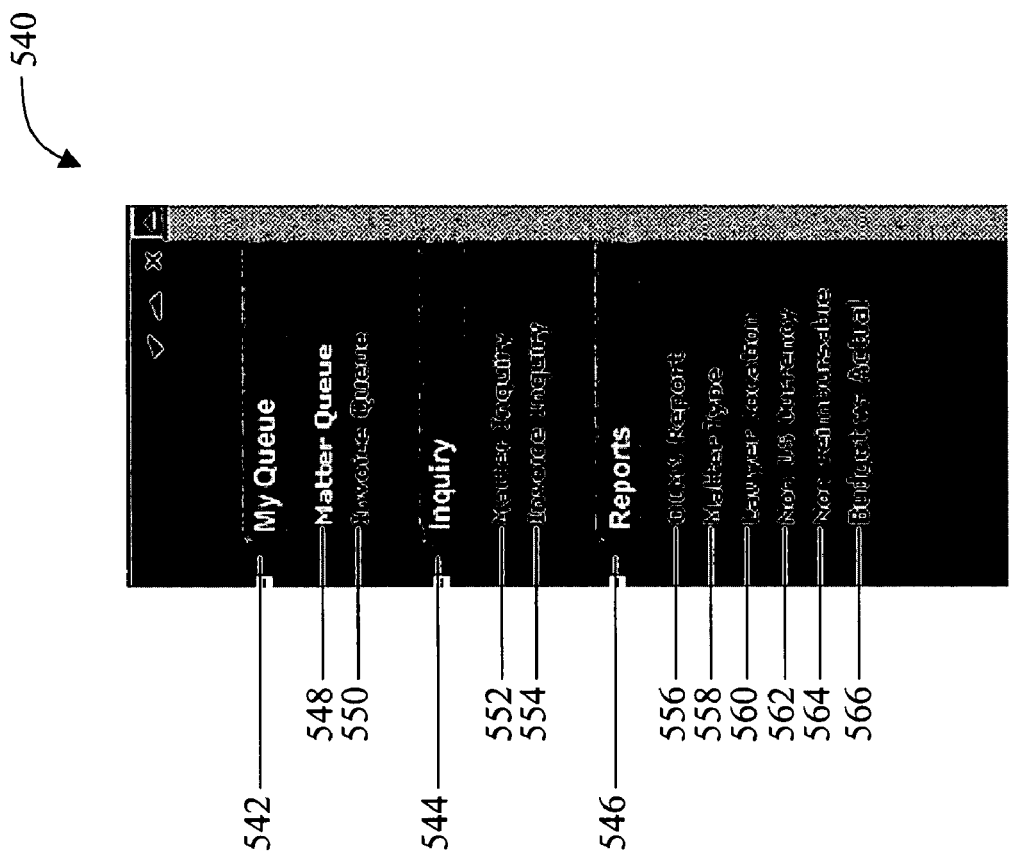
FIG. 15 is an example embodiment of a left navigation bar displayed for an account manager within a WILBER.

FIG. 15 is an example embodiment of an left navigation bar 540 displayed for an account manager within WILBER 10 (shown in FIG. 1). Navigation bar 540 includes a my queue link 542, an inquiry link 544, and a reports link 546. My queue link 542 further includes a matter queue 548, and an invoice queue 550. Inquiry link 544 further includes a matter inquiry link 552, and an invoice inquiry link 554. A reports link 546 further includes an OCMS report link 556, a matter type link 558, a lawyer location link 560, a non-US currency link 562, a non-reimbursable link 564, and a budget vs. actual link 566.

In the example embodiment, my queue link 542 lists actions to be completed by an account manager. Matter queue 548 enables an account manager to enter and confirm whether a matter will involve paid at close. Invoice queue link 550 enables an account manager to approve invoices. Inquiry link 544 enables an account manager to search for matters and invoices based upon designated criteria. In the example embodiment, account managers can only see their matters and invoices, and not all matters and invoices within WILBER 10.

FIG. 16 is an example embodiment of a user interface 580 displaying a matter queue screen for an account manager within WILBER 10 (shown in FIG. 1). User interface 580 is displayed when an account manager clicks on matter queue link 548 (shown in FIG. 15). In the example embodiment, user interface 580 includes a matter name column, an action column, an in-queue since column, an open date column, and a confirm column.

In the example embodiment, when a cash desk approval task occurs in the workflow management system, the corresponding matter is added to the account manager matter's queue so that the account manager may either enter the paid at close amount associated with the legal expense or confirm that there is no paid at close amount. The account manager is also responsible for giving a best estimate as to how this amount is to be reimbursed (i.e., charge to loan, good faith, customer wire, or charge to P&L).

In the example embodiment, the account manager accesses the matter using a matter link in the account manager's matter queue (shown in FIG. 16). The account manager then enters the paid at close amount associated with the legal expense or confirms that there is no paid at close amount associated with the transaction.

FIG. 17 is an example embodiment of a user interface 600 displaying a paid close screen for an account manager within WILBER 10 (shown in FIG. 1). User interface 600 is displayed when an account manager clicks on a matter name link displayed on user interface 580 (shown in FIG. 16). In the example embodiment, user interface 600 includes a paid at close amount data field 602, a reimbursable section 604, and a non-reimbursable section 606. User interface 600 prompts an account manager to enter a paid at close amount in data field 602. Reimbursable section 604 prompts the account manager to enter a customer wire amount, a charge to loan amount, or a good faith amount. Non-reimbursable section 606 prompts the account manager to enter a P&L amount, and a cost center. Once the account manager saves the information entered into the paid at close screen, the matter is removed from the account manager's matter queue and paid at close amount will appear on future allocation pages when invoices are submitted against this matter.

In the example embodiment, if the account manager wishes to confirm that a matter does not include a pay at close amount, the account manager selects a no paid at close button for that particular matter as shown in user interface 580 (shown in FIG. 16).

Figure 18:
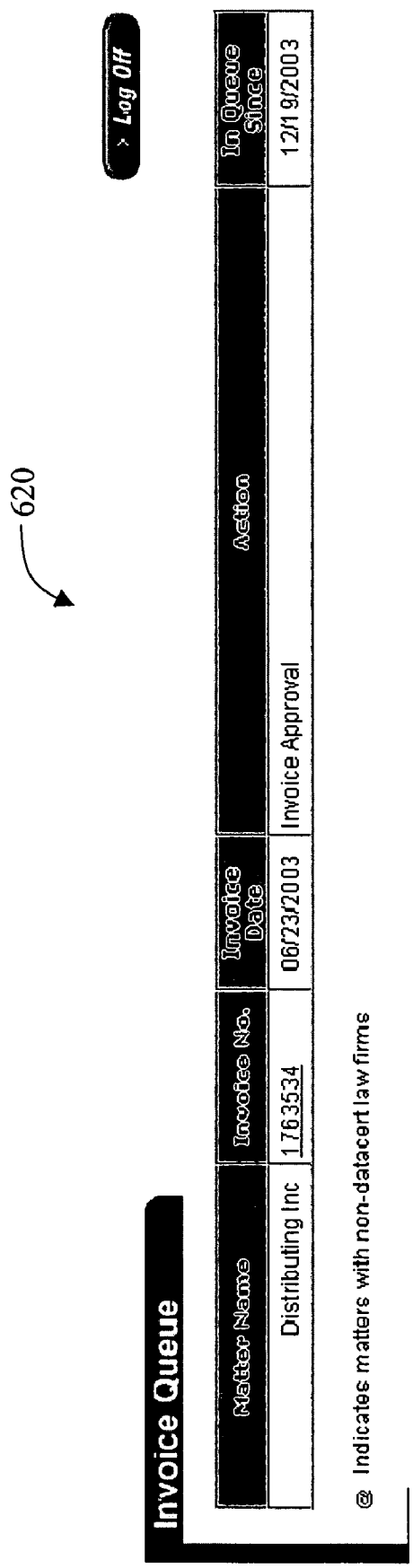
FIG. 18 is an example embodiment of a user interface displaying an invoice queue for an account manager within a WILBER.

FIG. 18 is an example embodiment of a user interface 620 displaying an invoice queue screen for an account manager within WILBER 10 (shown in FIG. 1). User interface 620 is displayed when an account manager clicks on invoice queue link 550 displayed on navigation bar 540 (shown in FIG. 15). In the example embodiment, user interface 620 includes a matter name column, an invoice number column, an invoice date column, an action column, and in-queue since column. In the example embodiment, manual invoices are distinguished from electronic invoices by an asterisk. Manual invoices appear in PDF format.

In the example embodiment, an account manager will find two types of invoices in an account manager invoice queue within WILBER 10. These two types of invoices include E-invoices populated from DataCert®, or manual invoices entered into WILBER 10 by the legal billing team. Once an invoice appears in the account manager's invoice queue, the account manager is responsible for allocation of the invoice and the approval of the invoice. Once allocated and approved by the account manager, the invoice routes through a four-tier approval hierarchy of internal counsel based upon the original amount of the invoice. If the account manager charges a cost center, the invoice is forwarded first to a P&L approver for approval before routing based upon the approval hierarchy.

FIG. 19 is an example embodiment of a user interface 630 displaying an invoice approval screen for an account manager within WILBER 10 (shown in FIG. 10). User interface 630 is displayed when an account manager clicks on a specific invoice number shown on user interface 620 (shown in FIG. 18). In the example embodiment, user interface 630 includes an invoice information section 632, a paid at close section 634, a reimbursable section 636, a non-reimbursable section 638, a discrepancy section 640, an invoice approval history section 642, a view invoice button 644, an approve button 646, and a reject button 648. Invoice button 644 enables an account manager to further review invoice details before allocating and approving an invoice. The invoice details include a breakdown of fees and expenses for the particular invoice. User interface 630 enables an account manager to allocate an amount to be paid at close, and an amount that is reimbursable from the customer.

In the example embodiment, when processing an approval request, WILBER 10 performs a series of validations before passing the invoice on to the next approver in the hierarchy. In the example embodiment, the system uses at least one of the following formulas as part of these validations:

Reimbursable total=sum of (customer wire, charged to loan, good faith);

Non-reimbursable total=sum of (P&L charge accounts);

Total Invoice Amount=customer check/wire+good faith+charged to loan+P&L charge to cost center+rejected amount+paid at close adjusted; and Net invoice amount=total invoice amount−(paid at close adjusted+rejected amount).

The account manager can then approve the invoice by selecting approve button 646. The invoice is then routed based on the amount hierarchy. The account manager can also reject the invoice by selecting reject button 648. If the invoice is rejected, the invoice is then routed to a legal billing team member for processing and/or re-submission to the approval queue. If the internal counsel wishes to reject the invoice partially, the internal counsel is required to input the rejection amount in a rejection amount data field.

In the example embodiment, user interface 620 (shown in FIG. 18) and user interface 630 (shown in FIG. 19) enables an account manager to charge the full amount of an invoice to a loan and approve the invoice; charge the full amount wired by a customer and approve the invoice; charge the full amount from good faith and approve the invoice; and charge the full amount to a cost center and approve the invoice.

In the example embodiment, user interface 630 also enables an account manager to indicate a paid at close amount for an invoice. When an E-invoice is transmitted from DataCert® into WILBER 10, the invoice appears in the invoice queue of the appropriate account manager. This account manager is then responsible for approving the invoice. If there is a paid at close amount associated with the matter, it is the responsibility of the account manager to take this amount into consideration when allocating the invoice. The account manager uses one of the two fields located in paid at close section 634 for entering this amount. For example, if an external law firm sends an invoice which is already adjusted for a paid at close amount, the account manager enters the adjusted amount in a vendor applied paid at close field. If, however, an external law firm sends an invoice that is not adjusted for the paid at close amount, the account manager enters the paid at close amount in an amount adjusted for paid at close data field. Paid at close captured at the time of funding are displayed on the allocation page to facilitate reconciliation of prepaid invoices.

WILBER 10 also enables an account manager to allocate and approve manual invoices. In the example embodiment, when the legal billing team enters a manual invoice into WILBER 10 (i.e., an invoice from a non-DataCert vendor), the invoice is routed dependent upon whether it is a deal-related or non-deal-related invoice. A deal-related invoice appears in the invoice queue of the appropriate account manager, who is responsible for indicating the avenue for reimbursement as well as approval of the invoice. It is then routed based upon an amount for further approvals, if necessary. A non-deal-related invoice appears in the invoice queue of the appropriate internal counsel, who is responsible for indicating the avenue of reimbursement, as well as the approval of the invoice. It is then routed based upon the amount for further approvals, if necessary.

In the example embodiment, an account manager can also reject all of or a portion of an invoice. User interface 630 enables the account manager to reject an invoice. User interface 630 includes reject button 648. In the example embodiment, user interface 630 also includes a discrepancy section 640, and a comments section 650. To reject an amount of an invoice, the account manager enters the rejected amount in discrepancy section 640. The account manager can also enter comments regarding the rejected amount in comments section 650. The account manager clicks on reject button 648 to submit the information to WILBER 10 in order to process a full invoice rejection. A partial invoice rejection requires entering a partial rejected amount.

FIG. 20 is an example embodiment of a user interface 660 displaying a matter inquiry page for an account manager within WILBER 10 (shown in FIG. 1). User interface 660 is displayed when an account manager clicks on matter inquiry link 552 shown on navigation bar 540 (shown in FIG. 15). In the example embodiment, user interface 660 includes a matter name data field, a matter number data field, an internal counsel pull-down list, a matter status pull-down list, a matter type pull-down list, a business segment pull-down list, a business region pull-down list, an account manager pull-down list, a law firm data field, and a deal actual data field. User interface 660 also includes a print button, an export to Excel button, a search button, and a reset button. In the example embodiment, an account manager enters the matter inquiry information into user interface 660 and selects the search button to perform a matter search within WILBER 10.

FIG. 21 is an example embodiment of a user interface 670 displaying a matter inquiry search results screen for an account manager within WILBER 10 (shown in FIG. 1). User interface 670 displays a results section 672, which are the results of a matter inquiry search performed using user interface 660 (shown in FIG. 20). In the example embodiment, results section 672 includes a matter number column, a matter name column, a date opened column, a law firm column, a budget amount column, a total billed column, a status column, a current responsibility column, and a number of invoices column. Each column also includes an up arrow and a down arrow, which enable an account manager to sort the resulting records data.

In the example embodiment, user interface 670 also enables an account manager to print the matter inquiry search results. User interface 670 also enables an account manager to view matter details for a particular matter. To view the matter details, an account manager clicks on a matter name from results section 672. A matter creation page is then displayed allowing the account manager to view the matter details.

In the example embodiment, an account manager can also review invoices associated with a matter. The account manager can view an invoice inquiry by clicking on the number of invoices column for a particular matter included in results section 672. In the example embodiment, an account manager can also view an invoice summary (not shown) by clicking on an appropriate invoice number included in results section 672. The account manager can further view the allocation details (not shown) for the invoice by clicking on a view allocation button (not shown) included on the invoice summary page. By so doing, an invoice approval screen (not shown) appears displaying invoice approval information, paid at close information, and reimbursable information.

In the example embodiment, results section 672 can be exported to Microsoft Excel® for further analysis. An account manager exports this information to Microsoft Excel® by clicking on the export to Excel button displayed on user interface 670.

Figure 22:
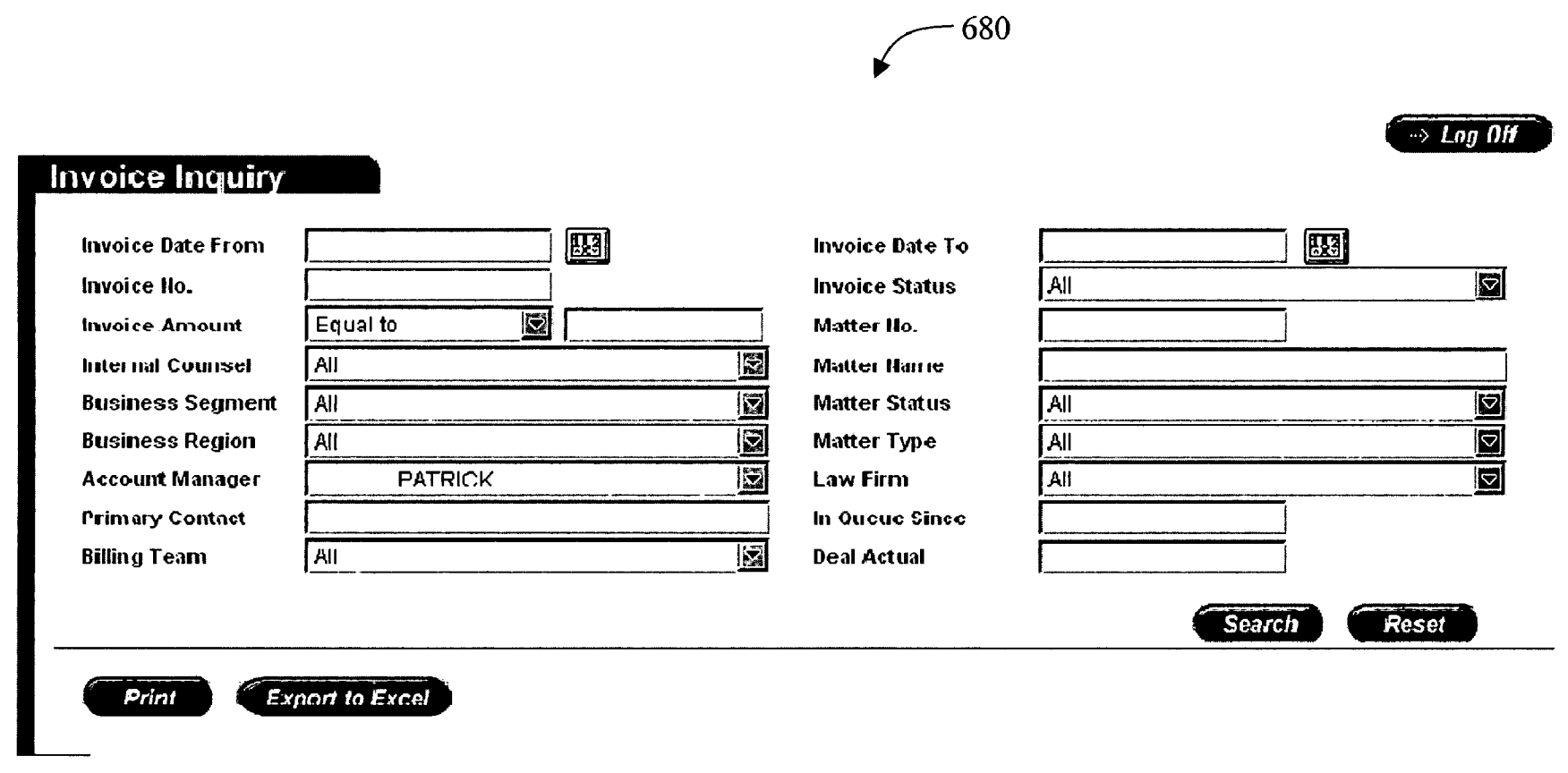

FIG. 22 is an example embodiment of a user interface 680 displaying an invoice inquiry screen for an account manager within WILBER 10 (shown in FIG. 1). User interface 680 is displayed when an account manager clicks on invoice inquiry link 554 shown in navigation bar 540 (shown in FIG. 15). In the example embodiment, for an account manager, the business segment, business region, and account manager data fields within user interface 680 will automatically be populated to define the scope of the account manager search.

FIG. 23 is an example embodiment of a user interface 690 displaying an invoice inquiry search results page to an account manager within WILBER 10 (shown in FIG. 1). User interface 690 is displayed after an account manager performs an invoice inquiry using user interface 680 (shown in FIG. 22). In the example embodiment, user interface 690 includes an invoice search results section 692. Invoice search results section 692 includes an invoice number column, an invoice date column, a matter name column, a net invoice column, an invoice status column, a status owner column, an AM/Primary contact column, and an internal counsel column. Each column includes an up arrow and a down arrow, which enables an account manager to sort data within the invoice search results section. The account manager can also print and/or export the invoice search results.

In the example embodiment, from user interface 690, a legal billing team member, an internal counsel, an account manager, and a P&L approver can drill down to an invoice summary for the purposes of reviewing the invoice summary information. An account manager can review an invoice summary by clicking on the appropriate invoice number link within invoice search result section 692. Once the invoice summary screen is displayed, the account manager can further review the allocation details (not shown) by clicking on a view allocation button (not shown) displayed on the invoice summary page (not shown). The account manager can then view the invoice details by clicking on a view invoice button displayed on the invoice allocation screen (not shown). In the example embodiment, the account manager can export invoice search result section 692 to Microsoft Excel® for further analysis.

WILBER 10 also enables an account manager to generate and print reports. An account manager utilizes the report function by clicking on reports link 546 on navigation bar 540 (shown in FIG. 15). Reports link 546 provides the legal billing team, internal counsel, account manager, and P&L approvers, with the ability to generate, print, and export report data within WILBER 10. An account manager can generate reports regarding his or her accounts. In the example embodiment, the account manager can access the following reports relating to his or her accounts: an OCMS Report, a Legal Spend by Matter Type Report, a Legal Spend by Lead Lawyer Location Report, a Non-US Currency Invoices Report, a Non-Reimbursable Report, and a Budget vs. Actual Report.

The OCMS Report is a list report including matter number, matter name, law firm, total US dollars, number of invoices, business segment, business region, and internal counsel. The total included in this report is the total of approved invoices by matter and by law firm.

The Legal Spend by Matter Type Report is a list report that provides a total billed amount by matter type and business segment, including the fields: matter type, business segment, and total amount billed in US dollars.

The Legal Spend by Lead Lawyer Location Report is a list report that provides a total billed amount by lead lawyer location. It includes the fields: lead lawyer, country, state, city, matter name, law firm, and total billed amount.

The Non-US Currency Invoices Report is a list report that provides the following details for foreign currency invoices: law firm, matter name, net invoice amount in US dollars, currency, and invoice amount in foreign currency.

The Non-Reimbursable Report is a list report that provides non-reimbursable spend by business segment, including the following fields: matter name, business segment, charge code, law firm, and net invoice amount in US dollars.

The Budget vs. Actual Report is a list report that shows budget vs. actual by law firm, including the following fields: matter name, law firm, budget, and actual amount in US dollars.

WILBER 10 enables an account manager to generate, print, and export these reports. An account manager can export these reports to Microsoft Excel® for further analysis.

P&L Approver

Figure 24:
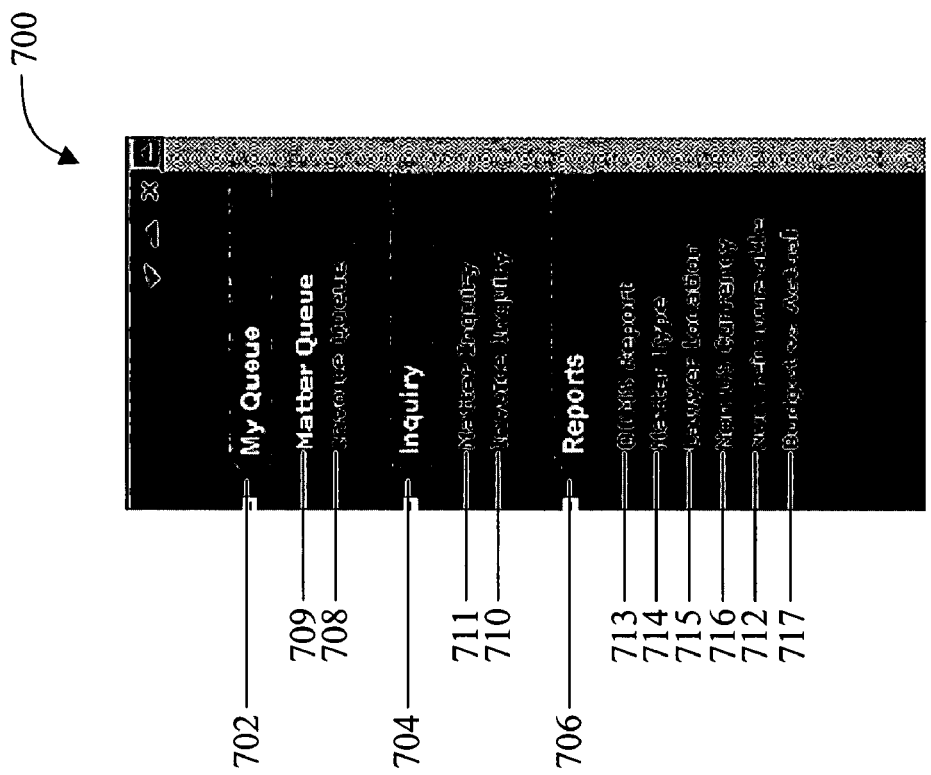
FIG. 24 is an example embodiment of a left navigation bar for a P&L approver within a WILBER.

FIG. 24 is an example embodiment of a left navigation bar 700 for a P&L approver within WILBER 10 (shown in FIG. 10). Navigation bar 700 includes a my queue link 702, an inquiry link 704, and a reports link 706. My queue link 702 further includes an invoice queue link 708 and a matter queue link 709. Inquiry link 704 further includes an invoice inquiry link 710 and a matter inquiry link 711. Reports link 706 further includes a non-reimbursable link 712.

In the example embodiment, my queue link 702 lists actions to be completed by a regional manager, including invoice queue 708 for the approval of invoices. The invoice routes to a regional manager only if the reimbursement method is a charge to his or her cost center. Inquiry link 704 provides the ability to search for invoices based upon designated criteria. In the example embodiment, a regional manager can only see his or her invoices, and not all invoices within WILBER 10. Reports link 706 provides a P&L approver with a listing of reports available to the P&L approver within WILBER 10.

FIG. 25 is an example embodiment of a user interface 720 displaying an invoice queue screen for a P&L approver within WILBER 10 (shown in FIG. 1). User interface 720 is displayed when a P&L approver clicks on invoice queue link 708 (shown in FIG. 24). In the example embodiment, user interface 720 includes a matter name column, an invoice number column, an invoice date column, an action column, and a in-queue since column.

In the example embodiment, a P&L approver finds deal-related legal invoices in his or her invoice queue within WILBER 10 when an account manager charges the P&L approver's cost center as a method of allocation. Once approved by the P&L approver, the invoices are routed for additional approval based upon the four-tier amount based approval hierarchy. If the P&L approver rejects the invoice, the system routes the invoice to a billing team member who will process the invoice, and resubmit it for approval.

In the example embodiment, when an account manager chooses a cost center charge as a method of allocation for a legal invoice, the invoice is then routed within WILBER 10 to a P&L approver for approval. The invoice will then appear within the invoice queue of the P&L approver. The P&L approver can approve the invoice by clicking on the invoice number link shown on user interface 720.

Figure 26:
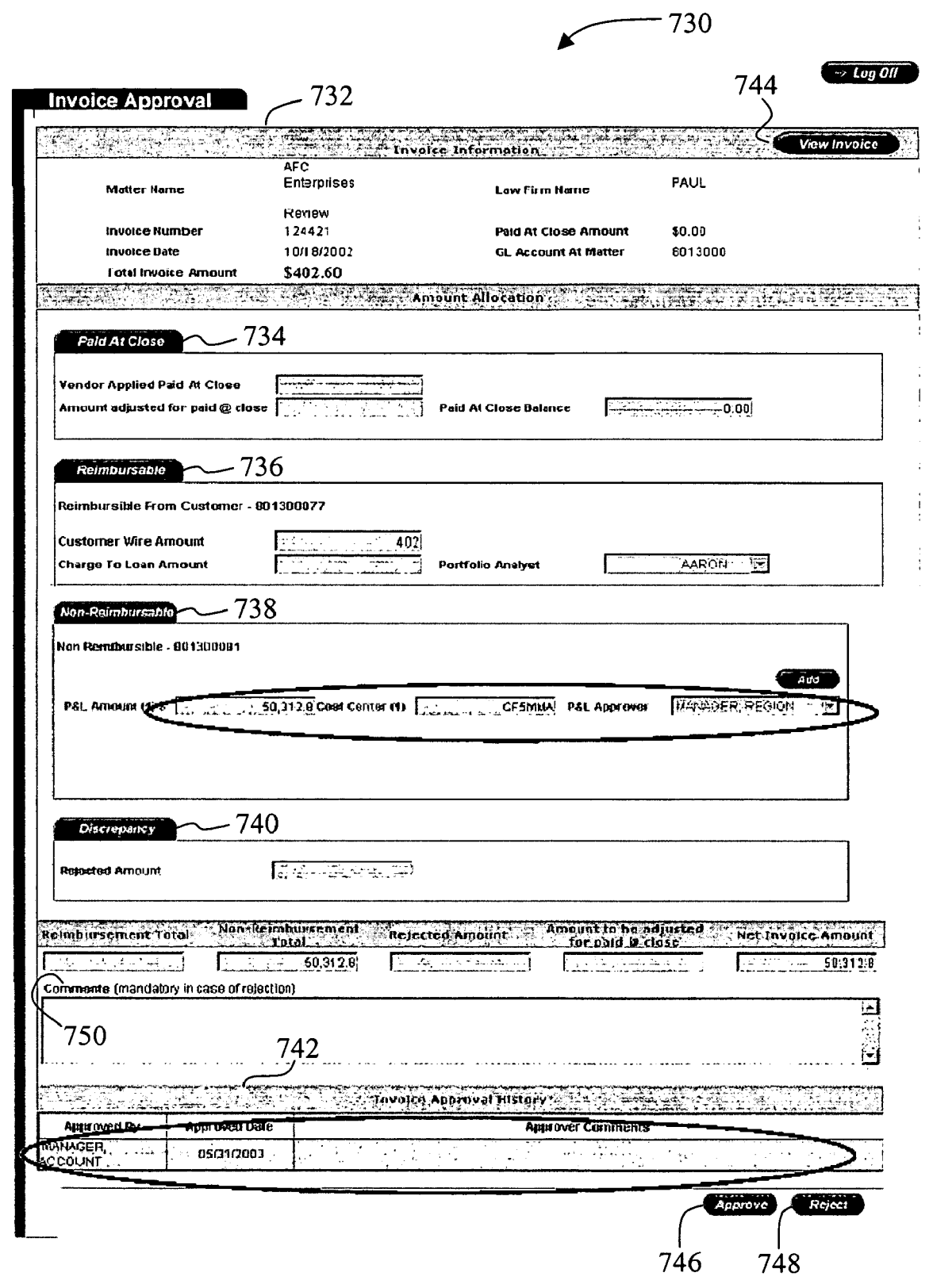

FIG. 26 is an example embodiment of a user interface 730 displaying an invoice approval screen for a P&L approver within WILBER 10 (shown in FIG. 1). User interface 730 is displayed when a P&L approver clicks on an invoice number displayed within user interface 720 (shown in FIG. 25). In the example embodiment, user interface 730 includes an invoice information section 732, a paid at close section 734, a reimbursable section 736, a non-reimbursable section 738, a discrepancy section 740, an invoice approval history section 742, a view invoice button 744, an approve button 746, a reject button 748, and comments section 750. If the P&L approver approves the invoice, the P&L approver clicks on approve button 746. If the P&L approver rejects the invoice, the P&L approver clicks on reject button 748. Once the P&L approver approves an invoice, the invoice is removed from the P&L approver invoice queue. If the invoice amount is greater than $5,000 the invoice is routed to a first internal counsel. If the invoice amount is greater than $50,000, it is routed to a second internal counsel for approval. If the invoice amount is greater than $100,000, it is routed to a chief legal counsel for approval. Once all approvals are obtained, the invoice is routed to a legal billing team member for final processing. If rejected, the invoice is routed to the billing team for reprocessing or full rejection.

FIG. 27 is an example embodiment of a user interface 760 displaying an invoice inquiry screen for a P&L approver within WILBER 10 (shown in FIG. 1). User interface 760 is displayed when a P&L approver clicks on invoice inquiry link 710 included within navigation bar 700 (shown in FIG. 24). In the example embodiment, user interface 760 provides the legal billing team, internal counsel, account managers, and P&L approvers with the ability to search for and review invoice detail information within WILBER 10. The legal billing team and internal counsel have full access to data and can search for and review all data stored in the system. An account manager can only search and view his or her invoices. A P&L approver can search invoices charged to his or her cost centers.

In the example embodiment, user interface 760 includes an invoice date from data field, an invoice amount pull-down list, an internal counsel pull-down list, a business segment pull-down list, a business region pull-down list, an account manager pull-down list, a primary contact data field, a billing team pull-down list, an invoice date to data field column, an invoice status pull-down list, a matter number data field, a matter name data field, a matter status pull-down list, a matter type pull-down list, a law firm pull-down list, an in-queue since data field, and a deal actual data field. User interface 760 also includes a search button, a reset button, a print button, and an Excel® button.

Figure 28:
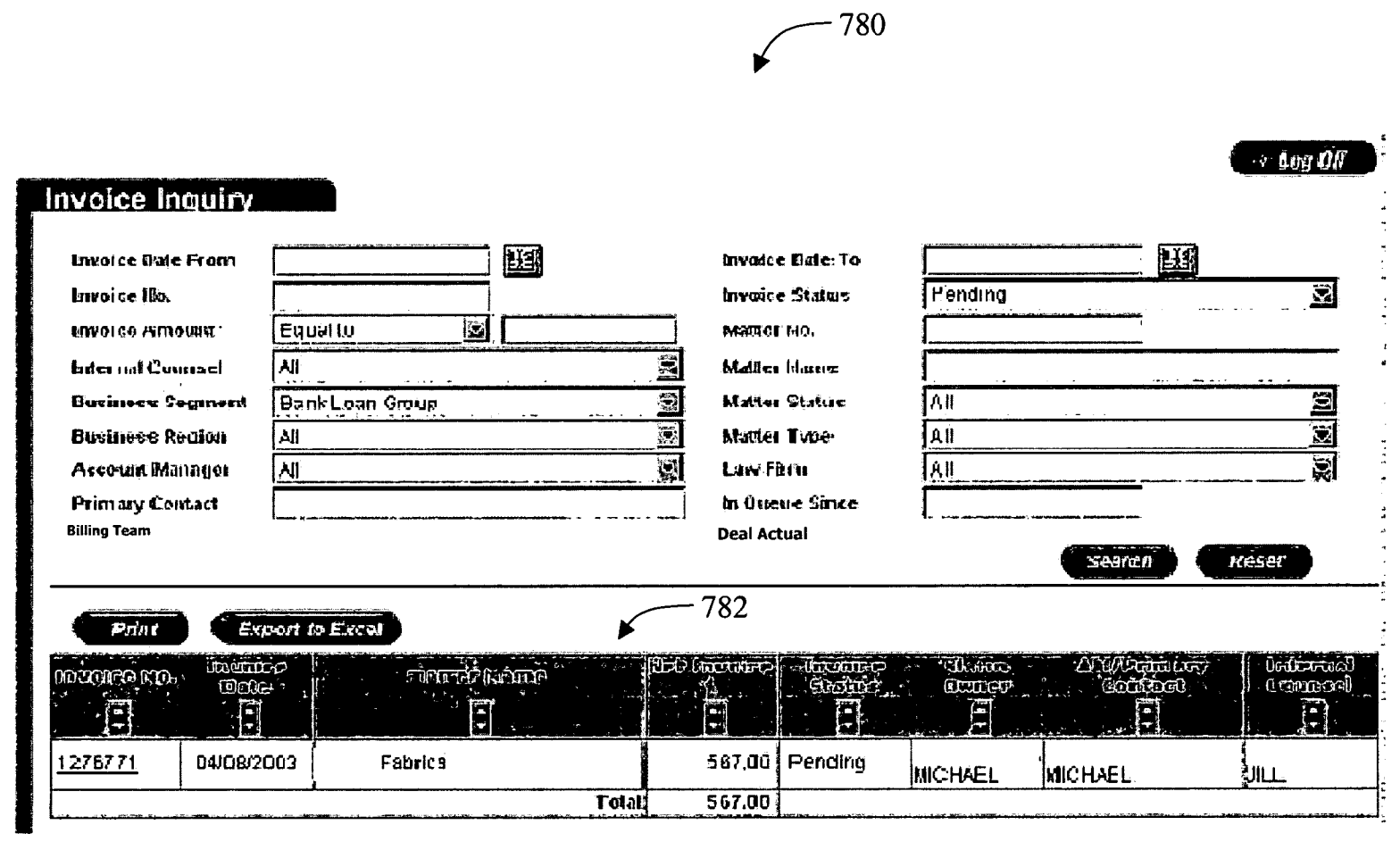

FIG. 28 is an example embodiment of a user interface 780 displaying an invoice inquiry search results for a P&L approver within WILBER 10 (shown in FIG. 1). User interface 780 is displayed when a P&L approver enters invoice inquiry information into user interface 760 (shown in FIG. 27). In the example embodiment, user interface 780 includes an invoice search results section 782, which includes an invoice number column, an invoice date column, a matter name column, a net invoice column, an invoice status column, a status owner column, an AM/Primary contact column, and an internal counsel column. In the example embodiment, each column also includes an up arrow and a down arrow which enables the P&L approver to sort data within invoice search results section 782. User interface 780 also includes a print button, an export to Excel button, a search button, and a reset button. A P&L approver can also print the invoice search results displayed on user interface 780.

In the example embodiment, a P&L approver can review invoice details by clicking on an invoice number link displayed in the invoice search results section 782. From the results screen, a legal billing team member, internal counsel, account manager, or P&L approver can drill down to the invoice summary for purposes of reviewing the invoice information. From the invoice summary screen, a P&L approver can also review allocation details by clicking on a view allocation button (not shown) on the invoice summary screen. In the example embodiment, a P&L approver can also review invoice details by clicking on a view invoice (not shown) button on the invoice allocation screen. Invoice details include invoice information, fees, and expenses.

In the example embodiment, a P&L approver can export invoice search results section 782 to Microsoft Excel® for further analysis.

WILBER 10 also enables a P&L approver to generate, print, and export report data within WILBER 10. In the example embodiment, a P&L approver can generate a Non-Reimbursable Report. The Non-Reimbursable Report is a report that provides non-reimbursable spending by business segments including the following fields: matter name, business segment, charge code, law firm, and net invoice amount in US dollars.

In the example embodiment, WILBER 10 also enables P&L approver to generate at least one of the following reports: an OCMS Report (Outside Counsel Management System), a Legal Spend by Matter Type Report, a Legal Spend by Lead Lawyer Location Report, a Non-US Currency Invoices Report, and a Budget vs. Actual Report. In the example embodiment, the report links are provided on navigation bar 700 displayed in FIG. 24.

Legal Billing Team

Figure 29:
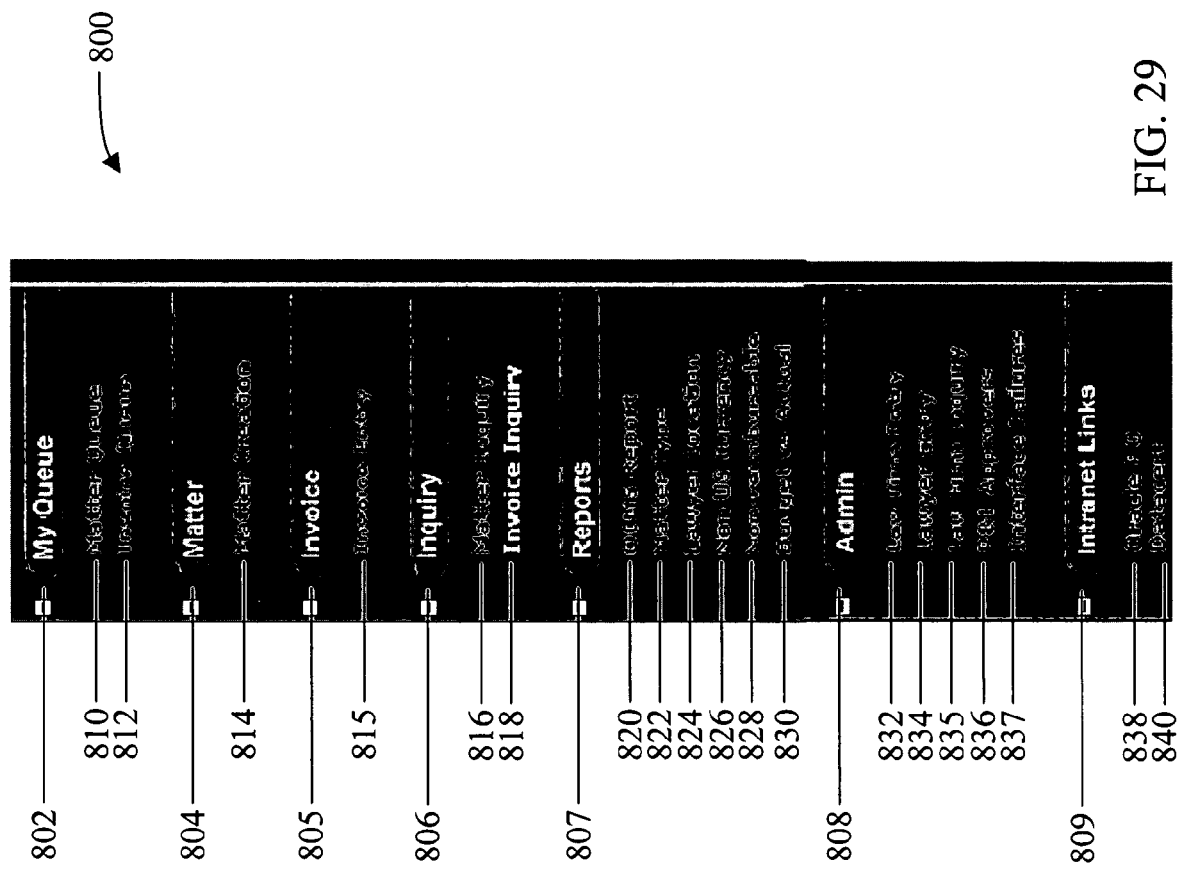
FIG. 29 is an example embodiment of a left navigation bar displayed for a legal billing team member within a WILBER.

FIG. 29 is an example embodiment of a left navigation bar 800 displayed for a legal billing team member within WILBER 10 (shown in FIG. 1) after the legal billing team member has logged onto WILBER 10. Navigation bar 800 includes a my queue link 802, a matter link 804, an invoice link 805, an inquiry link 806, a reports link 807, an administration link 808, and an intranet links link 809. My queue link 802 includes a matter queue 810 and an invoice queue 812. Matter link 804 includes a matter creation link 814. Invoice link 805 includes an invoice entry link 815. Inquiry link 806 includes a matter inquiry link 816, and an invoice inquiry link 818. Reports link 807 includes an OCMS (Outside Counsel Management System) report link 820, a matter type report link 822, a lawyer location report link 824, a non-US currency report link 826, a non-reimbursable report link 828, and a budget vs. actual report link 830. Administration link 808 includes a law firm entry link 832, a lawyer entry link 834, a law firm inquiry link 835, a P&L approvers link 836, and an interface failures link 837. Intranet links link 809 includes a DataCert link 838 and an Oracle PO link 840.

In the example embodiment, my queue link 802 lists actions to be completed by a legal billing team member. Matter queue link 810 allows a user to revise matters pertaining to DataCert IDs and Oracle PO numbers. Invoice queue link 812 enables a user to approve invoices in DataCert® and receive against a purchase order within the purchase order system. Matter creation link 814 enables the user to create matters in WILBER 10. Invoice entry link 815 enables a user to create a manual invoice. Inquiry link 806 enables a user to search for matters and invoices based upon designated criteria. A legal billing team member can see all matters and all invoices entered into WILBER 10. Reports link 807 provides a user with a listing of reports included within WILBER 10. Administration link 808 enables a user to perform law firm administration for WILBER 10. Intranet links link 809 provides links to external systems.

Figure 30:
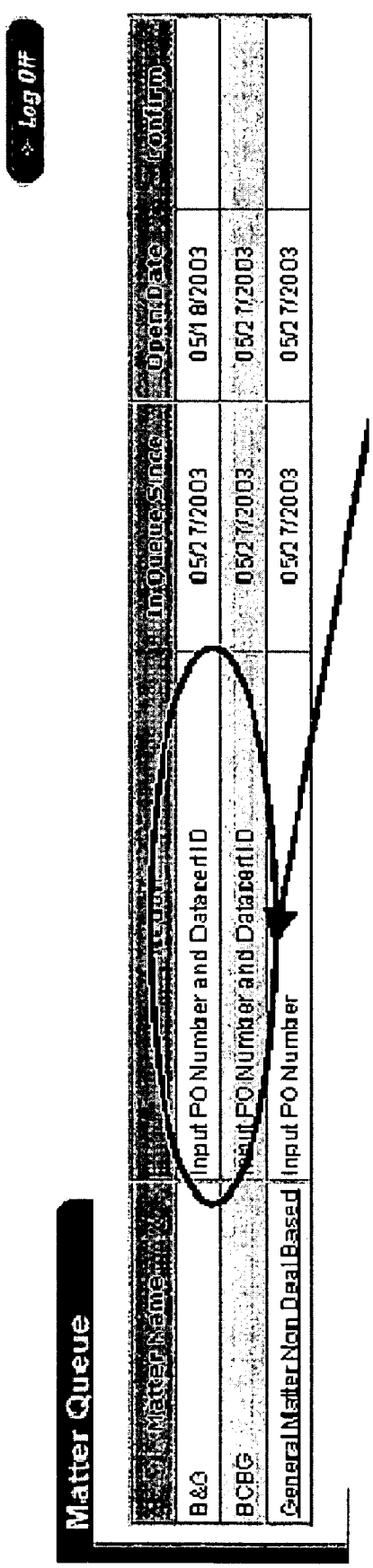
FIG. 30 is an example embodiment of a user interface displaying a matter queue for a legal billing team member within a WILBER.

FIG. 30 is an example embodiment of a user interface 850 displaying a matter queue for a legal billing team member within WILBER 10 (shown in FIG. 1). User interface 850 is displayed after a legal billing team member selects matter queue link 810 (shown in FIG. 29). In the example embodiment, user interface 850 includes a matter name column, an action column, an in-queue since column, an open date column, and a confirm column.

Once an internal counsel creates any type of matter or changes any fields in an existing matter in WILBER 10, the matter is submitted to the legal billing team member's matter queue for further processing. The action to be taken by the legal billing team member depends upon whether the outside law firm working on the matter is a DataCert® vendor or not. Another type of action occurs when an internal counsel has modified in WILBER 10 a previously created matter in DataCert®. Therefore, in the example embodiment, actions a legal billing team member may take include at least one of input purchase order number and DataCert ID, input purchase order number, and modify DataCert matter. Another type of action occurs when any field in the existing matter is changed. Changes are highlighted in red so that billing team can easily identify them and process necessary changes in DataCert®.

An internal counsel creates a matter in WILBER 10. If the outside law firm working on the matter is a DataCert® vendor, a legal billing team member receives notification of the creation of the matter, and enters the matter into DataCert® and receives a DataCert ID. The legal billing team member then accesses the matter using a matter link in matter queue 850, updates the matter in WILBER 10 with a DataCert ID, and confirms whether a purchase order number has been issued for the matter.

If, however, the outside law firm is not a DataCert® vendor, the legal billing team member creates a purchase order in the purchase order system and receives a purchase order number. The legal billing team member then updates the matter in WILBER 10 with the purchase order number.

If an internal counsel or legal billing team member updates a matter associated with an outside law firm that is a DataCert vendor and the matter already exists in DataCert®, the legal billing team member updates the matter in DataCert and confirms modification in WILBER 10 by clicking the modified button for the matter in his or her matter queue.

FIG. 31 is an example embodiment of a user interface 860 displaying a matter creation screen for a legal billing team member within WILBER 10 (shown in FIG. 1). User interface 860 is displayed after a legal billing team member selects a matter name for updating in WILBER 10. The legal billing team member updates the matter with at least one of a DataCert ID and a purchase order number. In the example embodiment, user interface 860 includes a customer name data field, a matter type pull-down list, a matter details data field, a business segment pull-down list, a business region pull-down list, an primary contact pull-down list, a legal counsel pull-down list, a charge code data field, a finance manager data field, a portfolio analyst pull-down list, a P&L approver pull-down list, a billing team pull-down list, an open date data field, a close date data field, a close matter checkbox, good faith radio buttons, good faith project code pull-down list, a DataCert matter ID data field, an LEBB matter ID data field, a matter category data field, a special handling checkbox, and a notes data section.

User interface 860 also displays an external law firm section 862. External law firm section 862 shows the law firm assigned to the matter. External law firm section 862 includes a law firm name, a lead lawyer, a city and state, a P.O. number, a budget amount, and a reimbursable type. User interface 860 also includes an add law firm link 864 which enables a legal billing team member to add a law firm to a matter.

FIG. 32 is an example embodiment of a user interface 900 displaying an invoice queue screen for a legal billing team member within WILBER 10 (shown in FIG. 1). User interface 900 is displayed when a legal billing team member clicks on invoice queue link 812 (shown in FIG. 29). In the example embodiment, user interface 900 includes a matter name column, an invoice number column, an invoice date column, an action column, and an in-queue since column.

A legal billing team member finds both deal based and non-deal based legal invoices within an invoice queue in WILBER 10. Once an account manager, P&L approver and internal counsel have allocated and approved an invoice, the invoice appears in the queue of the legal billing team member for further processing. In the example embodiment, actions that a legal billing team member may take with respect to an invoice include at least one of approve an invoice in DataCert®, reject invoice in DataCert®, receive invoice in purchase order system, reject invoice in purchase order system, resubmit invoice for approval, and by-pass approval for an invoice. Once the billing team processes the invoice for payment, the billing team completes the action by updating WILBER 10. This completion of the approval cycle triggers an email to be sent to a portfolio analyst in operations, which will identify which customer is to be charged and how much they are to be charged.

More specifically, after an account manager, P&L approver and internal counsel allocate and approve or reject an invoice, the invoice appears in the invoice queue of the legal billing team member. The legal billing team member then confirms the DataCert® approval or rejection of the invoice in WILBER 10.

After an account manager, P&L approver and internal counsel allocate and approve or reject a manual invoice, the invoice appears in the invoice queue of the legal billing team member. The legal billing team member then confirms the purchase order system approval or rejection of the invoice in WILBER 10.

The legal billing team member receives approved or rejected invoices into an invoice queue assigned to that billing team member. If the comments on a rejected invoice indicate that the invoice was rejected due to an incorrect account manager assignment, the legal billing team member can reassign the invoice to the correct account manager. After the re-assignment, the legal billing team member can resubmit the invoice for approval. Before resubmitting the invoice, either the internal counsel or the legal billing team member may query up the matter using the matter inquiry screen to change the account manager assignment.

If an invoice has been allocated and approved by an account manager and P&L approver, a legal billing team member can by-pass approval by searching for the invoice using the invoice inquiry screen. On selecting the appropriate invoice from the search results of the inquiry, an invoice summary screen (not shown) appears. A bypass button on this screen is available to the legal billing team member, who may approve or reject the invoice for the internal counsel.

FIG. 33 is an example embodiment of a user interface 940 displaying an invoice entry screen for a legal billing team member within WILBER 10 (shown in FIG. 1). User interface 940 is displayed when a legal billing team member clicks invoice entry link 815 (shown in FIG. 29). In the example embodiment, user interface 940 includes a matter name data field, a matter type data field, a charge code data field, a business segment data field, a legal counsel data field, a primary contact data field, a law firm pull-down list, a budget amount data field, a PO number data field, a lead lawyer date field, a city-state data field, a G/L account number pull-down list, an invoice number data field, an invoice date data field, an invoice start date data field, an invoice end date data field, an invoice submitted date data field, a fees data field, an expenses data field, an invoice amount data field, a vendor discount data field, a net invoice amount data field, an original currency on invoice pull-down list, an invoice description section, and a comments section. User interface 940 also includes a submit invoice button and a reset button.

In the example embodiment, a legal billing team member enters both deal based big event invoices and non-deal based invoices manually into WILBER 10. There is no trigger from DataCert® to pre-populate fields into the invoice entry screen.

Figure 34:
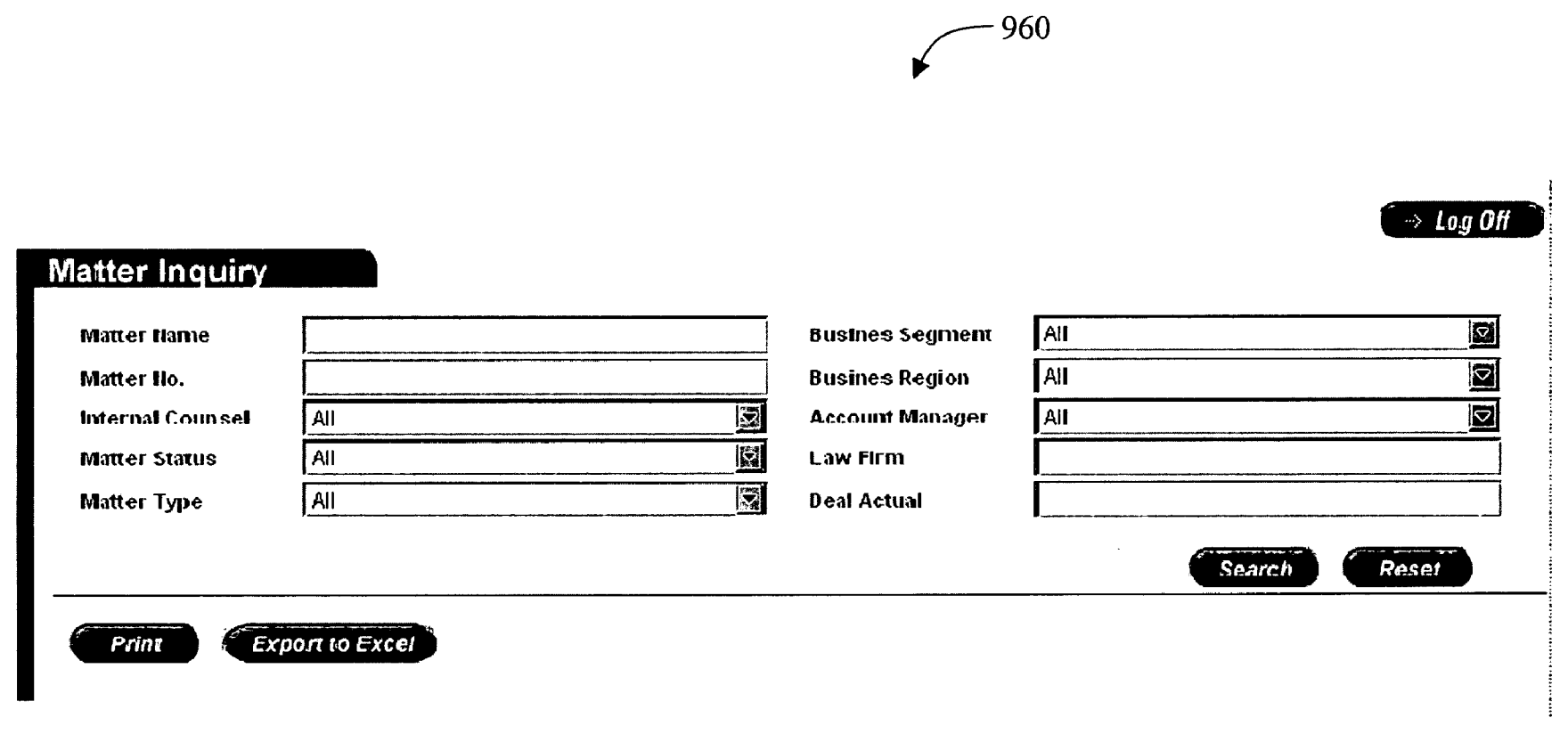

FIG. 34 is an example embodiment of a user interface 960 displaying a matter inquiry screen for a legal billing team member within WILBER 10 (shown in FIG. 1). User interface 960 is displayed when a legal billing team member clicks matter inquiry link 816 (shown in FIG. 29). In the example embodiment, user interface 960 includes a matter name data field, a matter number data field, an internal counsel pull-down list, a matter status pull-down list, a matter type pull-down list, a business segment pull-down list, a business region pull-down list, an account manager pull-down list, a law firm data field, and a deal actual data field. User interface 960 also includes a search button, a reset button, a print button, and an export to Excel button.

User interface 960 provides the legal billing team, the internal counsel, and account managers with the ability to search for and review matter detail information through WILBER 10. The legal billing team and internal counsel have full access to data and can search for and review all matters currently stored in the system. Account managers can only search and view his or her matter. When searching for a matter, search criteria is indicated using the matter inquiry screen by either entering free form data or selecting from a field master list.

FIG. 35 is an example embodiment of a user interface 980 displaying a matter inquiry search results page for a legal billing team member within WILBER 10 (shown in FIG. 1). User interface 980 is displayed after a legal billing team member performs a search for open matters using user interface 960 (shown in FIG. 34). User interface 980 displays the resulting records from the matter inquiry. The resulting records includes a matter number column, a matter name column, a date open column, a law firm column, a budget amount column, a total billed column, a status column, a current responsibility column, and a number of invoices section. In the example embodiment, each column also includes an up arrow and a down arrow, which enables a user to sort by column in ascending or descending order. A legal billing team member can also print the search results as displayed in user interface 980.

In the example embodiment, from user interface 980, a legal billing team member or an internal counsel can drill down on matter details for the purposes of reviewing the matter and/or updating the matter. To review or update matter details, a legal billing team member clicks on the appropriate matter name link displayed in the results table shown in user interface 980.

User interface 980 also enables a legal billing team member or an internal counsel to search for and drill down to invoices relating to a specific matter from the matter inquiry results screen. From the search results screen, the legal billing team member clicks on the number link in the number of invoices column for the appropriate matter. By so doing, an invoice inquiry screen (not shown) appears displaying all paid, pending or rejected invoices associated with that matter based upon the pre-populated criteria. The legal billing team member can then click on the appropriate invoice number link in the results table to display an invoice summary screen (not shown).

In the example embodiment, search results can be exported to Microsoft Excel® for further analysis. To export to Excel®, a legal billing team member selects the export to Excel button displayed on user interface 980. The user must then access Microsoft Excel® from their desktop to view and further analyze the search results generated within WILBER 10.

Figure 36:
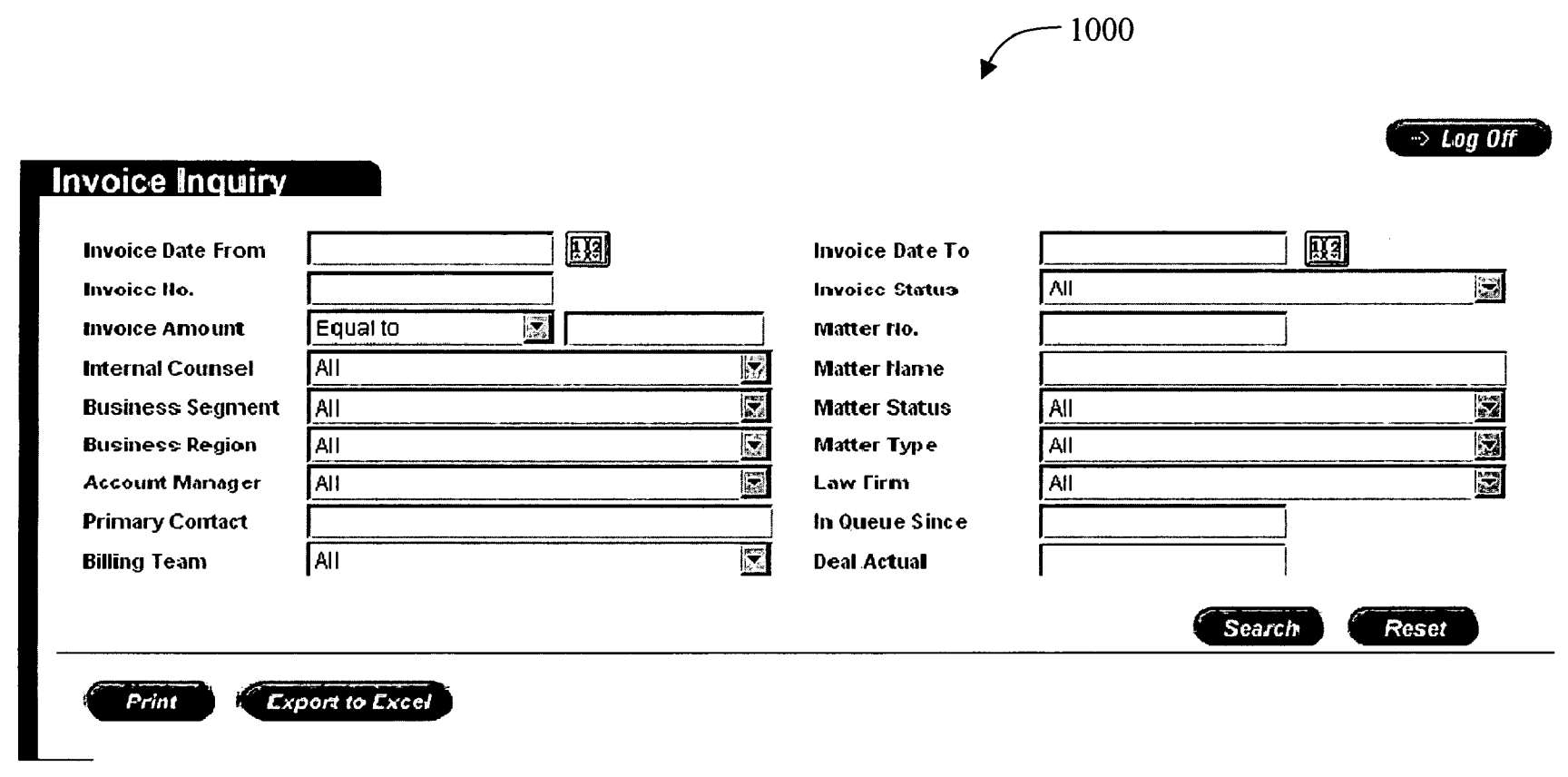

FIG. 36 is an example embodiment of a user interface 1000 displaying an invoice inquiry screen within WILBER 10 (shown in FIG. 1). User interface 1000 is displayed when a legal billing team member clicks on invoice inquiry link 818 (shown in FIG. 29). In the example embodiment, user interface 1000 includes an invoice date from data field, an invoice number data field, an invoice amount pull-down list, an internal counsel pull-down list, a business segment pull-down list, a business region pull-down list, an account manager pull-down list, a primary contact data field, a billing team pull-down list, an invoice date to data field, an invoice status pull-down list, a matter number data field, a matter name data field, a matter status pull-down list, a matter type pull-down list, a law firm pull-down list, an in-queue since data field, and a deal actual data field. User interface 1000 also includes a search button, a reset button, a print button and an export to Excel® button.

User interface 1000 provides the legal billing team, internal counsel, account managers, and P&L approvers with the ability to search for and review invoice detail information using WILBER 10. In the example embodiment, the legal billing team and internal counsel have full access to data and can search for and review all invoices stored in the system. An account manager can only search and view his or her own invoices. A P&L approver can search invoices charged to his or her cost centers. After a legal billing team member enters the requested information within user interface 1000, the legal billing team member clicks on the search button to submit the invoice inquiry to WILBER 10.

FIG. 37 is an example embodiment of a user interface 1020 displaying an invoice inquiry search results page within WILBER 10 (shown in FIG. 1). User interface 1020 is displayed after submitting an invoice inquiry to WILBER 10. In the example embodiment, user interface 1020 includes a search results section 1022 that includes an invoice number column, an invoice date column, a matter name column, a net invoice column, an invoice status column, a status owner column, an AM/Primary contact column, and an internal counsel column. In the example embodiment, each column within search record section 1022 includes an up arrow and a down arrow for data sorting. User interface 1020 also includes a print button which enables a user to print the invoice inquiry search results.

In the example embodiment, from the invoice inquiry search results screen, a legal billing team member, internal counsel, account manager or P&L approver can drill down to an invoice summary for the purposes of reviewing the invoice summary information. The legal billing team member can access the invoice summary (not shown) by clicking on the appropriate invoice number link in the results table. The legal billing team member can also view the invoice by clicking on a view invoice button (not shown). In the example embodiment, a legal billing team member can also export the invoice search results to Microsoft Excel® for further analysis.

WILBER 10 also enables a legal billing team member to generate reports. The reports link is provided on the navigational bar displayed in FIG. 29. The reports link provides the legal billing team, internal counsel, account managers, and P&L approvers with the ability to generate, print and export report data within WILBER 10. The reports that can be generated within WILBER 10 include at least one of the following: an OCMS Report (Outside Counsel Management System), a Legal Spend by Matter Type Report, a Legal Spend by Lead Lawyer Location Report, a Non-US Currency Invoices Report, a Non-Reimbursable Report, and a Budget vs. Actual Report.

The OCMS Report is a list report including matter number, matter name, law firm, total US dollars, number of invoices, business segment, business region, and internal counsel. The total is the total of approved invoices by matter and by law firm.

The Legal Spend by Matter Type Report is a list report that provides a total billed amount by matter type and business segment, including the fields matter type, business segment, and total amount billed in US dollars.

The Legal Spend by Lead Lawyer Location Report is a list report that provides a total billed amount by lead lawyer location. This report includes the fields lead lawyer, country, state, city, matter name, law firm, and total billed amount.

The Non-US Currency Invoices Report is a list report that provides the following details for foreign currency invoices: law firm, matter name, net invoice amount in US dollars, currency, and invoice amount in foreign currency.

The Non-Reimbursable Report is a list report that provides non-reimbursable spend by business segment, including the following fields: matter name, business segment, charge code, law firm, and net invoice amount in US dollars.

The Budget vs. Actual Report is a list report that shows budget vs. actual by law firm, including the following fields: matter name, law firm, budget, and actual amount in US dollars.

In the example embodiment, reports can be printed through WILBER 10, and can be exported to Microsoft Excel® for further analysis.

In the example embodiment, outside law firms that use DataCert® are populated into WILBER 10 on a nightly basis. When changes occur in DataCert®, these changes are reflected in WILBER 10 by way of an update feed from this source application. With respect to law firms that do not use DataCert®, it is the responsibility of the legal billing team to enter the law firm, as well as the lawyers, into WILBER 10 manually. Administration link 808 on left navigation bar 800 provides the legal billing team member with the ability to access three links which facilitate the following tasks: law firm entry, lawyer entry and law firm inquiry. Only legal billing team members can access or use these screens within WILBER 10.

FIG. 38 is an example embodiment of a user interface 1040 displaying a law firm entry screen within WILBER 10 (shown in FIG. 1). User interface 1040 is displayed when a legal billing team member clicks on law firm entry link 832 (shown in FIG. 29). In the example embodiment, user interface 1040 includes a law firm data field, at least one street data field, a country pull-down list, a state pull-down list, a city pull-down list, a zip code data field, a GSL number data field, approved radio buttons, a billing contact first name data field, a billing contact last name data field, a billing contact email data field, a phone data field, a fax data field, and a comments data field. User interface 1040 also includes a save button and a reset button.

Figure 39:
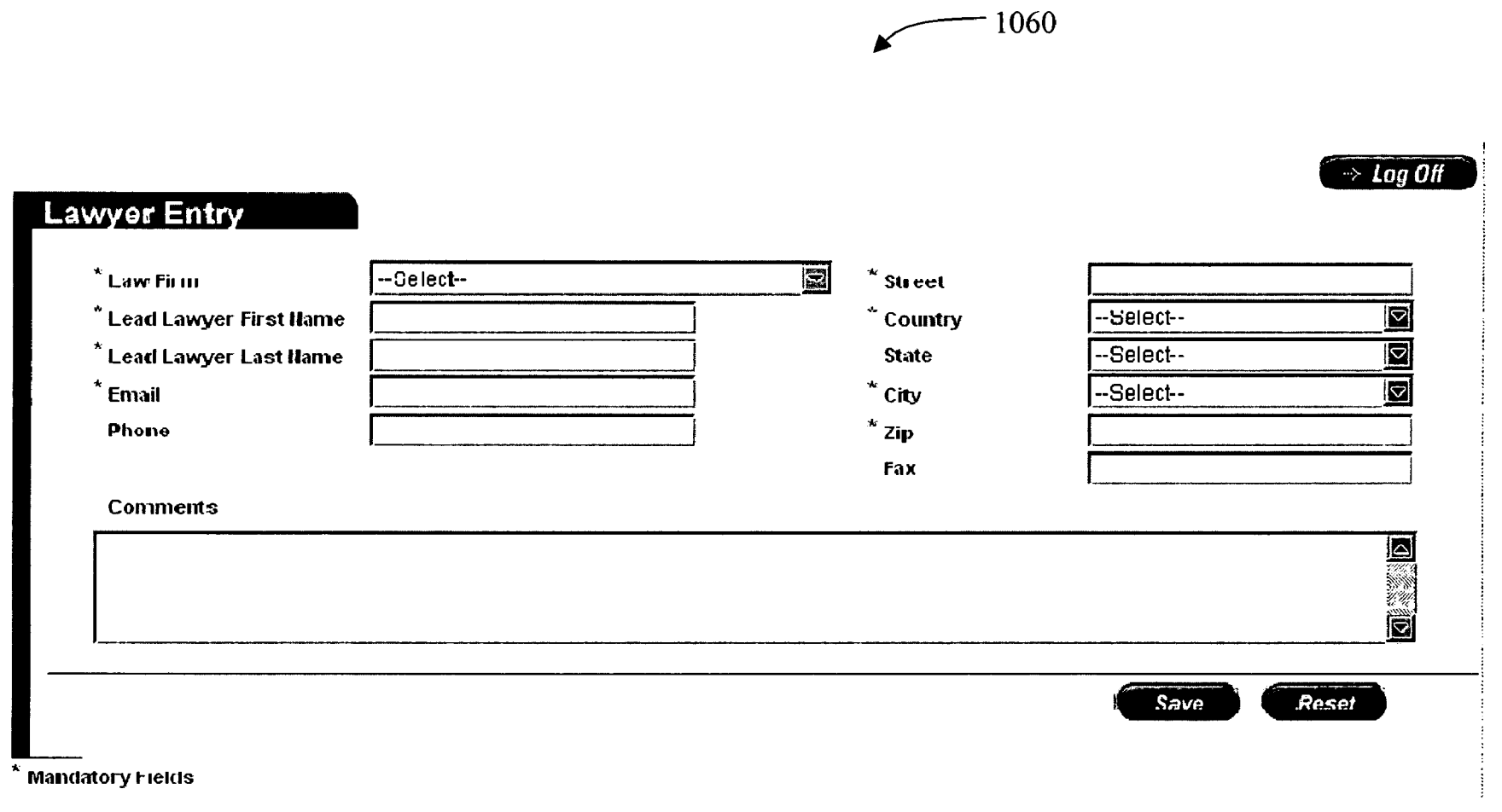

FIG. 39 is an example embodiment of a user interface 1060 displaying a lawyer entry screen within WILBER 10 (shown in FIG. 1). User interface 1060 is displayed when a legal billing team member clicks on lawyer entry link 834 (shown in FIG. 29). In the example embodiment, user interface 1060 includes a law firm data field, a lead lawyer first name data field, a lead lawyer last name data field, an email data field, a phone data field, a street data field, a country pull-down list, state pull-down list, a city pull-down list, a zip data field, a fax data field, and a comments data field. User interface 1060 also includes a save button and a reset button.

FIG. 40 is an example embodiment of a user interface 1080 displaying a law firm inquiry screen within WILBER 10 (shown in FIG. 1). User interface 1080 is displayed when a legal billing team member clicks on law firm inquiry link 835 (shown in FIG. 29). In the example embodiment, user interface 1080 includes a GSL number data field, a law firm data field, a lead lawyer first name data field, and a lead lawyer last name data field. User interface 1080 also includes a search button and a reset button. In the example embodiment, after performing a law firm inquiry, a search results table appears in user interface 1080. The results table includes a GSL number, a law firm name, a lawyer first name, and a lawyer last name.

Law firm and lawyer details are populated from DataCert® into WILBER 10 on a regular basis. There may be times when a legal billing team member may wish to verify this data in WILBER 10. The law firm inquiry screen gives the legal billing team member the ability to search for a DataCert law firm, as well as the lawyers associated with that particular firm. Law firm data fed from the application DataCert® cannot be changed in WILBER 10. However, non-DataCert law firms/lawyers that are entered manually into WILBER 10 can be located and updated using the law firm inquiry screen. Only legal billing team members may access or use this screen within WILBER 10.

In an example embodiment, when working on a new transaction, an account manager sets up a deal and an associated timeline for the deal within the workflow management system. When a pitch approval stage is reached in the workflow management system, WILBER 10 searches for a presentation that is approved and carries a completion date. This is the trigger for the creation of a new financing transaction matter in WILBER 10. The matter is pre-populated with basic deal details such as Customer Name, Account Manager, Region Manager, Internal Counsel or Lead Lawyer, Business Segment, Business Region, Charge Code and Open Date. A legal billing team member creates a new financing transaction matter by searching for the matter using the matter inquiry screen using a matter status of "matter to be created".

In an example embodiment, for portfolio administration matters, a nightly process runs and identifies any matters that have occurred 90 days after New Volume Deal Setup. When the process finds such an item, it triggers the creation of a portfolio administration matter in WILBER 10. A legal billing team member creates a new financing transaction matter by searching for the matter using the matter inquiry screen using a matter status of "matter to be created".

In an example embodiment, deal based big events, other than a new financing transaction or a portfolio administration matter, such as bankruptcy or workout, the internal counsel would have to login to WILBER 10 and create a new matter from scratch, since no item would be placed in the internal counsel's matter queue. There also is no trigger from the workflow management system to pre-populate fields into the matter creation screen. To assist the internal counsel, a legal billing team member can create the desired deal based big event matter.

In an example embodiment, a legal billing team member creates a non-deal based matter manually into WILBER 10. There is no trigger from the workflow management system to pre-populate fields into the matter creation screen. Further, there is no item placed in the queue of the internal counsel. In lieu of reviewing his/her queue, the internal counsel goes directly to the matter creation link on the navigation bar.

Figure 41:
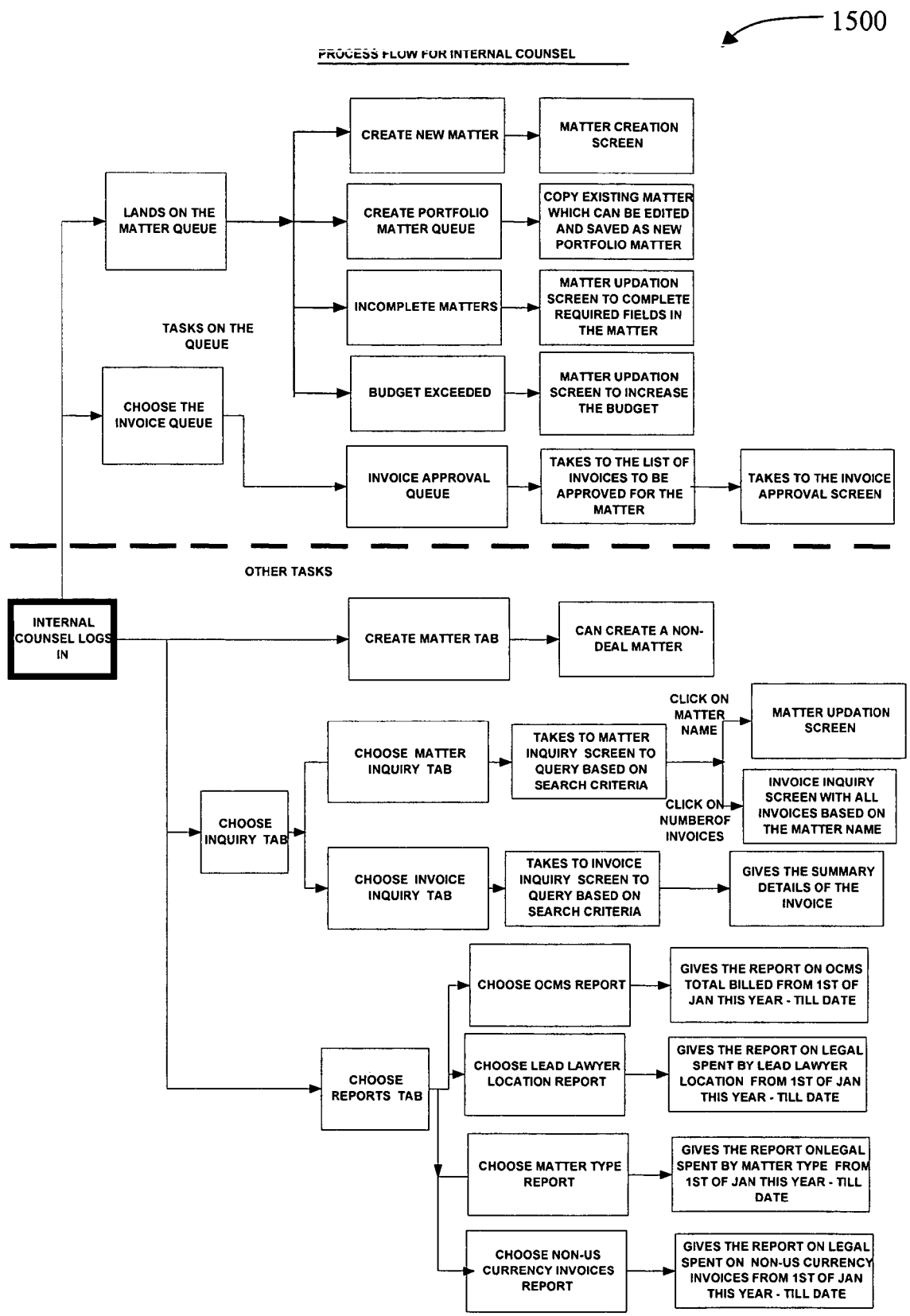
FIG. 41 is a flowchart illustrating an exemplary process flow for an internal counsel using a WILBER.

FIG. 41 is a flowchart 1500 illustrating an exemplary process flow for an internal counsel using WILBER 10 (shown in FIG. 1).

Figure 42:
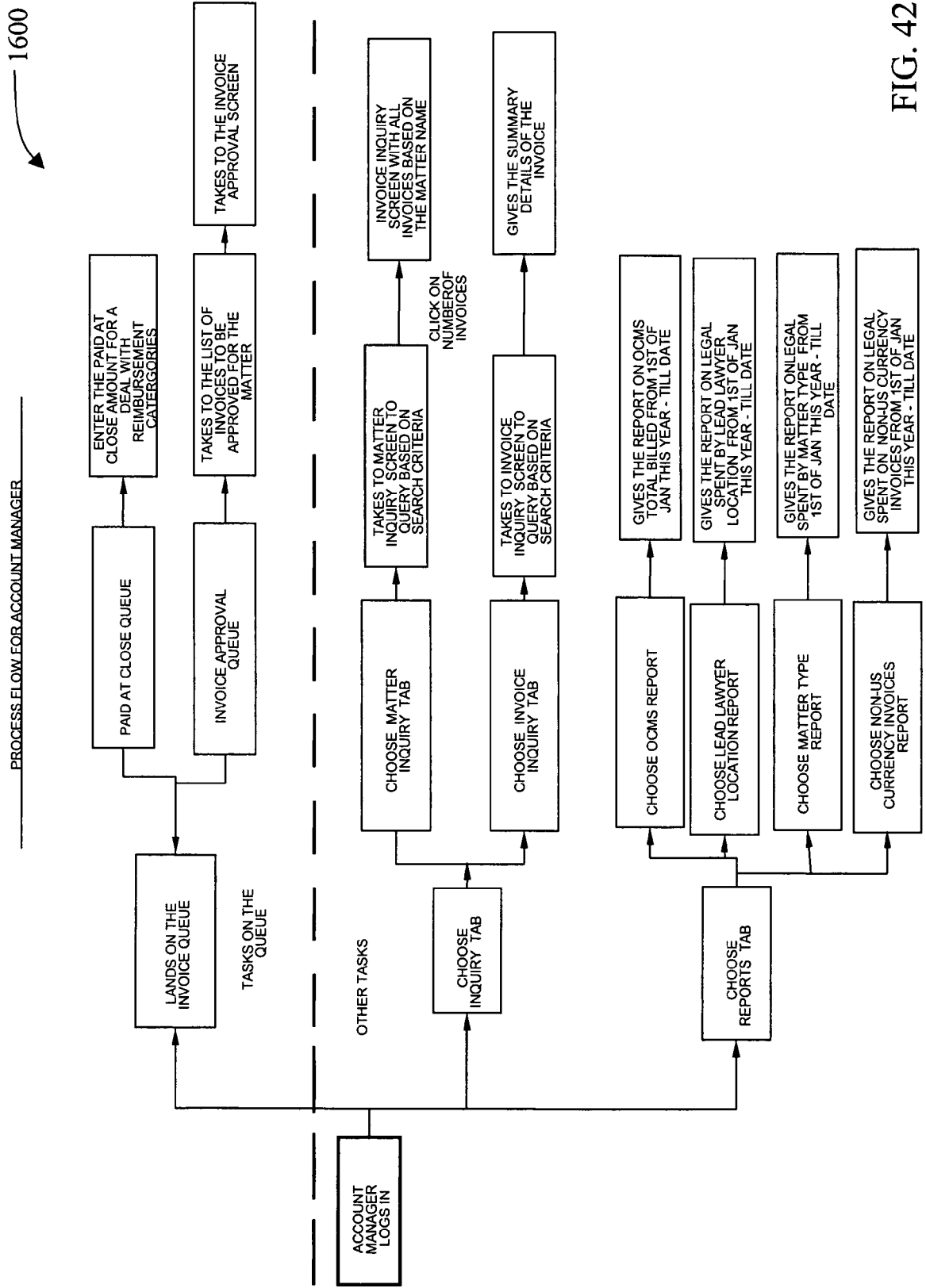
FIG. 42 is a flowchart illustrating an exemplary process flow for an account manager using a WILBER.

FIG. 42 is a flowchart 1600 illustrating an exemplary process flow for an account manager using WILBER 10 (shown in FIG. 1).

Figure 43:
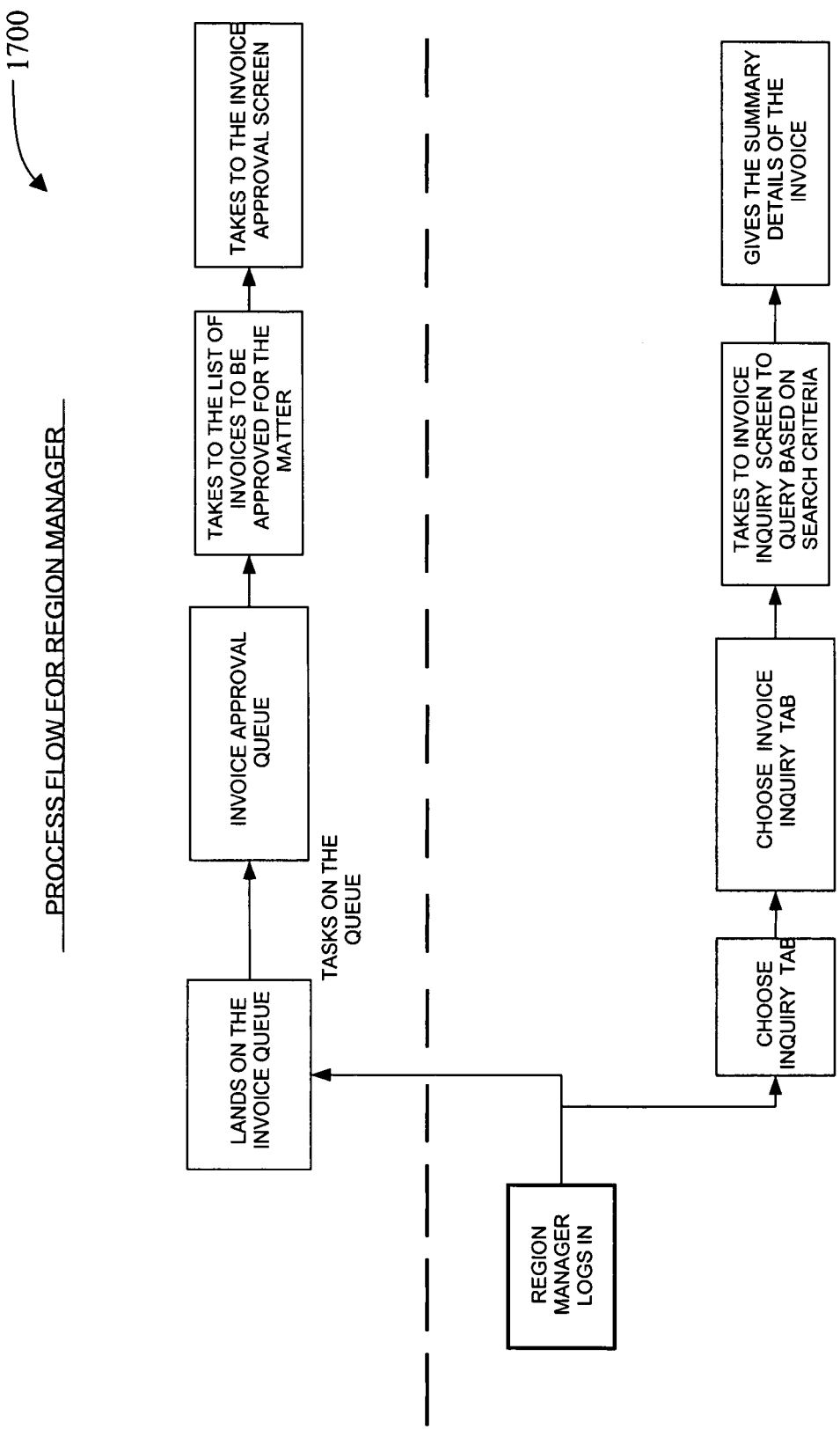
FIG. 43 is a flowchart illustrating an exemplary process flow for a region manager using a WILBER.

FIG. 43 is a flowchart 1700 illustrating an exemplary process flow for a region manager using WILBER 10 (shown in FIG. 1). In the example embodiment, operations performed by a region manager may also be performed by a P&L approver.

Figure 44:
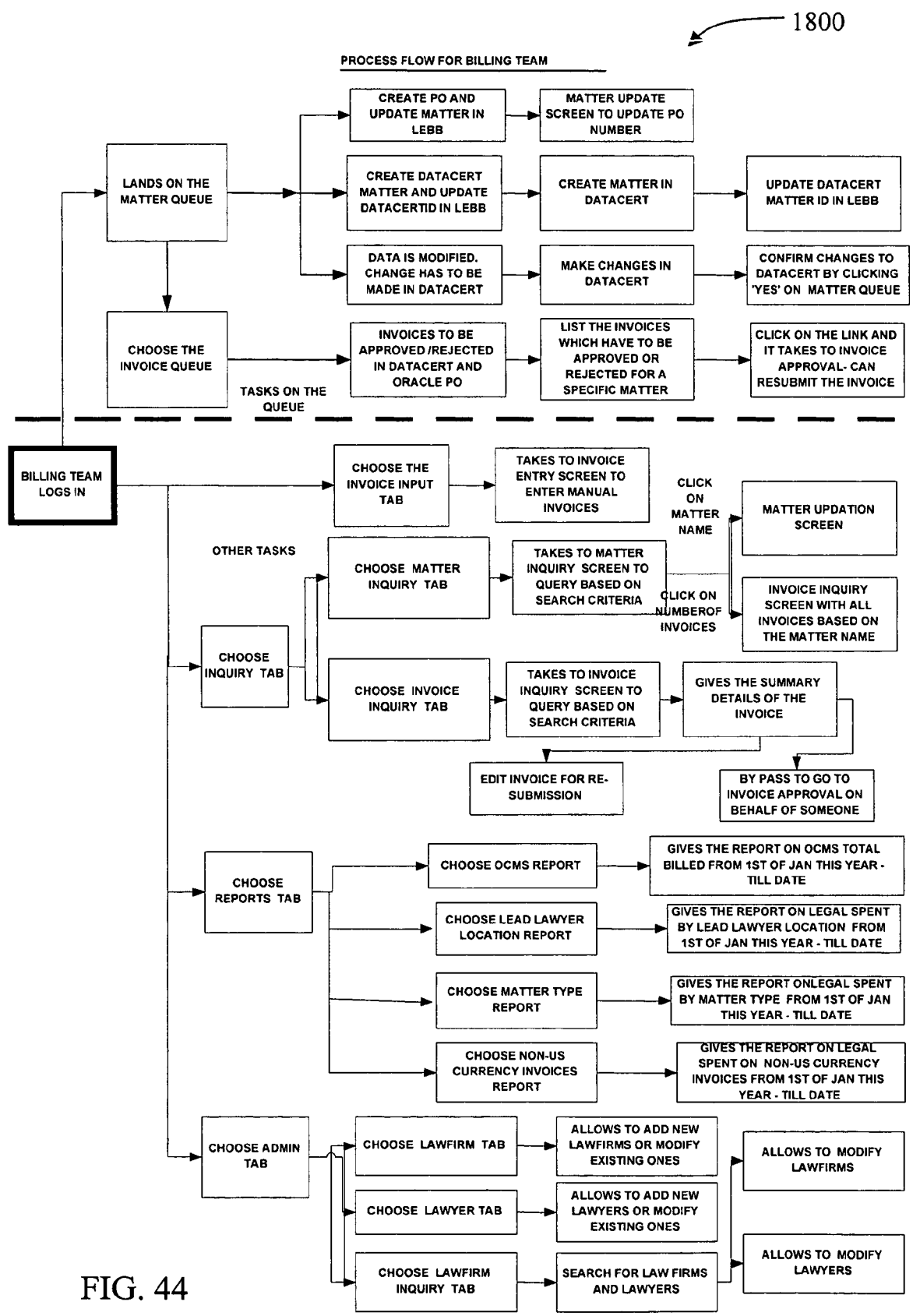
FIG. 44 is a flowchart illustrating an exemplary process flow for a legal billing team member using a WILBER.

FIG. 44 is a flowchart 1800 illustrating an exemplary process flow for a legal billing team member using WILBER 10 (shown in FIG. 1).

Finance Managers

WILBER 10 (shown in FIG. 1) includes a reconciliation module. WILBER 10 and the reconciliation module provide access to finance managers to all invoices processed as reimbursable legal expenses and auto-links these invoices against legal fees that were charged against the customer via the sub-ledger accounting system such as, for example, the ABLE sub-ledger accounting system. Additionally, this module enables a finance manager to investigate and reconcile invoices not properly charged to the customer, thereby minimizing revenue leakage within the business segments. In the example embodiment, finance managers from each business segment as well as the billing team members have access to the reconciliation module in WILBER 10. The objective of this module is to ensure that all reimbursable legal invoices are properly charged to the customer loan.

On a monthly basis, WILBER 10 pulls data from centralized tables that contain sub-ledger postings. This data includes legal fees that have been expensed to the customer. An automatic matching process is executed in WILBER 10 which matches these sub-ledger postings against: (a) all reimbursable dollar amounts in WILBER (charge to loan+customer wire); and (b) a customer identifier. All invoices that are matched by this process are marked "resolved". All invoices that are not auto-matched are marked "pending". It is then the responsibility of the finance manager for the business segment to resolve the pending invoices.

Figure 45:
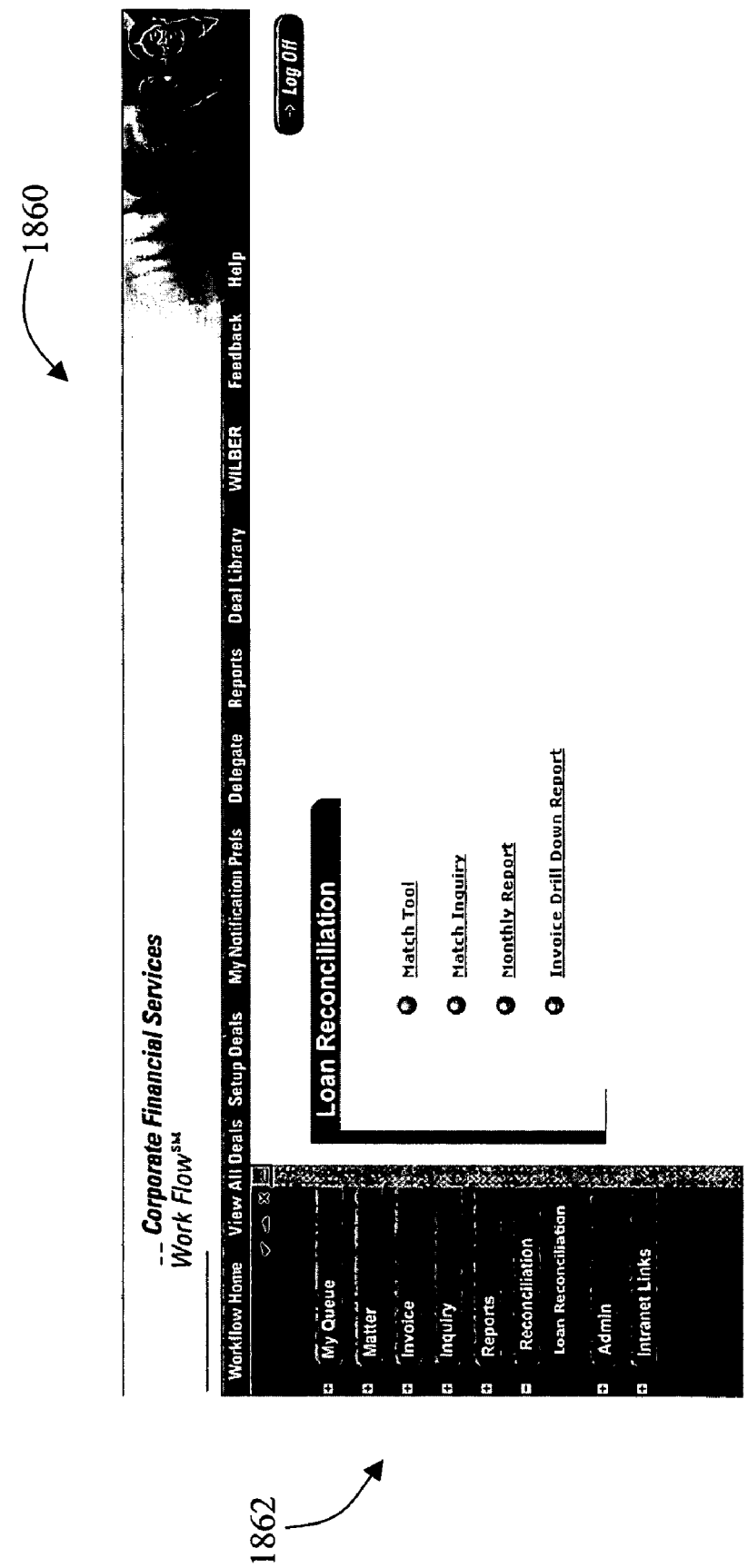
FIG. 45 is an example embodiment of a reconciliation menu for a finance manager using a WILBER.

FIG. 45 is an example embodiment of a reconciliation menu 1860 displayed for a finance manager within WILBER 10 (shown in FIG. 1) after the finance manager has logged onto WILBER 10. Reconciliation menu 1860 includes a navigation bar 1862 that includes a my queue link, a matter link, an invoice link, an inquiry link, a reports link, a reconciliation link, an administration link, and an intranet links link. Reconciliation menu 1860 enables a finance manager to access a match tool screen, a match inquiry screen, a monthly report screen, and an invoice drill down report screen. The finance manager is also referred to as a finance reconciliation user.

FIG. 46 is an example embodiment of a user interface 1880 displaying a match tool screen for a finance reconciliation user within WILBER 10 (shown in FIG. 1). In the example embodiment, WILBER 10 may not be able to automatically reconcile all invoices, due to various reasons (e.g., rounding errors, currency translation errors, valid discounts, single postings of multiple invoices, etc.). The match tool screen 1880 is the main screen in the reconciliation module, which enables finance users to reconcile reimbursable dollars for their business segment. The screen is split up into two sections including: (a) a WILBER data section displaying all unresolved reimbursable invoices, and (b) an OGL data section displaying all legal fees charged to customers that are recorded in the sub-ledger accounting system and unmatched to an invoice. The finance users can then investigate these invoices and then reconcile them by using a Resolve button or a Dispute button.

In the example embodiment, the Resolve button is used for reconciling invoices, which do not get reconciled by the auto-match process. The finance user must select at least one entry from both the WILBER data section and the OGL data section and click on the Resolve button. The information is summarized for a final auto-validation and then the finance manager clicks on an Approve button (not shown) to reconcile the invoice to the sub-ledger posting.

The Dispute button is used in scenarios when it is known that an invoice approved in WILBER as reconcilable will not be posted to the sub-ledger. This may occur as a result of the invoice being incorrectly charged as reimbursable in WILBER or if the customer was given a discount.

The reconciliation tool also includes a Variance pop-up. When there is not an exact match between the amounts listed in the WILBER data section and the OGL data section, the finance users are required to select a reason for the variations. The valid categories include: Rounding Error, Currency Translation Error, Double Booking Adjustment, Valid Discount and Others (comments mandatory). The Variance pop-up enables the system to capture data relating to the reasons for variation.

Figure 47:
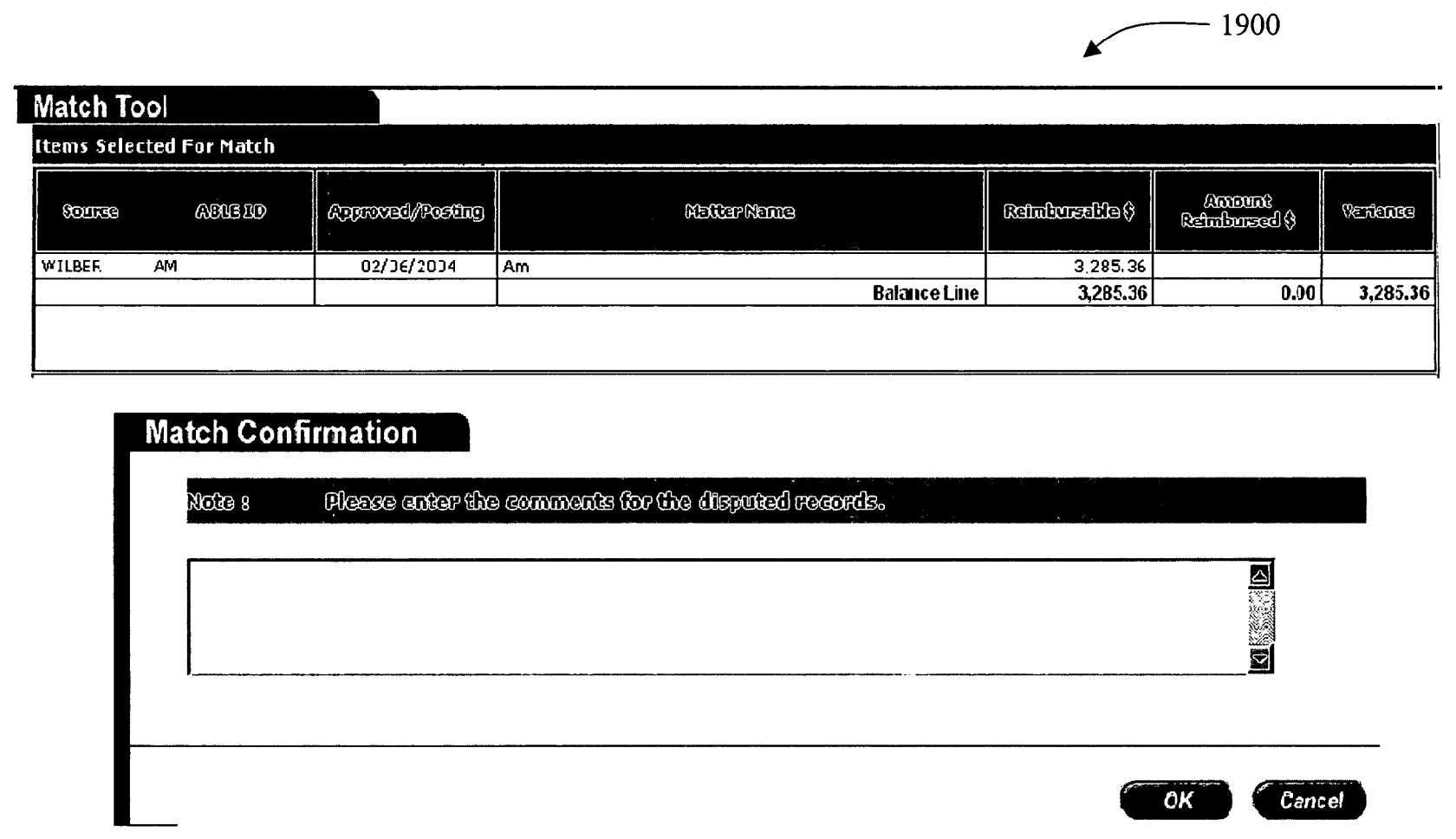

FIG. 47 is an example embodiment of a user interface 1900 displaying a dispute comment screen for a finance reconciliation member within WILBER 10 (shown in FIG. 1). User interface 1900 enables a finance user to enter comments and capture a reason for a dispute when a posting is being disputed.

FIG. 48 is an example embodiment of a user interface 1910 displaying a variance comment screen for a finance reconciliation member within WILBER 10 (shown in FIG. 1). User interface 1910 is displayed when validation does not find an exact match between amounts included in the WILBER data section and the OGL data section. The finance users are then required to select a reason for the variations. The valid categories include: Rounding Error, Currency Translation Error, Double Booking Adjustment, Valid Discount and Others (comments mandatory). This tool facilitates the capture of data regarding the reasons for variation.

FIG. 49 is an example embodiment of a user interface 1920 displaying a reconciliation inquiry screen for a finance reconciliation member within WILBER 10 (shown in FIG. 1). The reconciliation inquiry screen enables the finance users to generate dynamic reports based on any specific search criteria such as invoice number, invoice approval date range, and reconciliation status.

FIG. 50 is an example embodiment of a user interface 1930 displaying a monthly reconciliation data screen for a finance reconciliation member within WILBER 10 (shown in FIG. 1). The monthly report screen summarizes the data relating to the reimbursable charges on a monthly basis for the business segment. This report provides a high level overview of expenses which are to be reconciled.

FIG. 51 is an example embodiment of a user interface 1940 displaying a detailed reconciliation data screen for a finance reconciliation member within WILBER 10 (shown in FIG. 1). The detailed reconciliation data screen is a drill down report, which displays the reconciliation summary for a business segment on a monthly/quarterly basis. The screen provides drill down for each reconciliation status (resolved, pending and disputed), and displays the invoice related details for each category.

WILBER 10 therefore enables a business entity to manage, budget, track and report all legal expenditures, and reconcile accounting entries relating to legal expenditures. More specifically, WILBER 10 enables a business entity, engaged in the business of providing financial services to a client, including, but not limited to, loans and financial leases, to manage, budget, track and report all legal expenditures incurred by the business entity as part of providing the financial services to the client. WILBER 10 enables the business entity to create a matter, indicate whether the matter includes paid at close, receive an invoice, perform invoice allocation and reimbursement, approve an invoice, pay a law firm, and generate reports. Invoices may be received and entered into WILBER 10 either manually or electronically. Once the invoice is in the WILBER, the method of reimbursement for the invoice is indicated including at least one of paid at close, charge to good faith, charge to loan, and customer wire. The method of non-reimbursement include a full or partial charge to a cost center at business entity. After the method of reimbursement is indicated, the invoices are routed for electronic approval using the WILBER 10. Once the invoices are approved within WILBER 10, the accounts payable department of the business entity then pays the outside counsel. WILBER 10 also enables users to generate detailed reports on matters as well as on invoices fully approved through the billing team. By enabling a business entity to better manage legal expenditures, WILBER 10 facilitates reducing transaction costs for the business entity and facilitates reducing the amount of time spent on each transaction.

While the invention has been described in terms of various specific embodiments, those skilled in the art will recognize that the invention can be practiced with modification within the spirit and scope of the claims.

What is claimed is:

1. A method for tracking and approving legal expenses incurred by a business entity using a legal budgeting computer system, the business entity engaged in the business of providing financial services to a plurality of customers, said method comprising the steps of: creating within the legal budgeting computer system a first legal matter of a plurality of legal matters reflecting legal work to be performed by an outside counsel; designating the first legal matter as a deal related legal matter, wherein the deal related legal matter involves a financing provided by the business entity to a first customer of the plurality of customers; creating a purchase order for the first legal matter including a budgeted amount which is expected to be paid to the outside counsel for performing the legal work; receiving at the legal budgeting computer system from the outside counsel an invoice including invoice data and an invoice amount; determining whether the received invoice corresponds to at least one of the plurality of legal matters; if the legal budgeting computer system determines that the received invoice corresponds to the first legal matter, then the computer system: designates the invoice amount as including at least one of a reimbursable amount and a non-reimbursable amount; prompts an account manager to designate a method of reimbursement for the invoice including for any reimbursable amount at least one of paid at close, charge to good faith, charge to loan, and customer to wire money, and for any non-reimbursable amount a non-reimbursable charge to cost center; submits the invoice using the legal budgeting computer system to an approval process; validates the approved invoice amount by comparing the approved invoice amount to the budgeted amount; pays the approved invoice amount to the outside counsel; and automatically reconciles the approved invoice amount with an amount recorded in a sub-ledger accounting system of the business entity, wherein the amount recorded in the sub-ledger accounting system includes any reimbursable amount of the invoice; and if the legal budgeting computer system determines that the received invoice does not correspond to one of the plurality of legal matters, then the legal budgeting computer system initiates an interface failure, holds the received invoice and any previously submitted related invoices, and automatically processes the received invoice and the previously submitted related invoices after a second legal matter of the plurality of legal matters is created, wherein the received invoice and the previously submitted related invoices correspond to the second legal matter.

2. A method according to claim 1 further comprising generating a plurality of reports based on information included in at least one of the first legal matter, the purchase order, and the invoice.

3. A method according to claim 1 further comprising generating a plurality of reports including at least one of an Outside Counsel Management System (OCMS) report, a Legal Spend by Matter Type report, a Legal Spend by Lead Lawyer Location report, a Non-US Currency Invoices report, a Non-Reimbursable report, and a Budget vs. Actual report.

4. A method according to claim 1 wherein the legal budgeting computer system communicates with a workflow management computer system, said step of creating within the legal budgeting computer system a first legal matter further comprises: receiving at the legal budgeting computer system from the workflow management computer system a notification to create the deal related legal matter within the legal budgeting computer system after at least one predetermined event occurs within the deal; and creating within the legal budgeting computer system the deal related legal matter, the deal related legal matter relates to a financial transaction for the first customer and includes at least one of a new financing transaction matter and a portfolio administration matter.

5. A method according to claim 1 wherein said step of receiving at the legal budgeting computer system an invoice further comprises:
receiving an invoice from the outside counsel in at least one of an electronic format and a printed document format;
automatically receiving an electronic invoice at the legal budgeting computer system; and
inputting information into the legal budgeting computer system from a printed document invoice.

6. A method according to claim 5 wherein the legal budgeting computer system communicates with an electronic invoice submission system, said step of automatically receiving an electronic invoice at the legal budgeting computer system further comprises utilizing an electronic invoice submission system to electronically submit an invoice to the legal budgeting computer system.

7. A method according to claim 1 wherein the legal budgeting computer system communicates with a purchase order system, said step of creating a purchase order for the first legal matter further comprises: creating at the purchase order system a purchase order including a purchase order number for the first legal matter; and entering into the legal budgeting computer system the purchase order number for the first legal matter to update the first legal matter.

8. A method according to claim 1 further comprising prompting the account manager to enter into the legal budgeting computer system whether the first legal matter involves a paid at close reimbursement.

9. A method according to claim 1 wherein said step of prompts an account manager to designate a method of reimbursement further comprises prompts an account manager to designate a method of full or partial reimbursement.

10. A method according to claim 1 wherein said step of prompts an account manager to designate a method of reimbursement further comprises: prompts an internal counsel to designate a method of full or partial reimbursement for non-deal related invoices submitted in a printed document format; and prompts the business entity to charge the first customer based on the designated method of reimbursement.

11. A method according to claim 1 wherein said step of submits the invoice using the legal budgeting computer system to an approval process further comprises: determines whether the invoice amount is greater than a first pre-determined amount; and submits the invoice to a billing team member for approval if the invoice amount is not greater than the first pre-determined amount.

12. A method according to claim 11 wherein said step of submits the invoice using the legal budgeting computer system to an approval process further comprises: submits the invoice to a first internal counsel for at least one of approval and rejection if the invoice amount is greater than the first pre-determined amount; transmits the invoice to a billing team member to reject the invoice if the first internal counsel rejects the invoice; determines whether the invoice amount is greater than a second pre-determined amount; and transmits the invoice to a billing team member to approve the invoice if the first internal counsel approves the invoice and the invoice amount is not greater than the second pre-determined amount.

13. A method according to claim 12 wherein said step of submits the invoice using the legal budgeting computer system to an approval process further comprises: submits the invoice to a second internal counsel for at least one of approval and rejection of the first internal counsel's approval if the invoice amount is greater than the second pre-determined amount; transmits the invoice to a billing team member to reject the invoice if the second internal counsel rejects the invoice; determines whether the invoice amount is greater than a third pre-determined amount; and transmits the invoice to a billing team member to approve the invoice if the second internal counsel approves the invoice and the invoice amount is not greater than the third pre-determined amount.

14. A method according to claim 13 wherein said step of submits the invoice using the legal budgeting computer system to an approval process further comprises: submits the invoice to a third internal counsel for at least one of approval and rejection of the first and second internal counsel's approval if the invoice amount is greater than the third pre-determined amount; transmits the invoice to a billing team member to reject the invoice if the third internal counsel rejects the invoice; and transmits the invoice to a billing team member to approve the invoice if the third internal counsel approves the invoice such that the invoice amount approved may be paid to the outside counsel.

15. A method according to claim 1 wherein said step of submits the invoice using the legal budgeting computer system to an approval process further comprises prompts a Profit and Loss (P&L) approver to at least one of approve and reject a portion of the invoice allocated to a cost center.

16. A method according to claim 1 wherein said step of submits the invoice using the legal budgeting computer system to an approval process further comprises validates the invoice data before passing the invoice on to a next approver by utilizing at least one of the following formulas: reimbursable total =(customer wire amount +charged to loan amount +good faith amount); non-reimbursable total = Σ(P&L charge amounts); total Invoice Amount =customer check/wire amount +good faith amount +charged to loan amount +P&L charge to cost center amount +rejected amount +paid at close adjusted amount; and net invoice amount =total invoice amount−(paid at close adjusted amount +rejected amount).

17. A method according to claim 1 wherein said step of validates the approved invoice amount further comprises: adds the approved invoice amount to prior approved invoice amounts; and compares a total approved invoice amount to the budgeted amount.

18. A method according to claim 1 wherein said step of creating within the legal budgeting computer system a first legal matter further comprises: prompting an internal counsel to revise and update the plurality of legal matters; prompting an internal counsel to approve invoices; and prompting an internal counsel to search for matters and invoices based upon designated criteria.

19. A method according to claim 1 wherein said step of designating the first legal matter as a deal related legal matter comprises prompting an internal counsel at the business entity to designate the first legal matter as at least one of a deal based matter and a non-deal based matter, wherein the deal based matter relates to a financing transaction and the non-deal based matter does not relate to a specific financing transaction.

20. A method according to claim 1 wherein said step of creating within the legal budgeting computer system a first legal matter further comprises prompting an internal counsel at the business entity to designate the first legal matter as relating to at least one of the following categories: bankruptcy administration and litigation-agented; bankruptcy administration and litigation-participation; compliance-corporate; defensive litigation; general research-corporate; human resources; intellectual property (other IP and IT); intellectual property (patents, copyrights, trademarks); international; M&A (business development work); new financing transaction (ABL); new financing transaction (cash flow); new financing transaction (DIP); new financing transaction (equity); new financing transaction (exit financing); new financing transaction (factoring); new financing transaction (other specialized finance); new financing transaction (participation); new financing transaction (securitization); offensive litigation; other miscellaneous; portfolio administration-agented deal; portfolio administration-participation; portfolio administration-workout group; workout-agented deal; workout-CAQ; workout-participation; distressed debt trades; distressed debt document review and trades; par primary doc review; and par secondary doc review.

21. A method according to claim 1 wherein said step of automatically reconciles the approved invoice amount further comprises: posts legal expenses to be charged to the first customer in the sub-ledger accounting system of the business entity; automatically matches the approved invoice amount including reimbursable legal expenses against the postings recorded in the sub-ledger accounting system; and designates the approved invoice as "Resolved" if automatically matched, and "Pending" if not automatically matched.

22. A network-based system for tracking and approving legal expenses incurred by a business entity engaged in the business of providing financial services to a plurality of customers, said system comprising: a client system comprising a browser; a centralized database for storing information; and a server system configured to be coupled to said client system and said database, said server system further configured to: prompt a user associated with the business entity to input into the client system a first legal matter of a plurality of legal matters reflecting legal work to be performed by an outside counsel; prompt the user to designate the first legal matter as a deal related legal matter or a non-deal related legal matter, wherein the deal related legal matter involves a financing provided by the business entity to a first customer of the plurality of customers; prompt the user to create a purchase order for the first legal matter including a budgeted amount which is expected to be paid to the outside counsel for performing the legal work; receive from the outside counsel an invoice including invoice data and an invoice amount; designate the invoice amount as including at least one of a reimbursable amount and a non-reimbursable amount; determine whether the received invoice corresponds to at least one of the plurality of legal matters; if the received invoice corresponds to the first legal matter, then said server system is configured to: prompt the user to designate a method of reimbursement for the invoice including for any reimbursable amount at least one of paid at close, charge to good faith, charge to loan, and customer to wire money, and for any non-reimbursable amount a non-reimbursable charge to a cost center; transmit the invoice to at least one client system for an approval process; validate the approved invoice amount by comparing the approved invoice amount to the budgeted amount; pay the approved invoice amount to the outside counsel; and automatically reconcile the approved invoice amount with an amount recorded in a sub-ledger accounting system of the business entity, wherein the amount recorded in the sub-ledger accounting system includes any reimbursable amount of the invoice; and if the received invoice does not correspond to one of the plurality of legal matters, then said server system is configured to initiate an interface failure, hold the received invoice and any previously submitted related invoices, and automatically process the received invoice and the previously submitted related invoices after a second legal matter of the plurality of legal matters is created, wherein the received invoice and the previously submitted related invoices correspond to the second legal matter.

23. A system according to claim 22 wherein said server system further configured to generate plurality of reports based on information included in at least one of the first legal matter, the purchase order, and the invoice.

24. A system according to claim 22 wherein said server system further configured to generate a plurality of reports including at least one of an Outside Counsel Management System (OCMS) report, a Legal Spend by Matter Type report, a Legal Spend by Lead Lawyer Location report, a Non-US Currency Invoices report, a Non-Reimbursable report, and a Budget vs. Actual report.

25. A system according to claim 22 wherein said server system is in communication with a workflow management system, said server system further configured to:
receive from the workflow management system a notification to create a deal-based legal matter after at least one predetermined event occurs relating to the deal, the deal-based matter relates to a financial transaction for a customer and includes at least one of a new financing transaction matter and a portfolio administration matter;
prompt a user associated with the business entity based on the notification received from the workflow system to input into a client system a deal-based legal matter reflecting legal work to be performed by an outside counsel; and
record at the server system the deal-based legal matter.

26. A system according to claim 22 wherein said server system further configured to receive an invoice from the outside counsel in at least one of an electronic format and a printed document format.

27. A system according to claim 22 wherein said server system is in communication with an electronic invoice submission system, said server system further configured to automatically receive an electronic invoice from the electronic invoice submission system.

28. A system according to claim 22 wherein the user associated with the business entity comprises at least one of an internal counsel, an account manager, a billing team member, and a Profit and Loss (P&L) approver.

29. A system according to claim 22 wherein said server system is in communication with a purchase order system, said server system further configured to: receive from the purchase order system a purchase order including a purchase order number for the first legal matter; and store the purchase order number within the database with the first legal matter to update the first legal matter.

30. A system according to claim 22 wherein said server system further configured to prompt an account manager to enter whether the first legal matter involves a paid at close reimbursement.

31. A system according to claim 22 wherein said server system further configured to prompt an account manager to designate a method of full or partial reimbursement.

32. A system according to claim 22 wherein said server system further configured to:
prompt an internal counsel to designate a method of full or partial reimbursement for non-deal related invoices submitted in a printed document format; and
prompt the user to charge the first customer based on the designated method of reimbursement.

33. A system according to claim 22 wherein said approval process comprises:
determining whether the invoice amount is greater than a first pre-determined amount; and
submitting the invoice to a billing team member for approval if the invoice amount is not greater than the first pre-determined amount.

34. A system according to claim 33 wherein said approval process further comprises:
submitting the invoice to a first internal counsel for at least one of approval and rejection if the invoice amount is greater than the first pre-determined amount;
transmitting the invoice to a billing team member to reject the invoice if the first internal counsel rejects the invoice;
determining whether the invoice amount is greater than a second pre-determined amount;
transmitting the invoice to a billing team member to approve the invoice if the first internal counsel approves the invoice and the invoice amount is not greater than the second pre-determined amount;
submitting the invoice to a second internal counsel for at least one of approval and rejection of the first internal counsel's approval if the invoice amount is greater than the second pre-determined amount;
transmitting the invoice to a billing team member to reject the invoice if the second internal counsel rejects the invoice;
determining whether the invoice amount is greater than a third pre-determined amount;
transmitting the invoice to a billing team member to approve the invoice if the second internal counsel approves the invoice and the invoice amount is not greater than the third pre-determined amount;
submitting the invoice to a third internal counsel for at least one of approval and rejection of the first and second internal counsel's approval if the invoice amount is greater than the third pre-determined amount;
transmitting the invoice to a billing team member to reject the invoice if the third internal counsel rejects the invoice; and
transmitting the invoice to a billing team member to approve the invoice if the third internal counsel approves the invoice such that the invoice amount approved may be paid to the outside counsel.

35. A system according to claim 22 wherein said server system further configured to validate invoice data before passing the invoice on to a next approver by utilizing at least one of the following formulas:
reimbursable total =(customer wire amount +charged to loan amount +good faith amount);
non-reimbursable total =$\Sigma$(P&L charge amounts);
total Invoice Amount =customer check/wire amount +good faith amount +charged to loan amount +P&L charge to cost center amount +rejected amount +paid at close adjusted amount; and
net invoice amount =total invoice amount−(paid at close adjusted amount +rejected amount).

36. A system according to claim 22 wherein said server system further configured to:
- add the approved invoice amount to prior approved invoice amounts; and
- compare a total approved invoice amount to the budgeted amount.

37. A system according to claim 22 wherein said first legal matter comprises at least one of a deal related legal matter and a non-deal related legal matter, wherein deal related legal matter relates to a financing transaction and the non-deal related legal matter does not relate to a specific financing transaction.

38. A system according to claim 22 wherein said first legal matter comprises a first legal matter relating to at least one of the following categories: bankruptcy administration and litigation-agented; bankruptcy administration and litigation-participation; compliance-corporate; defensive litigation; general research-corporate; human resources; intellectual property (other IP and IT); intellectual property (patents, copyrights, trademarks); international; M&A (business development work); new financing transaction (ABL); new financing transaction (cash flow); new financing transaction (DIP); new financing transaction (equity); new financing transaction (exit financing); new financing transaction (factoring); new financing transaction (other specialized finance); new financing transaction (participation); new financing transaction (securitization); offensive litigation; other miscellaneous; portfolio administration-agented deal; portfolio administration-participation; portfolio administration-workout group; workout-agented deal; workout-CAQ; workout-participation; distressed debt trades; distressed debt document review and trades; par primary doc review; and par secondary doc review.

39. A system according to claim 22 wherein said server system further configured to:
- post legal expenses to be charged to a customer to the sub-ledger accounting system of the business entity;
- automatically match the approved invoice amount including reimbursable legal expenses against the postings recorded in the sub-ledger accounting system; and
- designate the approved invoice as "Resolved" if automatically matched, and "Pending" if not automatically matched.

40. A network-based system for tracking and approving legal expenses incurred by a business entity engaged in the business of providing financial services to a plurality of customers, said system comprising: a workflow management system; an electronic invoice submission system; a purchase order system; and a legal budgeting system in communication with said workflow management system, said electronic invoice submission system, and said purchase order system, said legal budgeting system comprising: a client system comprising a browser; a centralized database for storing information; and a server system configured to be coupled to said client system and said database, said server system further configured to: prompt a user associated with the business entity to input into the client system a first legal matter of a plurality of legal matters reflecting legal work to be performed by an outside counsel; prompt the user to designate the first legal matter as a deal related legal matter or a non-deal related legal matter, wherein the deal related legal matter involves a financing provided by the business entity to a first customer of the plurality of customers; prompt the user to create a purchase order for the first legal matter including a budgeted amount which is expected to be paid to the outside counsel for performing the legal work; receive from the outside counsel an invoice including invoice data and an invoice amount; designate the invoice amount as including at least one of a reimbursable amount and a non-reimbursable amount; determine whether the received invoice corresponds to at least one of the plurality of legal matters; if the received invoice corresponds to the first legal matter, then said server system is configured to: prompt the user to designate a method of reimbursement for the invoice including for any reimbursable amount at least one of paid at close, charge to good faith, charge to loan, and customer to wire money, and for any non-reimbursable amount a non-reimbursable charge to a cost center; transmit the invoice to at least one client system for an approval process; validate the approved invoice amount by comparing the approved invoice amount to the budgeted amount; pay the approved invoice amount to the outside counsel; and automatically reconcile the approved invoice amount with an amount recorded in a sub-ledger accounting system of the business entity, wherein the amount recorded in the sub-ledger accounting system includes any reimbursable amount of the invoice; and if the received invoice does not correspond to one of the plurality of legal matters, then said server system is configured to initiate an interface failure, hold the received invoice and any previously submitted related invoices, and automatically process the received invoice and the previously submitted related invoices after a second legal matter of the plurality of legal matters is created, wherein the received invoice and the previously submitted related invoices correspond to the second legal matter.

41. A system according to claim 40 wherein said server system further configured to generate a plurality of reports based on information included in at least one of the first legal matter, the purchase order, and the invoice.

42. A system according to claim 40 wherein said server system further configured to generate a plurality of reports including at least one of an Outside Counsel Management System (OCMS) report, a Legal Spend by Matter Type report, a Legal Spend by Lead Lawyer Location report, a Non-US Currency Invoices report, a Non-Reimbursable report, and a Budget vs. Actual report.

43. A system according to claim 40 wherein said workflow management system configured to transmit a notification to the legal budgeting system prompting a user to create the deal related legal matter after at least one predetermined event occurs relating to the deal wherein the deal related legal matter relates to a financial transaction for a customer and includes at least one of a new financing transaction matter and a portfolio administration matter, the server system further configured to:
- receive the notification from the workflow management system;
- prompt the user to input into a client system the deal related legal matter reflecting legal work to be performed by an outside counsel; and
- record the deal related legal matter in said database.

44. A system according to claim 40 wherein said electronic invoice submission system configured to transmit an electronic invoice to the legal budgeting system from the outside counsel, said server system further configured to automatically receive the electronic invoice and store the electronic invoice in said database.

45. A system according to claim 40 wherein said purchase order system configured to transmit a purchase order including a purchase order number for the first legal matter to said legal budgeting system, said server system further configured to: receive the purchase order from said purchase order system; and store the purchase order number within said database with the first legal matter to update the first legal matter.

46. A system according to claim 40 wherein said server system further configured to prompt an account manager to enter whether the first legal matter involves a paid at close reimbursement.

47. A system according to claim 40 wherein said server system further configured to prompt an account manager to designate a method of full or partial reimbursement.

48. A system according to claim 40 wherein said server system further configured to:
   prompt an internal counsel to designate a method of full or partial reimbursement for non-deal based invoices submitted in a printed document format; and
   prompt a user to charge a customer based on the designated method of reimbursement.

49. A system according to claim 40 wherein said approval process comprises:
   determining whether the invoice amount is greater than a first pre-determined amount; and
   submitting the invoice to a billing team member for approval if the invoice amount is not greater than the first pre-determined amount.

50. A system according to claim 49 wherein said approval process further comprises:
   submitting the invoice to a first internal counsel for at least one of approval and rejection if the invoice amount is greater than the first pre-determined amount;
   transmitting the invoice to a billing team member to reject the invoice if the first internal counsel rejects the invoice;
   determining whether the invoice amount is greater than a second pre-determined amount;
   transmitting the invoice to a billing team member to approve the invoice if the first internal counsel approves the invoice and the invoice amount is not greater than the second pre-determined amount;
   submitting the invoice to a second internal counsel for at least one of approval and rejection of the first internal counsel's approval if the invoice amount is greater than the second pre-determined amount;
   transmitting the invoice to a billing team member to reject the invoice if the second internal counsel rejects the invoice;
   determining whether the invoice amount is greater than a third pre-determined amount;
   transmitting the invoice to a billing team member to approve the invoice if the second internal counsel approves the invoice and the invoice amount is not greater than the third pre-determined amount;
   submitting the invoice to a third internal counsel for at least one of approval and rejection of the first and second internal counsel's approval if the invoice amount is greater than the third pre-determined amount;
   transmitting the invoice to a billing team member to reject the invoice if the third internal counsel rejects the invoice; and
   transmitting the invoice to a billing team member to approve the invoice if the third internal counsel approves the invoice such that the invoice amount approved may be paid to the outside counsel.

51. A system according to claim 40 wherein said server system further configured to validate invoice data before passing the invoice on to a next approver by utilizing at least one of the following formulas:
   reimbursable total=(customer wire amount +charged to loan amount +good faith amount);
   non-reimbursable total =Σ(P&L charge amounts);
   total Invoice Amount =customer check/wire amount +good faith amount +charged to loan amount +P&L charge to cost center amount +rejected amount +paid at close adjusted amount; and
   net invoice amount =total invoice amount−(paid at close adjusted amount +rejected amount).

52. A system according to claim 40 wherein said server system further configured to:
   add the approved invoice amount to prior approved invoice amounts; and
   compare a total approved invoice amount to the budgeted amount.

53. A system according to claim 40 wherein said server system further configured to:
   post legal expenses to be charged to a customer to the sub-ledger accounting system of the business entity;
   automatically match the approved invoice amount including reimbursable legal expenses against the postings recorded in the sub-ledger accounting system; and
   designate the approved invoice as "Resolved" if automatically matched, and "Pending" if not automatically matched.

54. A computer-readable storage medium having a computer program embodied thereon for tracking and approving legal expenses incurred by a business entity engaged in the business of providing financial services to a plurality of customers, said computer program comprising at least one code segment that prompts a user to input a first legal matter of a plurality of legal matters reflecting legal work to be performed by an outside counsel and then: designates the first legal matter as a deal related legal matter or a non-deal related legal matter, wherein the deal related legal matter involves a financing provided by the business entity to a first customer of the plurality of customers; prompts a user to create a purchase order for the first legal matter including a budgeted amount which is expected to be paid to the outside counsel for performing the legal work; receives from the outside counsel an invoice including invoice data and an invoice amount; designates the invoice amount as including at least one of a reimbursable amount and a non-reimbursable amount; determines whether the received invoice corresponds to at least one of the plurality of legal matters; if the received invoice corresponds to the first legal matter, then said at least one code segment: prompts an account manager to designate a method of reimbursement for the invoice including for any reimbursable amount at least one of paid at close, charge to good faith, charge to loan, and customer to wire money, and for any non-reimbursable amount a non-reimbursable charge to a cost center; transmits the invoice to at least one client system for an approval process; validates the approved invoice amount by comparing the approved invoice amount to the budgeted amount; transmits payment of the approved invoice amount to the outside counsel; and automatically reconciles the approved invoice amount with an amount recorded in a sub-ledger accounting system of the business entity, wherein the amount recorded in the sub-ledger accounting system includes any reimbursable amount of the invoice; and if the received invoice does not correspond to one of the plurality of legal matters, then said at least one code segment initiates an interface failure, holds the received invoice and any previously submitted related invoices, and automatically processes the received invoice and the previously submitted related invoices after a second legal matter of the plurality of legal matters is created, wherein the received invoice and the previously submitted related invoices correspond to the second legal matter.

55. A computer-readable storage medium in accordance with claim 54, wherein the computer program further comprises at least one code segment that generates a plurality of reports based on information included in at least one of the first legal matter, the purchase order, and the invoice.

56. A computer-readable storage medium in accordance with claim 54, wherein the computer program further comprises at least one code segment that generates a plurality of reports including at least one of an Outside Counsel Management System (OCMS) report, a Legal Spend by Matter Type report, a Legal Spend by Lead Lawyer Location report, a Non-US Currency Invoices report, a Non-Reimbursable report, and a Budget vs. Actual report.

57. A computer-readable storage medium in accordance with claim 54, wherein the computer program further comprises at least one code segment that:
communicates with a workflow management system;
receives from the workflow management system a notification to create the deal related legal matter after at least one predetermined event occurs relating to the deal, the deal related legal matter relates to a financial transaction for a customer and includes at least one of a new financing transaction matter and a portfolio administration matter;
prompts a user based on the notification received from the workflow system to input the deal related legal matter reflecting legal work to be performed by an outside counsel; and
records the deal related legal matter.

58. A computer-readable storage medium in accordance with claim 54, wherein the computer program further comprises at least one code segment that:
communicates with an electronic invoice submission system; and
automatically receives an electronic invoice from the electronic invoice submission system.

59. A computer-readable storage medium in accordance with claim 54, wherein the computer program further comprises at least one code segment that: communicates with a purchase order system; receives from the purchase order system a purchase order including a purchase order number for the first legal matter; and stores the purchase order number within a database with the first legal matter to update the first legal matter.

60. A computer-readable storage medium in accordance with claim 54, wherein the computer program further comprises at least one code segment that prompts an account manager to enter whether the first legal matter involves a paid at close reimbursement.

61. A computer-readable storage medium in accordance with claim 54, wherein the computer program further comprises at least one code segment that:
determines whether the invoice amount is greater than a first pre-determined amount; and
transmits the invoice to a billing team member for approval if the invoice amount is not greater than the first pre-determined amount.

62. A computer-readable storage medium in accordance with claim 61, wherein the computer program further comprises at least one code segment that:
transmits the invoice to a first internal counsel for at least one of approval and rejection if the invoice amount is greater than the first pre-determined amount;
transmits the invoice to a billing team member to reject the invoice if the first internal counsel rejects the invoice;
determines whether the invoice amount is greater than a second pre-determined amount;
transmits the invoice to a billing team member to approve the invoice if the first internal counsel approves the invoice and the invoice amount is not greater than the second pre-determined amount;
transmits the invoice to a second internal counsel for at least one of approval and rejection of the first internal counsel's approval if the invoice amount is greater than the second pre-determined amount;
transmits the invoice to a billing team member to reject the invoice if the second internal counsel rejects the invoice;
determines whether the invoice amount is greater than a third pre-determined amount;
transmits the invoice to a billing team member to approve the invoice if the second internal counsel approves the invoice and the invoice amount is not greater than the third pre-determined amount;
transmits the invoice to a third internal counsel for at least one of approval and rejection of the first and second internal counsel's approval if the invoice amount is greater than the third pre-determined amount;
transmits the invoice to a billing team member to reject the invoice if the third internal counsel rejects the invoice; and
transmits the invoice to a billing team member to approve the invoice if the third internal counsel approves the invoice such that the invoice amount approved may be paid to the outside counsel.

63. A computer-readable storage medium in accordance with claim 54, wherein the computer program further comprises at least one code segment that validates invoice data before passing the invoice on to a next approver by utilizing at least one of the following formulas:
reimbursable total =(customer wire amount +charged to loan amount +good faith amount);
non-reimbursable total =$\Sigma$(P&L charge amounts);
total Invoice Amount =customer check/wire amount +good faith amount +charged to loan amount +P&L charge to cost center amount +rejected amount +paid at close adjusted amount; and
net invoice amount =total invoice amount−(paid at close adjusted amount +rejected amount).

64. A computer-readable storage medium in accordance with claim 54, wherein the computer program further comprises at least one code segment that:
adds the approved invoice amount to prior approved invoice amounts; and
compares a total approved invoice amount to the budgeted amount.

65. A computer-readable storage medium in accordance with claim 54, wherein the computer program further comprises at least one code segment that enables a user to designate the first legal matter as at least one of a deal based matter and a non-deal based matters, wherein deal based matters relate to a financing transaction and non-deal based matters do not relate to a specific financing transaction.

66. A computer-readable storage medium in accordance with claim 54, wherein the computer program further comprises at least one code segment that:
posts legal expenses to be charged to a customer to the sub-ledger accounting system of the business entity;
automatically matches the approved invoice amount including reimbursable legal expenses against the postings recorded in the sub-ledger accounting system; and
designates the approved invoice as "Resolved" if automatically matched, and "Pending" if not automatically matched.

* * * * *